United States Patent
Arai et al.

(10) Patent No.: US 9,251,445 B2
(45) Date of Patent: Feb. 2, 2016

(54) IMAGE PROCESSING APPARATUS, IMAGE FORMING SYSTEM, IMAGE FORMING APPARATUS, AND IMAGE PROCESSING METHOD FOR CORRECTING DENSITY OF IMAGE INFORMATION

(71) Applicant: FUJI XEROX CO., LTD., Tokyo (JP)

(72) Inventors: Shigeru Arai, Kanagawa (JP); Tomoshi Hara, Kanagawa (JP); Masahiko Kubo, Kanagawa (JP); Nobukazu Takahashi, Kanagawa (JP); Shinichiro Fujimori, Kanagawa (JP); Takashi Ochi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/615,035

(22) Filed: Feb. 5, 2015

(65) Prior Publication Data
US 2015/0262045 A1 Sep. 17, 2015

(30) Foreign Application Priority Data

Mar. 14, 2014 (JP) ................................. 2014-052511

(51) Int. Cl.
*G06K 15/02* (2006.01)
*G06K 15/14* (2006.01)
(52) U.S. Cl.
CPC ............ *G06K 15/1876* (2013.01); *G06K 15/14* (2013.01)
(58) Field of Classification Search
CPC ........................... G06K 15/1876; G06K 15/14
USPC .......................................... 358/1.2, 3.27, 2.1
See application file for complete search history.

(56) References Cited

U.S. PATENT DOCUMENTS

| | | | | | |
|---|---|---|---|---|---|
| 5,321,468 | A | * | 6/1994 | Nakane | G03G 15/50 399/30 |
| 5,764,811 | A | * | 6/1998 | Kakutani | H04N 1/4053 382/252 |
| 5,892,595 | A | * | 4/1999 | Yamakawa | H04N 1/486 358/504 |
| 6,044,204 | A | * | 3/2000 | Takamatsu | G06K 15/14 358/1.9 |
| 7,295,344 | B2 | * | 11/2007 | Adachi | G06T 7/00 358/1.9 |

FOREIGN PATENT DOCUMENTS

| JP | 3832519 B2 | 10/2006 |
|---|---|---|
| JP | 3832521 B2 | 10/2006 |

* cited by examiner

*Primary Examiner* — Benny Q Tieu
*Assistant Examiner* — Quyen V Ngo
(74) *Attorney, Agent, or Firm* — Sughrue Mion, PLLC

(57) ABSTRACT

An image processing apparatus includes an acquisition unit, a first detection unit, a first determination unit, a second detection unit, a second determination unit, a correction unit, and a transmitting unit. The acquisition unit acquires image information having multiple pixels. The first detection unit detects sub-scanning-direction boundary pixels in accordance with the image information. The first determination unit determines whether or not a development-related defect occurs in a preset number of pixels downstream of the sub-scanning-direction boundary pixels in the sub-scanning direction. The second detection unit detects an end pixel in the main scanning direction. The second determination unit determines whether or not each of sub-scanning-direction boundary pixels arranged in the main scanning direction is close to the end pixel in the main scanning direction. The correction unit corrects the image information. The transmitting unit transmits the image information corrected by the correction unit to an image forming apparatus.

6 Claims, 33 Drawing Sheets

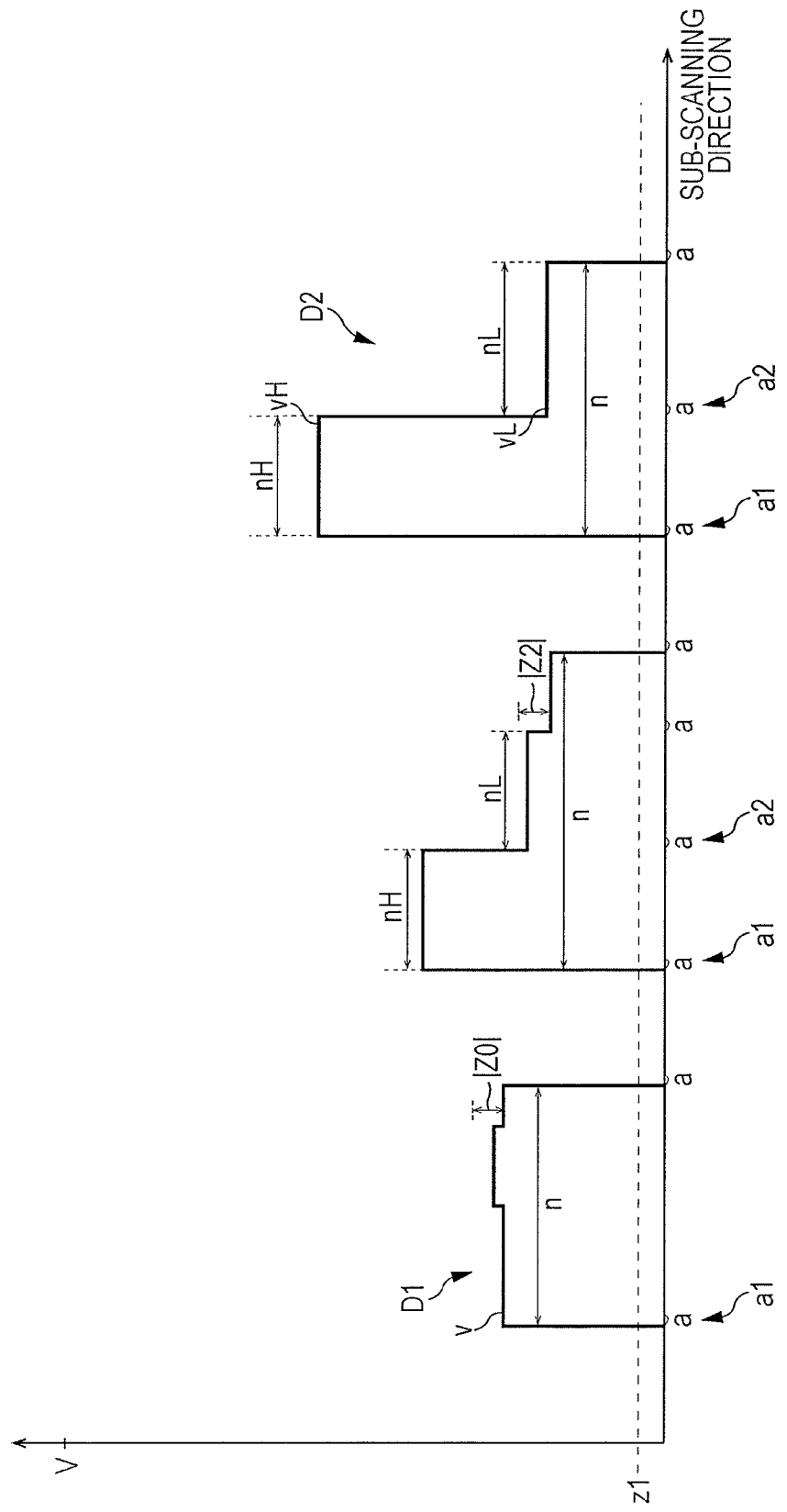

| DENSITY OF PIXEL OF INTEREST [%] | DENSITY OF PIXEL OF INTEREST [*/255] | NUMBER OF SUPERPOSED BITS | ADDED RANDOM NUMBER RANGE |
|---|---|---|---|
| 0 TO 25 | 0 TO 63 | 2 | −2 TO 1 |
| 25 TO 50 | 64 TO 127 | 3 | −4 TO 3 |
| 50 TO 75 | 128 TO 191 | 4 | −8 TO 7 |
| 75 TO 100 | 192 TO 255 | 5 | −16 TO 15 |

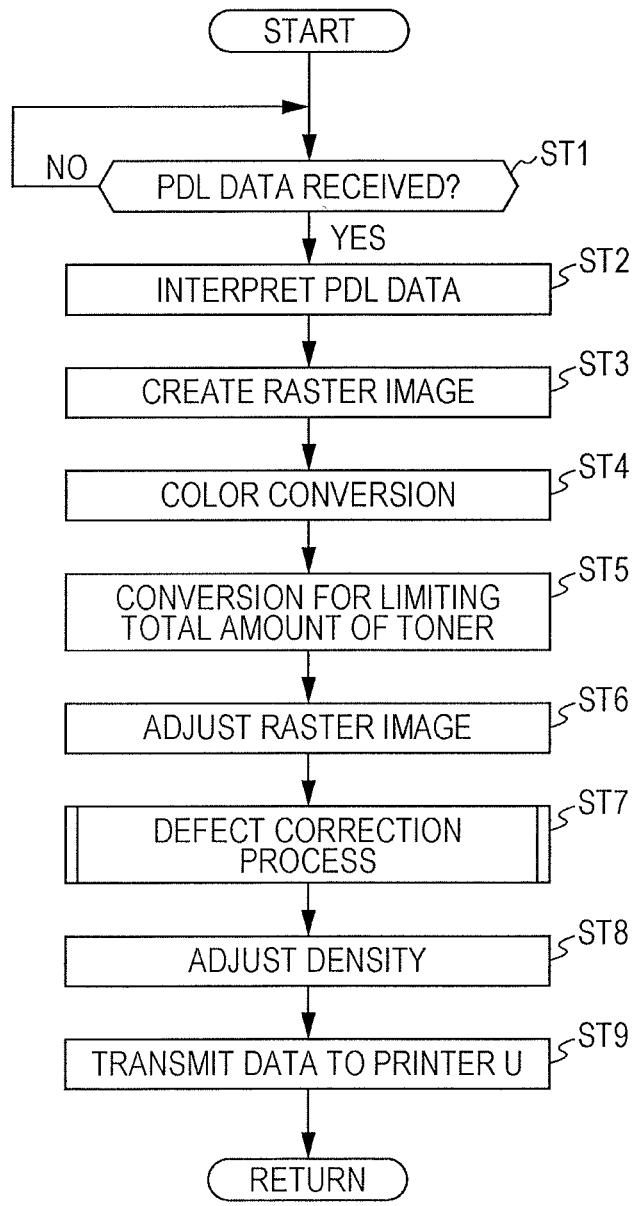

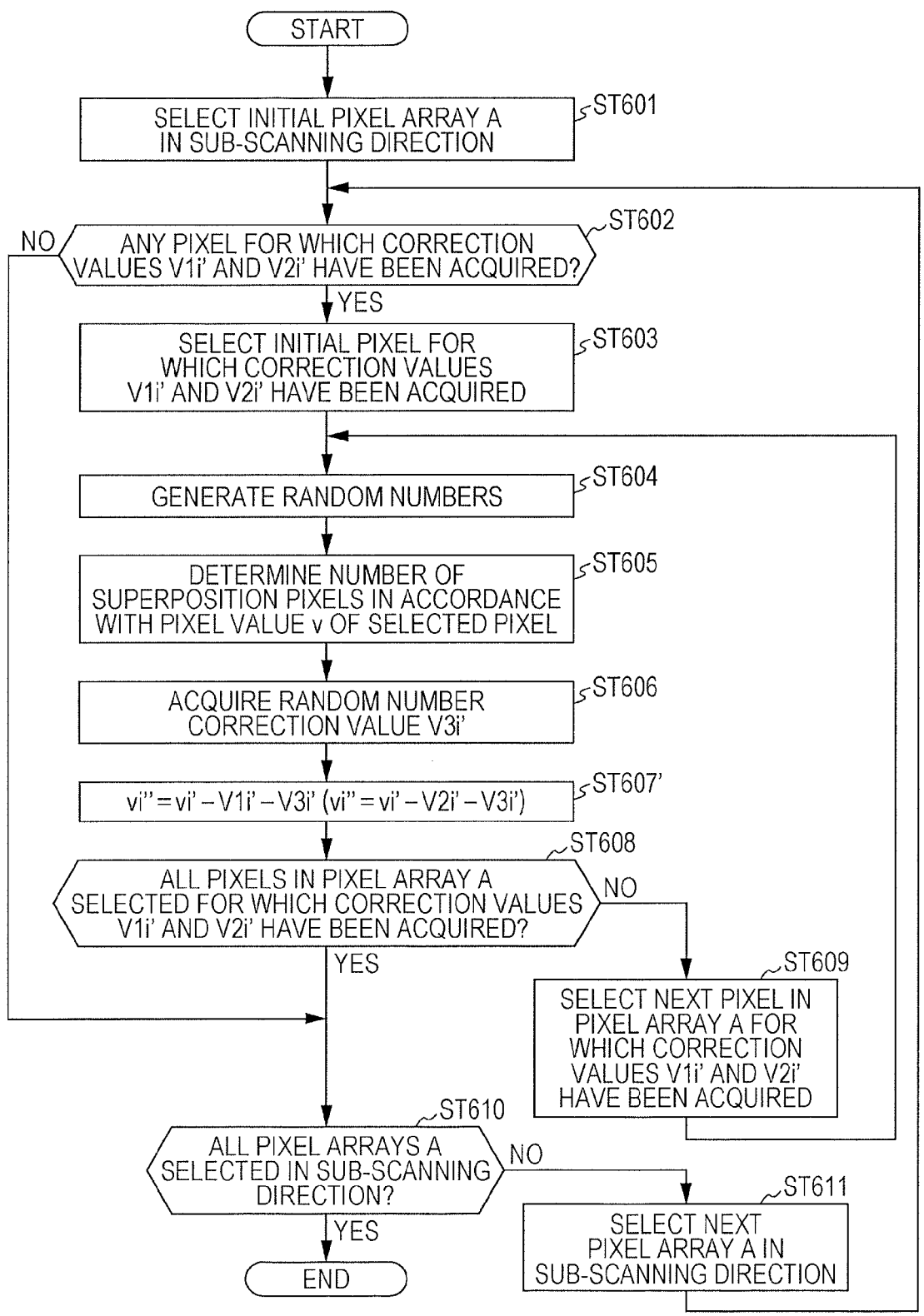

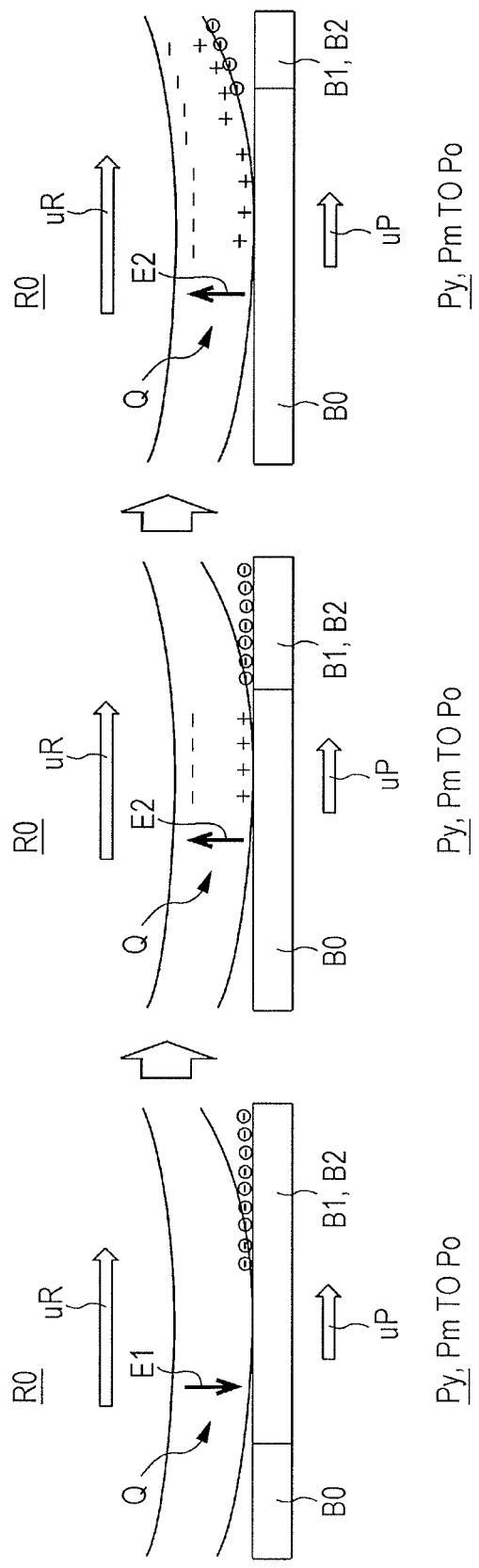

Q    R0

Py, Pm TO Po    O1

B2, B1

B1, B0    O2

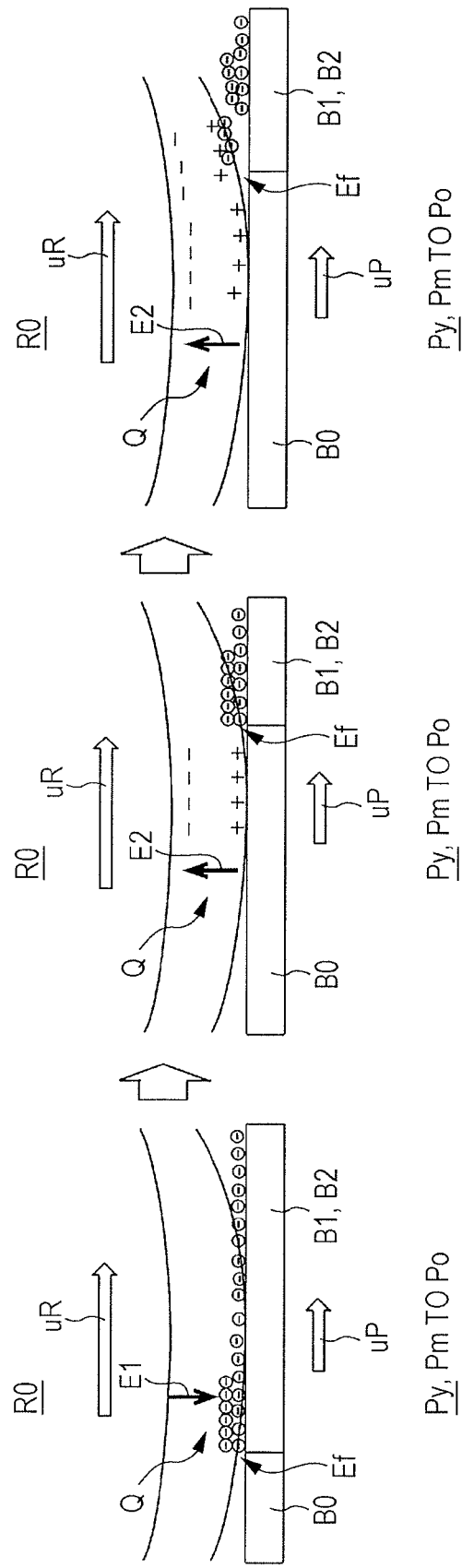

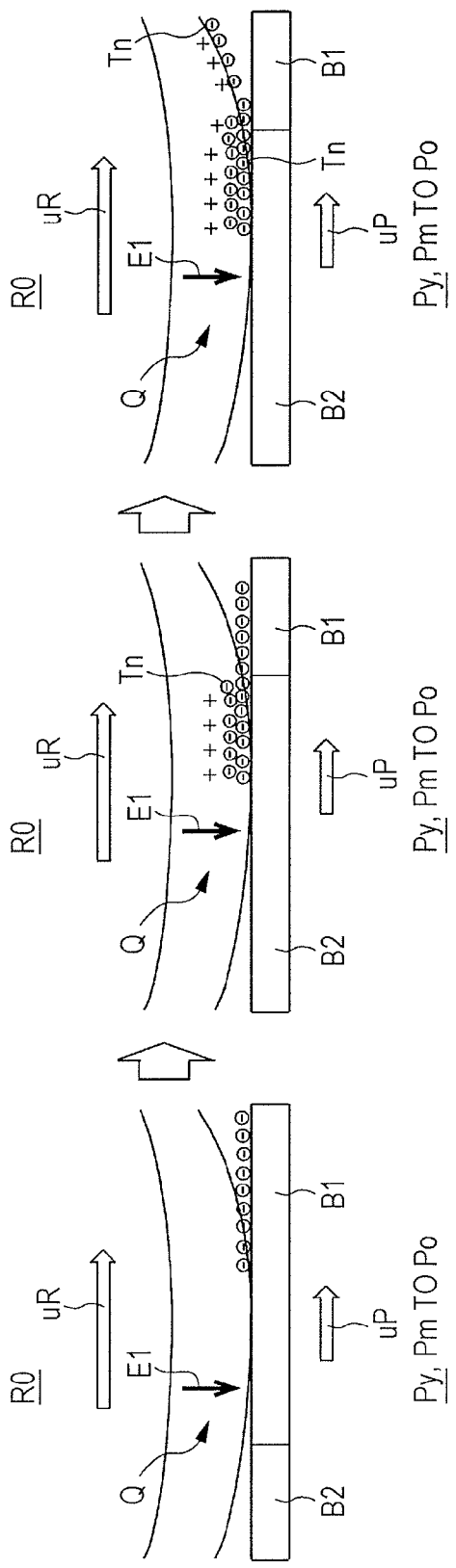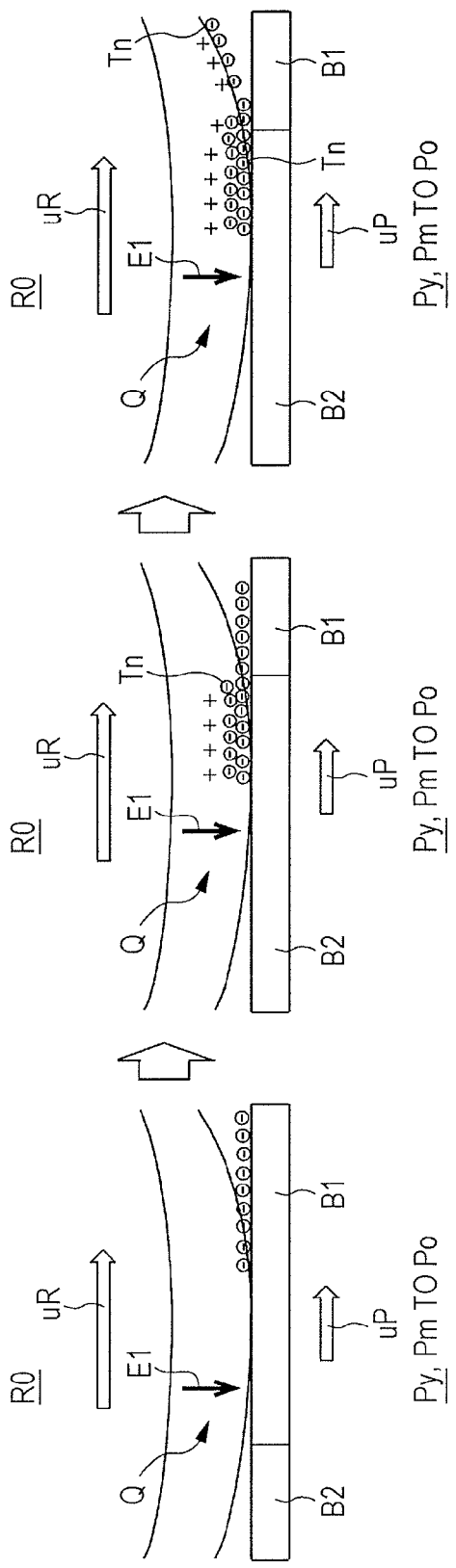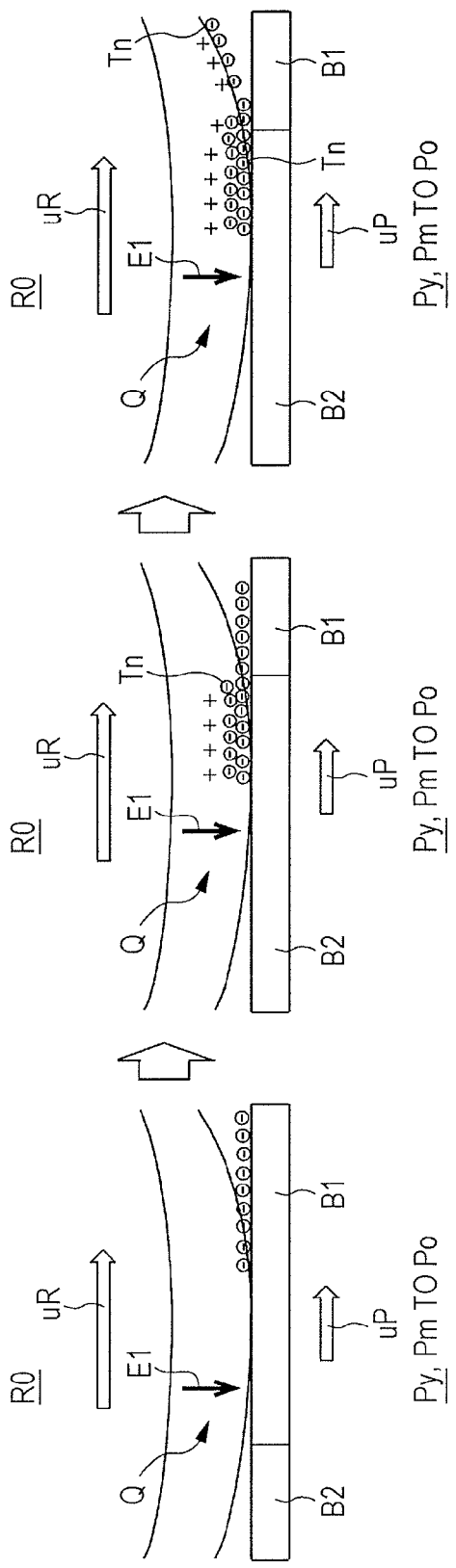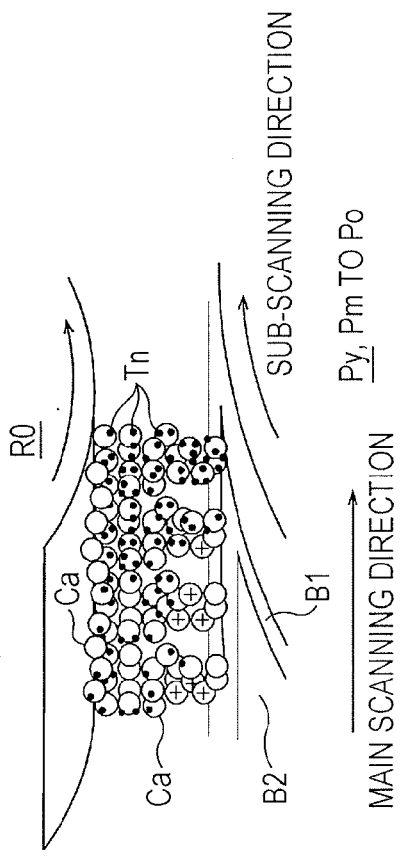

IMAGE PROCESSING APPARATUS, IMAGE FORMING SYSTEM, IMAGE FORMING APPARATUS, AND IMAGE PROCESSING METHOD FOR CORRECTING DENSITY OF IMAGE INFORMATION

CROSS-REFERENCE TO RELATED APPLICATIONS

This application is based on and claims priority under 35 USC 119 from Japanese Patent Application No. 2014-052511 filed Mar. 14, 2014.

BACKGROUND 1. (i) Technical Field

The present invention relates to an image processing apparatus, an image forming system, an image forming apparatus, and an image processing method.

2. (ii) Related Art

An image forming apparatus of the related art generates a control signal for each member arranged to write an image in accordance with image information read by a reading member or in accordance with image information transmitted from an information processing device.

SUMMARY

According to an aspect of the invention, there is provided an image processing apparatus including an acquisition unit, a first detection unit, a first determination unit, a second detection unit, a second determination unit, a correction unit, and a transmitting unit. The acquisition unit acquires image information having multiple pixels, each pixel having density information. The first detection unit detects sub-scanning-direction boundary pixels in accordance with the image information. The sub-scanning-direction boundary pixels are located on a boundary extending in a density change direction from a high-density pixel area to a low-density pixel area having a density lower than the high-density pixel area in a preset sub-scanning direction. The first determination unit determines whether or not a development-related defect occurs in a preset number of pixels downstream of the sub-scanning-direction boundary pixels in the sub-scanning direction, in accordance with the number of pixels in a high-density area located upstream of the sub-scanning-direction boundary pixels in the sub-scanning direction. In a case where a set of sub-scanning-direction boundary pixels among the sub-scanning-direction boundary pixels in which it is determined that a development-related defect occurs is arranged in a main scanning direction, the second detection unit detects an end pixel in the main scanning direction among the set of sub-scanning-direction boundary pixels. The second determination unit determines whether or not each of the set of sub-scanning-direction boundary pixels arranged in the main scanning direction is close to the end pixel in the main scanning direction, by determining whether or not a distance between each of the set of sub-scanning-direction boundary pixels and the end pixel in the main scanning direction is within a preset value. The correction unit corrects a density for the preset number of pixels downstream of the sub-scanning-direction boundary pixels in the sub-scanning direction. The correction unit corrects the image information so that an amount of correction to increase a density for a sub-scanning-direction boundary pixel determined to be close to the end pixel in the main scanning direction among the sub-scanning-direction boundary pixels is smaller than an amount of correction to increase a density for a sub-scanning-direction boundary pixel determined not to be close to the end pixel in the main scanning direction among the sub-scanning-direction boundary pixels. The transmitting unit transmits the image information corrected by the correction unit to an image forming apparatus.

BRIEF DESCRIPTION OF THE DRAWINGS

An exemplary embodiment of the present invention will be described in detail based on the following figures, wherein:

FIG. 7 illustrates an example of the pixel values of pixels in the sub-scanning direction;

FIGS. 8A to 8C illustrate rear-edge correction setting values in the exemplary embodiment of the present invention, in which FIG. 8A illustrates an example of the relationship between the pixel value of the rear edge and the lower limit of the number of target pixels, FIG. 8B illustrates an example of the relationship between the pixel value of the rear edge and the correction value for the rear edge, and FIG. 8C illustrates an example of the relationship between the number of pixels from the rear edge and the correction value;

FIGS. 9A to 9C illustrate middle-edge correction setting values in the exemplary embodiment of the present invention, in which FIG. 9A illustrates an example of the relationship between the pixel value of the middle edge and the number of target pixels, FIG. 9B illustrates an example of the relationship between the pixel value of the middle edge and the correction value for the middle edge, and FIG. 9C illustrates an example of the relationship between the number of pixels from the middle edge and the correction value;

FIGS. 10A to 10C illustrate an end portion in the main scanning direction according to the exemplary embodiment of the present invention, in which FIG. 10A illustrates the setting of a pixel of interest and neighboring pixels, FIG. 10B illustrates an example of image information to be processed, and FIG. 10C illustrates an example of image information to be processed which is different from that in FIG. 10B;

FIGS. 11A to 11D illustrate an example of correction with a changed middle-edge correction value according to the present invention, in which FIG. 11A illustrates the exemplary embodiment of the present invention, FIG. 11B illustrates a modification of the present exemplary embodiment, FIG. 11C illustrates another modification of the present exemplary embodiment different from that in FIG. 11B, and FIG. 11D illustrates still another modification of the present exemplary embodiment different from those in FIG. 11A and FIG. 11B;

FIGS. 12A and 12B illustrate random number generation in the exemplary embodiment of the present invention, in which FIG. 12A illustrates random number generation, and FIG. 12B illustrates random numbers and random number correction values;

FIG. 13 is a flowchart of a main process according to the present exemplary embodiment;

FIG. 22 is a flowchart of a correction value subtraction process in the present exemplary embodiment, and illustrates the sub-routine of ST706 in FIG. 21;

FIGS. 23A to 23H illustrate the operation in the exemplary embodiment of the present invention, in which FIG. 23A illustrates an example of a pixel value of a rear edge before correction in the sub-scanning direction, FIG. 23B illustrates an example of a correction value of a rear edge in the sub-scanning direction, FIG. 23C illustrates an example of a random number correction value of a rear edge in the sub-scanning direction, FIG. 23D illustrates an example of a corrected pixel value of a rear edge in the sub-scanning direction, FIG. 23E illustrates an example of a pixel value of a rear edge before correction in the main scanning direction, FIG. 23F illustrates an example of a correction value of a rear edge in the main scanning direction, FIG. 23G illustrates an example of a random number correction value of a rear edge in the main scanning direction, and FIG. 23H illustrates an example of a corrected pixel value of a rear edge in the main scanning direction;

FIGS. 24A to 24H illustrate the operation in the exemplary embodiment of the present invention, in which FIG. 24A illustrates an example of a pixel value of a middle edge before correction in the sub-scanning direction, FIG. 24B illustrates an example of a correction value of a middle edge in the sub-scanning direction, FIG. 24C illustrates an example of a random number correction value of a middle edge in the sub-scanning direction, FIG. 24D illustrates an example of a corrected pixel value of a middle edge in the sub-scanning direction, FIG. 24E illustrates an example of a pixel value of a middle edge before correction in the main scanning direction, FIG. 24F illustrates an example of correction value of a middle edge in the main scanning direction, FIG. 24G illustrates an example of a random number correction value of a middle edge in the main scanning direction, and FIG. 24H illustrates an example of a corrected pixel value of a middle edge in the main scanning direction;

FIGS. 25A and 25B illustrate an example of development-related defects at boundaries, in which FIG. 25A illustrates a fringing field, and FIG. 25B illustrates toner movement;

FIGS. 26A to 26C illustrate an example of a development-related defect at a boundary, in which FIG. 26A illustrates a developing region in a case where a rear edge is formed, FIG. 26B illustrates a state where a developing roller and a photoconductor drum rotate from the state illustrated in FIG. 26A, and FIG. 26C illustrates a state where the developing roller and the photoconductor drum rotate from the state illustrated in FIG. 26B;

FIGS. 27A and 27B illustrate an example of a development-related defect at a boundary, in which FIG. 27A is a view from a cross section of a developing region, and FIG. 27B illustrates a rear edge in the image portion;

FIGS. 28A to 28C illustrate an example of a development-related defect at a boundary, in which FIG. 28A illustrates a developing region in a case where a rear edge is formed, FIG. 28B illustrates a state where a developing roller and a photoconductor drum rotate from the state illustrated in FIG. 28A, and FIG. 28C illustrates a state where the developing roller and the photoconductor drum rotate from the state illustrated in FIG. 28B;

FIGS. 29A to 29D illustrate the comparison between the operation in the exemplary embodiment of the present invention and the operation in the related art, in which FIG. 29A is a view of image data obtained before defect correction, FIG. 29B is a view obtained when rear-edge correction according to the present exemplary embodiment is performed on the image data illustrated in FIG. 29A and an image is recorded, FIG. 29C is a view obtained when correction of the related art is performed on the image data illustrated in FIG. 29A and an image is recorded, and FIG. 29D is a view obtained when an image is recorded without correction on the image data illustrated in FIG. 29A;

FIGS. 30A to 30C illustrate the operation in the exemplary embodiment of the present invention, in which FIG. 30A illustrates a result of measurement of the lightness of an image on a medium when the image is recorded without correction, FIG. 30B illustrates correction values for the image illustrated in FIG. 30A, and FIG. 30C illustrates measured lightness values of an image on a medium when the image is recorded with correction;

FIGS. 31A to 31D illustrate an example of a development-related defect at a boundary, in which FIG. 31A illustrates a developing region in a case where a middle edge is formed, FIG. 31B illustrates a state where a developing roller and a photoconductor drum rotate from the state illustrated in FIG. 31A, FIG. 31C illustrates a state where the developing roller and the photoconductor drum rotate from the state illustrated in FIG. 31B, and FIG. 31D is a perspective view of the developing region as viewed from upstream in the sub-scanning direction;

FIGS. 32A to 32F illustrate the comparison between the operation in the exemplary embodiment of the present invention and the operation in the related art, in which FIG. 32A is a view of image data obtained before defect correction, FIG. 32B illustrates image data obtained when middle-edge correction according to the present exemplary embodiment is performed on the image data obtained before correction, FIG. 32C illustrates image data obtained when correction of the related art is performed on the image data obtained before correction, FIG. 32D is a view obtained when an image is recorded based on the image data illustrated in FIG. 32A, FIG. 32E is a view obtained when an image is recorded based on the image data illustrated in FIG. 32B, and FIG. 32F is a view obtained when the image data illustrated in FIG. 32C is recorded; and FIGS. 33A and 33B illustrate sensory evaluation of image defects that are based on development-related defects caused on boundaries, in which FIG. 33A illustrates sensory evaluation of a defect area at a rear edge, and FIG. 33B illustrates sensory evaluation of a defect area at a middle edge.

DETAILED DESCRIPTION

Figure 1:
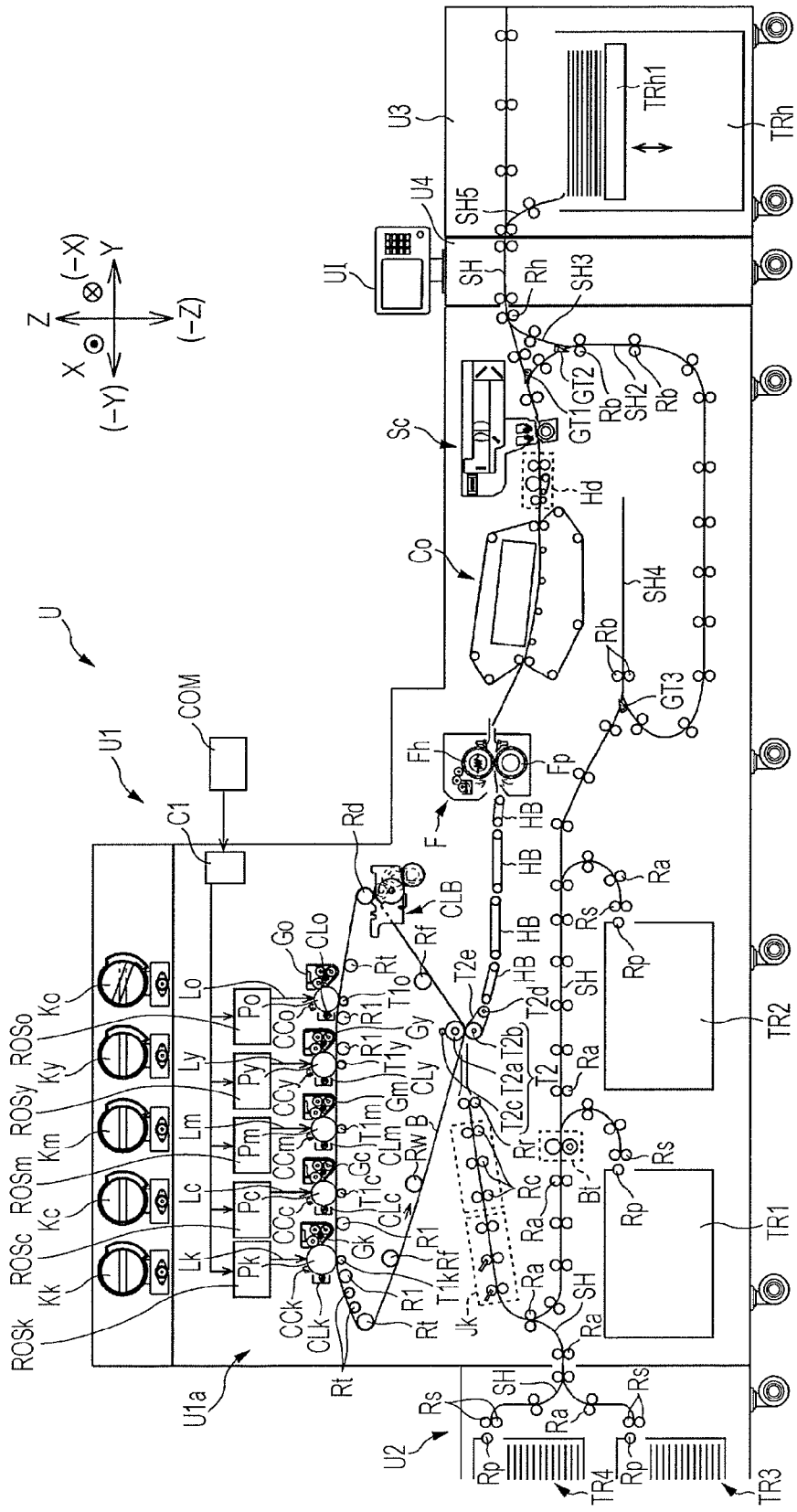
FIG. 1 illustrates an overall view of an image forming apparatus according to an exemplary embodiment of the present invention.

A specific example of an exemplary embodiment of the present invention (hereinafter referred to as an "exemplary embodiment") will be described hereinafter with reference to the drawings. It is to be understood that the present invention is not limited to the following exemplary embodiment.

For ease of understanding of the following description, in the drawings, the front-rear direction is defined as an X-axis direction, the left-right direction as a Y-axis direction, and the up-down direction as a Z-axis direction. Also, the directions indicated by the arrows X, −X, Y, −Y, Z, and −Z are defined as forward, rearward, rightward, leftward, upward, and downward, respectively. In addition, the sides indicated by the arrows X, −X, Y, −Y, Z, and −Z are defined as the front, rear, right, left, upper, and lower sides, respectively.

In the drawings, furthermore, a dot in a circle represents an arrow pointing from the back to the front of the paper, and a cross in a circle represents an arrow pointing from the front to the back of the paper.

In the following description taken in conjunction with the drawings, illustration of members other than those necessary for the description is properly omitted for ease of understanding.

EXEMPLARY EMBODIMENT

Explanation of Overall Configuration of Printer U According to Exemplary Embodiment FIG. 1 illustrates an overall view of an image forming apparatus according to an exemplary embodiment of the present invention.

Figure 2:
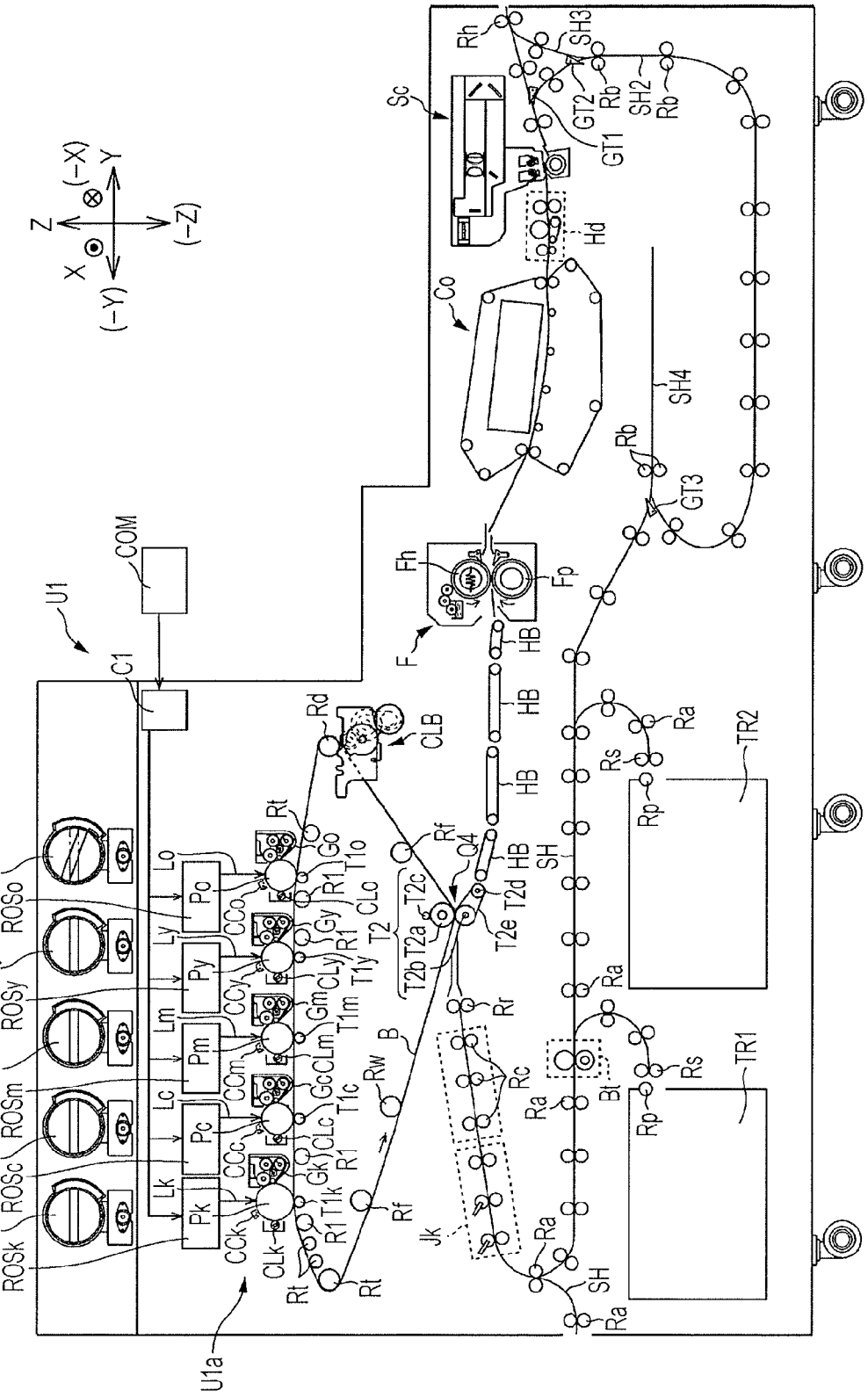
FIG. 2 illustrates a substantial part of the image forming apparatus according to the exemplary embodiment of the present invention.

FIG. 2 illustrates a substantial part of the image forming apparatus according to the exemplary embodiment of the present invention.

In FIG. 1 and FIG. 2, a printer U serving as an example of an image forming apparatus according to the present exemplary embodiment includes a printer main body U1, a feeder unit U2 serving as an example of a supply device that supplies a medium to the printer main body U1, a discharge unit U3 serving as an example of a discharge device to which a medium having an image recorded thereon is discharged, an interface module U4 serving as an example of a connection unit that connects the printer main body U1 and the discharge unit U3 to each other, and an operation unit UI operated by a user.

Explanation of Marking Configuration According to Present Exemplary Embodiment

In FIG. 1 and FIG. 2, the printer main body U1 includes, for example, a controller C1 that controls the printer U, a communication unit (not illustrated) that receives image information transmitted from a print image server COM serving as an example of an information transmitting device connected to the outside of the printer U via a dedicated cable (not illustrated), and a marking unit U1a serving as an example of an image recording unit that records an image on a medium. A personal computer PC is connected to the print image server COM through a cable or a line such as a local area network (LAN). The personal computer PC serves as an example of an image transmitting device from which information on an image to be printed by the printer U is transmitted.

The marking unit U1a includes photoconductor drums Py, Pm, Pc, and Pk for respective colors, where Y stands for yellow, M stands for magenta, C stands for cyan, and K stands for black, each serving as an example of an image bearing member, and a photoconductor drum Po to add a glossy effect to an image such as a photographic image when printing the image, where O stands for overcoat. Each of the photoconductor drums Py, Pm, Pc, Pk, and Po has a surface made of a photosensitive dielectric material. In the following, the suffixes y, m, c, k, and o added to each component, as in the photoconductor drums Py, Pm, Pc, Pk, and Po, may also be referred to simply as "y to o", as in the "photoconductor drums Py to Po". In the following, furthermore, the term "Y to O colors" is used to include yellow (Y), magenta (M), cyan (C), black (K), and overcoat (O).

In FIG. 1 and FIG. 2, a charger CCk, an exposure device ROSk serving as an example of a latent image forming device, a developing device Gk, a first transfer roller I1k serving as an example of a first transfer unit, and a photoconductor cleaner CLk serving as an example of an image bearing member cleaner are arranged around the photoconductor drum Pk for black in the rotation direction of the photoconductor drum Pk.

Likewise, chargers CCy, CCm, CCc, and CCo, exposure devices ROSy, ROSm, ROSc, and ROSo, developing devices Gy, Gm, Gc, and Go, first transfer rollers T1y, T1m, T1c, and T1o, and photoconductor cleaners CLy, CLm, CLc, and CLo are also arranged around the other photoconductor drums Py, Pm, Pc, and Po, respectively.

Toner cartridges Ky, Km, Kc, Kk, and Ko, each serving as an example of a container for storage, are removably supported above the marking unit U1a. The toner cartridges Ky, Km, Kc, Kk, and Ko store developer to be supplied to the developing devices Gy, Gm, Gc, Gk, and Go, respectively.

An intermediate transfer belt B is arranged below the photoconductor drums Py to Po. The intermediate transfer belt B is an example of an intermediate transfer body, and serves as an example of an image bearing member. The intermediate transfer belt B is held between the photoconductor drums Py to Po and the first transfer rollers T1y to T1o. The rear surface of the intermediate transfer belt B is supported by a drive roller Rd serving as an example of a driving member, tension rollers Rt each serving as an example of a tension applying member, a walking roller Rw serving as an example of an anti-meandering member, multiple idler rollers Rf each serving as an example of a driven member, a back-up roller T2a serving as an example of a counter member for second transfer, multiple retract rollers R1 each serving as an example of a movable member, and the first transfer rollers T1y to T1o.

The intermediate transfer belt B has a belt cleaner CLB arranged on a front surface thereof near the drive roller Rd. The belt cleaner CLB serves as an example of an intermediate transfer body cleaner.

The back-up roller T2a faces a second transfer roller T2b, which serves as an example of a second transfer member, with the intermediate transfer belt B held therebetween. The back-up roller T2a is further in contact with a contact roller T2c serving as an example of a contact member to apply a voltage having a polarity opposite to the charging polarity of the developer to the back-up roller T2a. In the present exemplary embodiment, a transport belt T2e serving as an example of a transport member is stretched between the second transfer roller T2b and a driving roller T2d serving as an example of a driving member located lower right.

The back-up roller T2a, the second transfer roller T2b, and the contact roller T2c form a second transfer unit T2 according to the present exemplary embodiment. The first transfer rollers T1y to T1o, the intermediate transfer belt B, the second transfer unit T2, and so forth form a transfer device T1/B/T2 according to the present exemplary embodiment.

Paper feed trays TR1 and TR2 are disposed below the second transfer unit T2. Each of the paper feed trays TR1 and TR2 serves as an example of an accommodation unit that accommodates recording sheets S serving as an example of media. A pickup roller Rp serving as an example of a pickup member and a pair of separation rollers Rs serving as an example of a separation member are located obliquely right above each of the paper feed trays TR1 and TR2. A transport path SH along which recording sheets S are transported extends from the pair of separation rollers Rs. Multiple transport rollers Ra, each serving as an example of a transport member that transports recording sheets S to the downstream side, are arranged along the transport path SH.

A burr removal device Bt serving as an example of an unnecessary object removing device is arranged downstream of the point at which two transport paths SH extending from the paper feed trays TR1 and TR2 meet in the transport direction of recording sheets S. The burr removal device Bt has a pair of rollers, and transports a recording sheet S to the downstream side while pressing the recording sheet S between the rollers with a preset force to remove unnecessary objects, called burrs, from edges of the recording sheet S.

A multi-feeding sensing device Jk is arranged downstream of the burr removal device Bt. The multi-feeding sensing device Jk is configured to sense the overlapping of multiple recording sheets S, or multi-feeding, by measuring the thickness of the recording sheet or sheets S traveling therethrough. Pairs of correction rollers Rc, each serving as an example of a posture correction device, are arranged downstream of the multi-feeding sensing device Jk. The pairs of correction rollers Rc correct an inclination of a recording sheet S in the transport direction of the recording sheet S, called a skew. A pair of registration rollers Rr serving as an example of an adjustment member for adjusting the timing at which a recording sheet S is transported to the second transfer unit T2 is arranged downstream of the pairs of correction rollers Rc.

The feeder unit U2 also includes paper feed trays TR3 and TR4 having a similar configuration to the paper feed trays TR1 and TR2, pickup rollers Rp, pairs of separation rollers Rs, and transport rollers Ra having a similar configuration to the counterparts. Transport paths SH extending from the paper feed trays TR3 and TR4 merge with the transport path SH extending in the printer main body U1 on the upstream side of the multi-feeding sensing device Jk.

Multiple transport belts HB are arranged downstream of the transport belt T2e in the transport direction of recording sheets S to transport a recording sheet S to the downstream side while carrying the recording sheet S on a surface thereof.

A fixing device F is arranged downstream of the transport belts HB in the transport direction of recording sheets S.

A cooling device Co is arranged downstream of the fixing device F to cool a recording sheet S.

A decurler Hd is arranged downstream of the cooling device Co to apply a pressure to a recording sheet S to correct a curl of the recording sheet S.

An image reading device Sc is arranged downstream of the decurler Hd to read an image recorded on a recording sheet S.

A sheet reversing path SH2 is provided downstream of the image reading device Sc. The sheet reversing path SH2 serves as an example of a transport path that branches off from the transport path SH extending toward the interface module U4.

A first gate GT1 serving as an example of a transport direction switching member is arranged in the branch portion of the sheet reversing path SH2.

Multiple pairs of switchback rollers Rb, each serving as an example of a transport member that is rotatable in forward and reverse directions, are arranged along the sheet reversing path SH2. A connection path SH3 is provided upstream of the pairs of switchback rollers Rb. The connection path SH3 serves as an example of a transport path that branches off from an upstream portion of the sheet reversing path SH2 and that merges with the transport path SH at a point downstream from the branch portion of the sheet reversing path SH2 from the transport path SH. A second gate GT2 serving as an example of a transport direction switching member is arranged in the branch portion between the sheet reversing path SH2 and the connection path SH3.

A folding path SH4 is arranged downstream of the sheet reversing path SH2 below the cooling device Co to reverse the transport direction of recording sheets S to allow a recording sheet S to "switch back".

A pair of switchback rollers Rb serving as an example of a transport member that is rotatable in forward and reverse directions is also arranged in the folding path SH4. In addition, a third gate GT3 serving as an example of a transport direction switching member is arranged at the entrance of the folding path SH4.

A transport path SH downstream of the folding path SH4 merges with the transport paths SH extending from the paper feed trays TR1 and TR2.

The interface module U4 has a transport path SH formed therein extending toward the discharge unit U3.

The discharge unit U3 includes a stacker tray TRh and a discharge path SH5. The stacker tray TRh serves as an example of a sheet stacking container in which discharged recording sheets S are stacked. The discharge path SH5 branches off from the transport path SH, and extends to the stacker tray TRh. In the present exemplary embodiment, the transport path SH is configured to allow a recording sheet S to be transported to any device attached rightward to the discharge unit U3 if an additional discharge unit or post-processing device (not illustrated) is attached to the discharge unit U3.

Marking Operation

In the printer U, when image information transmitted from the personal computer PC is received via the print image server COM, a job that is an operation to form an image is started. When the job is started, the photoconductor drums Py to Po, the intermediate transfer belt B, and so forth are rotated.

The photoconductor drums Py to Po are driven to rotate by a drive source (not illustrated).

The chargers CCy to CCo are applied with a preset voltage to charge the surfaces of the photoconductor drums Py to Po.

The exposure devices ROSy to ROSo output laser beams Ly, Lm, Lc, Lk, and Lo, respectively, each serving as an example of a light beam with which a latent image is written, in accordance with a control signal from the controller C1 to write electrostatic latent images on the charged surfaces of the photoconductor drums Py to Po.

The developing devices Gy to Go develop the electrostatic latent images on the surfaces of the photoconductor drums Py to Po into visible images, respectively.

The toner cartridges Ky to Ko are replenished with developer when the developer in the toner cartridges Ky to Ko is used up in the developing operation of the developing devices Gy to Go.

The first transfer rollers T1y to T1o are applied with a first transfer voltage having a polarity opposite to the charging polarity of the developer, and transfer the visible images on the surfaces of the photoconductor drums Py to Po onto a surface of the intermediate transfer belt B.

The photoconductor cleaners CLy to CLo remove any remaining developer to clean the surfaces of the photoconductor drums Py to Po, respectively, after the first transfer operation has been carried out.

As a result of the intermediate transfer belt B traveling through a first transfer region that faces the photoconductor drums Py to Po, images are transferred and stacked on one another on the intermediate transfer belt B in the order of O, Y, M, C, and K, and then travel through a second transfer region Q4 that faces the second transfer unit T2. In the case of a single-color image, an image of only one color is transferred and is fed to the second transfer region Q4.

Each of the pickup rollers Rp feeds a recording sheet S from the corresponding one of the paper feed trays TR1 to TR4, from which the recording sheet S is supplied, in accordance with received information, such as the amount of image information or the designation of a recording sheet S, and the size, type, and the like of the accommodated recording sheet S.

The pair of separation rollers Rs separates and feeds recording sheets S fed by the pickup roller Rp one-by-one.

The burr removal device Bt applies a preset pressure to the recording sheet S traveling therethrough to remove burrs.

The multi-feeding sensing device Jk senses the thickness of the recording sheet or sheets S traveling therethrough to sense multi-feeding of recording sheets S.

The pairs of correction rollers Rc bring the recording sheet S traveling therethrough into contact with a wall surface (not illustrated) to correct skew.

The pair of registration rollers Rr feeds the recording sheet S at the time when the image on the surface of the intermediate transfer belt B is fed to the second transfer region Q4.

In the second transfer unit T2, the back-up roller T2a is applied with a second transfer voltage having the same polarity as a preset charging polarity of the developer via the contact roller T2c, and the image on the intermediate transfer belt B is transferred onto the recording sheet S.

The belt cleaner CLB removes any remaining developer to clean the surface of the intermediate transfer belt B after the image has been transferred in the second transfer region Q4.

The transport belts T2e and HB transport the recording sheet S onto which the image has been transferred by the second transfer unit T2 to the downstream side while carrying the recording sheet S on a surface thereof.

The fixing device F includes a heating roller Fh serving as an example of a heating member, and a pressure roller Fp serving as an example of a pressure member. The heating roller Fh accommodates a heater serving as an example of a heat source. The fixing device F applies heat to the recording sheet S traveling through a region where the heating roller Fh and the pressure roller Fp are in contact with each other, while applying pressure to the recording sheet S to fix an unfixed image on the surface of the recording sheet S.

The cooling device Co cools the recording sheet S heated by the fixing device F.

The decurler Hd applies pressure to the recording sheet S that has traveled through the cooling device Co to remove a curl of the recording sheet S.

The image reading device Sc reads an image on the surface of the recording sheet S that has traveled through the decurler Hd.

In a case where two-sided or duplex printing is performed, the first gate GT1 is activated, and the recording sheet S that has traveled through the decurler Hd is transported to the sheet reversing path SH2. Then, the recording sheet S is caused to switch back in the folding path SH4, and is re-fed to the pair of registration rollers Rr along the transport path SH to undergo printing on its second side.

The recording sheet S to be discharged to the stacker tray TRh is transported along the transport path SH, and is discharged to the stacker tray TRh. If the recording sheet S is discharged to the stacker tray TRh in such a manner that the recording sheet S is upside down, the recording sheet S once enters the sheet reversing path SH2 from the transport path SH. After the trailing end of the recording sheet S in its transport direction has passed the second gate GT2, the second gate GT2 changes over and the pairs of switchback rollers Rb rotate in the reverse direction, allowing the recording sheet S to be transported along the connection path SH3 to the stacker tray TRh.

The stacker tray TRh has a sheet stacking plate TRhl onto which the recording sheet S is placed. The sheet stacking plate TRhl automatically moves up and down in accordance with the weight of the recording sheets S placed thereon so that the surface of the topmost sheet is kept at a preset height.

Description of Marking Unit U1a According to Present Exemplary Embodiment

Figure 3:
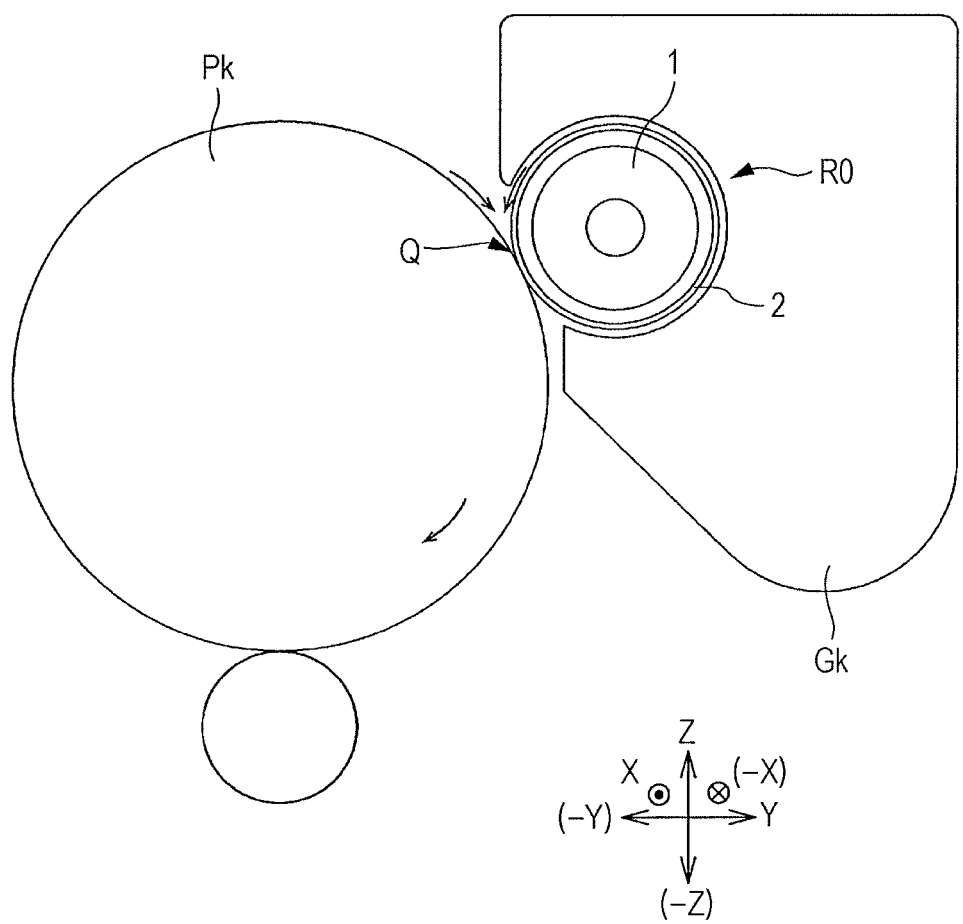
FIG. 3 is an enlarged view of a substantial part of a marking unit according to the exemplary embodiment of the present invention.

FIG. 3 is an enlarged view of a substantial part of the marking unit according to the exemplary embodiment of the present invention.

In FIG. 3, the developing device Gk for black has a developing roller R0 serving as an example of a developer bearing member. The developing roller R0 faces the photoconductor drum Pk serving as an example of an image bearing member. Thus, a developing region Q serving as an example of a counter region is defined between the photoconductor drum Pk and the developing roller R0. The developing roller R0 has a magnet roller 1 serving as an example of a magnet member. The magnet roller 1 extends along the photoconductor drum Pk. Further, the magnet roller 1 is fixedly supported. A developing sleeve 2 as an example of a cylindrical member is rotatably supported around the magnet roller 1. In the present exemplary embodiment, by way of example, the developing sleeve 2 rotates in the same direction as the rotation direction of the photoconductor drum Pk in the developing region Q. In the present exemplary embodiment, furthermore, by way of example, the surface speed of the developing sleeve 2 is set higher than the surface speed of the photoconductor drum Pk. This facilitates faster supply of the developer. In the present exemplary embodiment, a two-component developer containing toner and carrier is used as an example of developer. The other developing devices Gy, Gm, Gc, and Go also have a similar configuration to the developing device Gk for black, and are not thus described.

Description of Controller C1 According to Present Exemplary Embodiment

Figure 4:
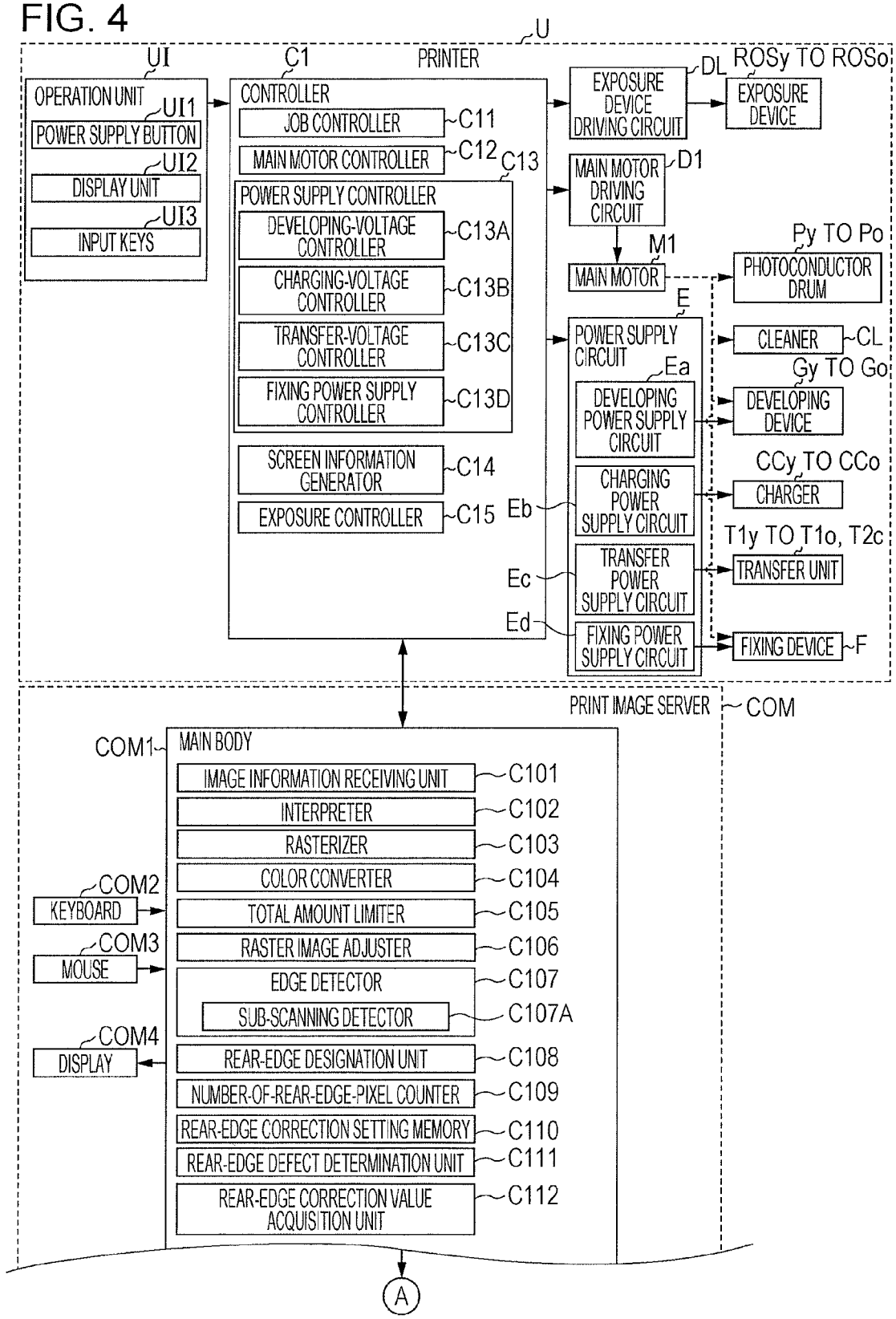
FIG. 4 is a functional block diagram of functions of the image forming apparatus and a controller of a print image server according to the exemplary embodiment of the present invention.

FIG. 4 is a functional block diagram of the image forming apparatus and the controller of the print image server according to the exemplary embodiment of the present invention.

Figure 5:
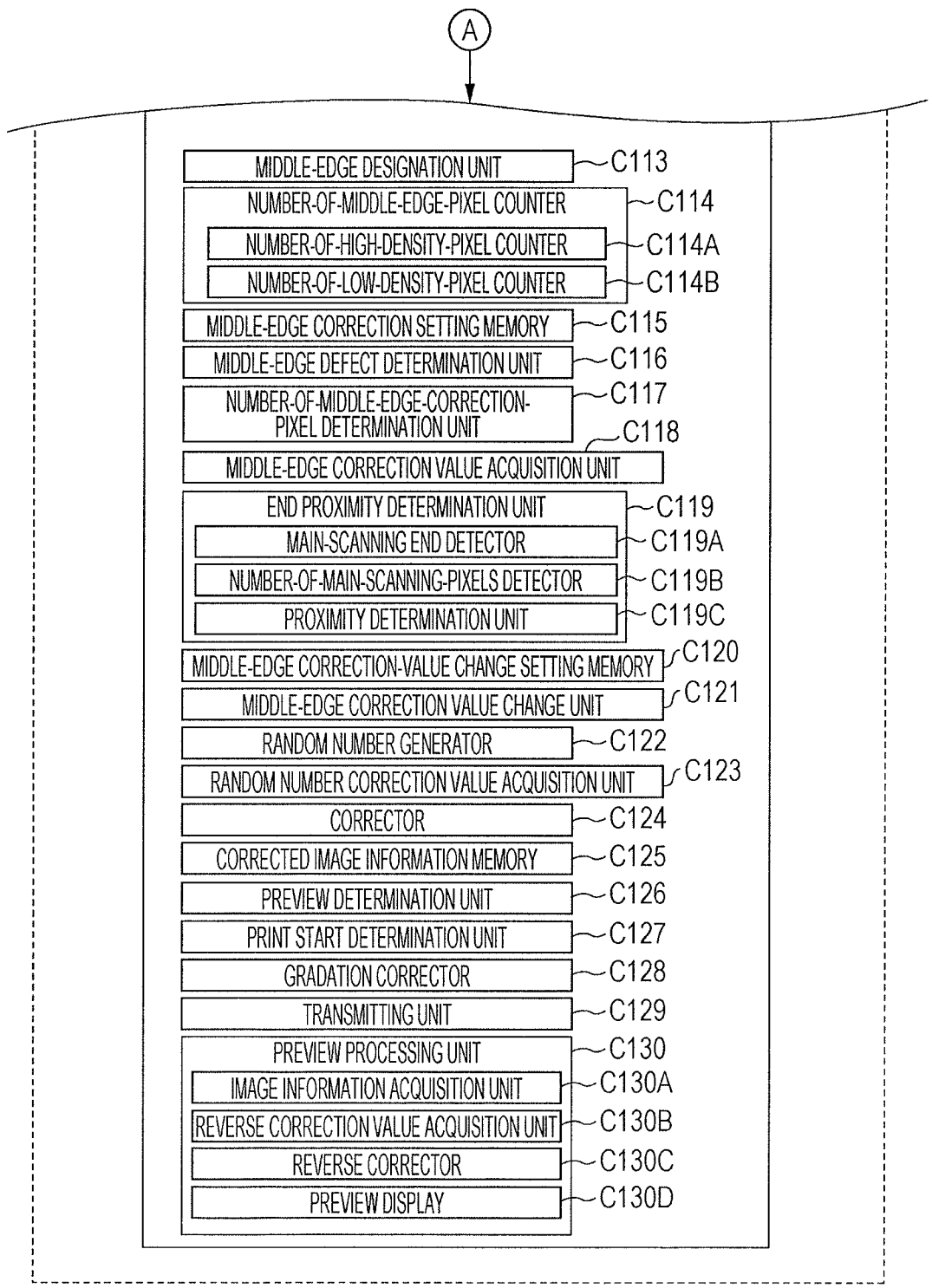
FIG. 5 is a functional block diagram of functions of the image forming apparatus and the controller of the print image server according to the exemplary embodiment of the present invention, and is a continued view in FIG. 4.

FIG. 5 is a functional block diagram of the image forming apparatus and the controller of the print image server according to the exemplary embodiment of the present invention, and is a continued view in FIG. 4.

In FIG. 4 and FIG. 5, the controller C1 of the printer U according to the present exemplary embodiment is composed of a small information processing device, or a microcomputer, and includes, for example, an input/output (I/O) unit for input and output of signals from and to external devices, adjustment of the input/output signal level, and so forth, a read-only memory (ROM) serving as an example of a storage medium that stores a program to execute necessary processing, data, and the like, a random access memory (RAM) for temporarily storing necessary data, a hard disk drive (HDD), a central processing unit (CPU) for performing processing in accordance with the program stored in the ROM, the RAM, the HDD, or the like, and a clock oscillator. The controller C1 is configured to execute the program stored in the ROM or the like to implement a variety of functions.

Signal Input Element Connected to Controller C1

The controller C1 receives, as input, an output signal from a signal output element such as the operation unit UI.

The operation unit UI includes, for example, a power supply button UI1 serving as an example of a power-on unit that turns on or off the power of the printer U, a display unit UI2, and various input keys UI3 serving as an example of directional input buttons, examples of which include an arrow key.

Controlled Elements Connected to Controller C1

The controller C1 outputs control signals for the following controlled elements DL, D1, and E.

DL: Exposure Device Driving Circuit

An exposure device driving circuit DL controls the exposure devices ROSy to ROSo to form latent images on the surfaces of the photoconductor drums Py to Po, respectively.

D1: Main Motor Driving Circuit

A main motor driving circuit D1 serving as an example of a driving circuit for a main drive source drives a main motor M1 serving as an example of a main drive source to drive the rotation of the photoconductor drums Py to Po and the like.

E: Power Supply Circuit

A power supply circuit E includes, for example, a developing power supply circuit Ea, a charging power supply circuit Eb, a transfer power supply circuit Ec, and a fixing power supply circuit Ed.

Ea: Developing Power Supply Circuit

The developing power supply circuit Ea applies a developing voltage to the developing rollers R0 of the developing devices Gy to Go.

Eb: Charging Power Supply Circuit

The charging power supply circuit Eb applies a charging voltage to the chargers CCy to CCo to charge the surfaces of the photoconductor drums Py to Po.

Ec: Transfer Power Supply Circuit

The transfer power supply circuit Ec applies a first transfer voltage to the first transfer rollers T1y to T1o, and applies a second transfer voltage to the contact roller T2c of the second transfer unit T2.

Ed: Fixing Power Supply Circuit

The fixing power supply circuit Ed supplies power to the heating roller Fh of the fixing device F to activate the heater.

Functions of Controller C1 of Printer U

The controller C1 of the printer U has a function to execute processing in accordance with an input signal from the signal output element described above and to output a control signal to each of the controlled elements described above. That is, the controller C1 has the following functions.

C11: Job Controller

A job controller C11 serving as an example of an image forming controller controls the operation of the photoconductor drums Py to Po, the exposure devices ROSy to ROSo, the chargers CCy to CCo, the fixing device F, and so forth in accordance with received image information to execute a job serving as an example of an operation to form an image.

C12: Main Motor Controller

A main motor controller C12 serving as an example of a main drive source controller controls the driving of the main motor M1 via the main motor driving circuit D1 to control the driving of the photoconductor drums Py to Po, the developing devices Gy to Go, the heating roller Fh of the fixing device F, a pair of discharge rollers Rh, and so forth.

C13: Power Supply Controller

A power supply controller C13 includes a developing-voltage controller C13A, a charging-voltage controller C13B, a transfer-voltage controller C13C, and a fixing power supply controller C13D. The power supply controller C13 controls the activation of the power supply circuit E to control voltage or power supply to each member.

C13A: Developing-Voltage Controller

The developing-voltage controller C13A controls the developing power supply circuit Ea to control the application of a developing voltage to the developing devices Gy to Go.

C13B: Charging-Voltage Controller

The charging voltage controller C13B controls the charging power supply circuit Eb to control the application of a charging voltage to the chargers CCy to CCo.

C13C: Transfer-Voltage Controller

The transfer-voltage controller C13C controls the transfer power supply circuit Ec to control the transfer voltage to be applied to the first transfer rollers T1y to T1o and the like.

C13D: Fixing Power Supply Controller

The fixing power supply controller C13D controls the fixing power supply circuit Ed to control the turning on/off of the fixing device F to control the fixing temperature.

C14: Screen Information Generator

A screen information generator C14 serving as an example of a creation unit that creates print information generates screen information in accordance with image information received from the print image server COM. The screen information serves as an example of print information, and is information expanded into binary pixel information.

C15: Exposure Controller

An exposure controller C15 controls the exposure device driving circuit DL in accordance with the screen information to drive the exposure devices ROSy to ROSo to form latent images on the surfaces of the photoconductor drums Py to Po.

Description of Functions of Print Image Server COM

In FIG. 4 and FIG. 5, the print image server COM according to the present exemplary embodiment has a main body COM1 which is composed of an information processing device, or a personal computer. The main body COM1 includes, for example, an I/O unit for input and output of signals from and to external devices, adjustment of the input/output signal level, and so forth, a ROM serving as an example of a storage medium that stores a program to execute necessary processing, data, and the like, a RAM for temporarily storing necessary data, an HDD, a CPU for performing processing in accordance with the program stored in the ROM, the RAM, the HDD, or the like, and a clock oscillator. The main body COM1 is configured to execute the program stored in the ROM or the like to implement a variety of functions.

Signal Input Elements Connected to Main Body COM1

The main body COM1 of the print image server COM receives, as input, an output signal from a signal output element such as a keyboard COM2 or a mouse COM3, which serves as an example of an input member. In the present exemplary embodiment, the main body COM1 also receives, as input, an output signal from the printer U.

Controlled Element Connected to Main Body COM1

The main body COM1 of the print image server COM outputs a control signal to a display COM4 serving as an example of a display unit, which is a controlled element. In the present exemplary embodiment, the main body COM1 further outputs a signal to the printer U electrically connected via a line such as a cable.

Functions of Main Body COM1 of Print Image Server COM
C101: Image Information Receiving Unit An image information receiving unit C101 receives page description language (PDL) data as an example of image information transmitted from an external personal computer PC.

C102: Interpreter

An interpreter C102 interprets the position, shape, color, and the like of text or an image to be printed, by using the received PDL data.

C103: Rasterizer

A rasterizer C103, which is an example of an acquisition unit that acquires image information and serves as an example of a pixel image generator, generates a raster image in accordance with interpretation of the PDL data. The raster image serves as an example of first image information having multiple pixels, each pixel having density information. The rasterizer C103 according to the present exemplary embodiment generates a raster image for each of red (R), green (G), and blue (B). In the present exemplary embodiment, each raster image includes multi-valued information per pixel. By way of example, the rasterizer C103 generates a raster image having 8 bits per pixel, that is, 256 gradation levels per pixel.

C104: Color Converter

A color converter C104 converts the RGB color space to the YMCKO color space, which supports the colors corresponding to the developing devices Gy to Go of the printer U, and converts the RGB raster images to YMCKO raster images. In the present exemplary embodiment, the color converter C104 converts the RGB raster images to respective raster images for the Y to O colors in accordance with preset color correspondence information.

C105: Total Amount Limiter

A total amount limiter C105 serving as an example of a color converter for limiting the total amount of developer converts colors so that the total amount of toner per pixel is limited when an image is printed on a recording sheet S. In the present exemplary embodiment, the total amount limiter C105 converts the pixel value of each pixel of a raster image in accordance with preset color correspondence information so as not to affect the color reproducibility. For example, in a case where the pixel values for yellow (Y), magenta (M), and cyan (C) are equal, the corresponding pixel values are reduced for Y, M, and C and increased for black (K). That is, the process called under color removal is available to limit the total amount. The total amount is limited using a well-known technique, a description of which is not given here.

C106: Raster Image Adjuster

A raster image adjuster C106 serving as an example of a pixel image adjuster performs sharpness correction and gamma (γ) correction, which are examples of pixel image adjustment. Accordingly, the pixel values of the pixels of each of the raster images for the Y to O colors are adjusted.

Figure 6:
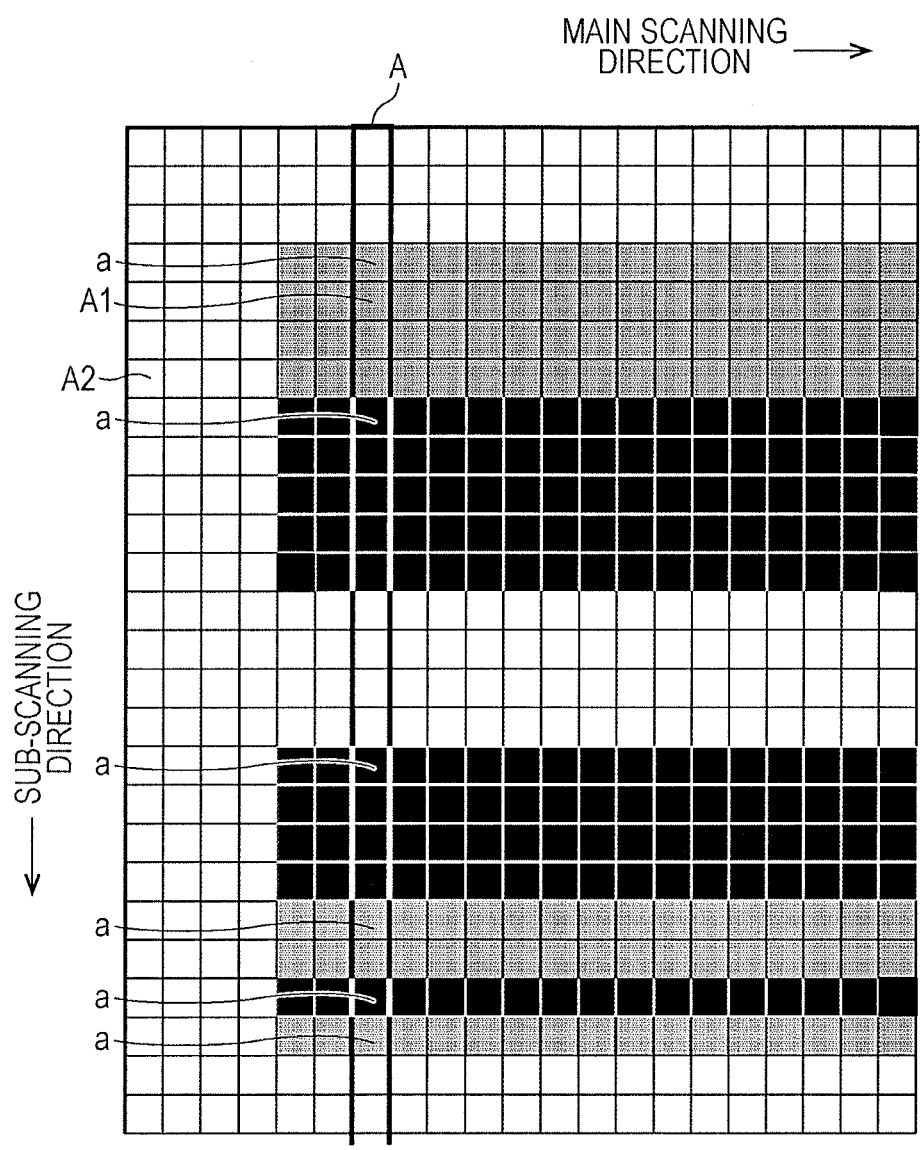
FIG. 6 illustrates an example of a raster image in the exemplary embodiment of the present invention.

FIG. 6 illustrates an example of a raster image in the exemplary embodiment of the present invention.

FIG. 7 illustrates an example of the pixel values of pixels in the sub-scanning direction.

C107: Edge Detector

An edge detector C107 serving as an example of a boundary detector includes a sub-scanning detector C107A. The edge detector C107 detects a boundary between image areas having different densities. In the present exemplary embodiment, the edge detector C107 detects a boundary in each of the raster images for the Y to O colors, which serves as an example of image information, in accordance with pixel values serving as an example of density information. That is, the edge detector C107 according to the present exemplary embodiment detects a boundary between pixels having different densities within a pixel group having multiple pixels.

Note that the edge detector C107 and the following units and devices C108 to C124 and C130A to C130C perform processing for each of the Y to O colors. In the following, the processing performed by the units and devices C107 to C124 and C130A to C130C will be described only for yellow (Y), and the processing for the other colors, that is, magenta (M), cyan (C), black (K), and overcoat (O) will not be described.

C107A: Sub-Scanning Detector

The sub-scanning detector C107A, which serves as an example of a sub-scanning-direction boundary detector, detects, on a raster image, boundary pixels among pixels having different densities in a sub-scanning direction corresponding to the rotation direction of the developing roller R0. The sub-scanning detector C107A detects a sub-scanning edge a, which serves as an example of a boundary pixel, in accordance with whether or not a density change occurs, by a preset value or more, over a preset number of pixels within an array of pixels arranged in the sub-scanning direction. In the present exemplary embodiment, the preset number of pixels is two, by way of example. In addition, the preset value is a threshold value Z0, by way of example. Specifically, in FIG. 6 and FIG. 7, the sub-scanning detector C107A performs processing for each sub-scanning pixel array A serving as an example of an array of pixels arranged in the sub-scanning direction.

Specifically, the sub-scanning detector C107A selects a pixel A1 in the sub-scanning pixel array A. Then, the sub-scanning detector C107A calculates a difference $\Delta v$ by subtracting the pixel value v of the pixel A1 from the pixel value v of a pixel A2 located adjacent downstream of the pixel A1 in the sub-scanning direction. Then, the sub-scanning detector C107A determines whether or not the magnitude $|\Delta v|$ of the difference $\Delta v$ is greater than or equal to the preset threshold value Z0. If the difference $|\Delta v|$ is greater than or equal to the preset threshold value Z0, the sub-scanning detector C107A detects the downstream pixel A2 as a sub-scanning edge a. When the detection of all the pixels in the sub-scanning pixel array A is completed, the sub-scanning detector C107A detects a sub-scanning pixel array A that is shifted by one pixel in the main scanning direction. Likewise, the sub-scanning detector C107A detects sub-scanning edges a for all the sub-scanning pixel arrays A. In the present exemplary embodiment, the threshold value Z0 is set to a value that makes a boundary between a non-image portion and an image portion detectable. In the present exemplary embodiment, the threshold value Z0 is set in advance based on the difference between a dot area that is difficult to reproduce by the printer U and a minimum dot area reproducible by the printer U.

C108: Rear-Edge Designation Unit

A rear-edge designation unit C108 is an example of a detection unit that detects sub-scanning-direction boundary pixels located on the boundary extending in a density change direction from a low-density pixel area to a high-density pixel area, and serves as an example of a first boundary detector. The rear-edge designation unit C108 designates, based on a raster image, sub-scanning-direction boundary pixels located on the boundary extending in a density change direction from a low-density pixel area having a density less than or equal to a preset value to a high-density pixel area having a density higher than the low-density pixel area in the sub-scanning direction. The rear-edge designation unit C108 according to the present exemplary embodiment designates, as a rear edge a1, a sub-scanning edge a in a portion extending in a density change direction from a pixel area corresponding to a non-image portion serving as an example of a low-density pixel area to a pixel area corresponding to an image portion serving as an example of a high-density pixel area. Specifically, referring to FIG. 7, when a sub-scanning edge a is detected, the rear-edge designation unit C108 in the present exemplary embodiment acquires the pixel value v of a pixel located adjacent upstream of the sub-scanning edge a. Then, the rear-edge designation unit C108 determines whether or not the pixel value v of the pixel upstream of the sub-scanning edge a is less than a preset threshold value Z1. If the pixel value v of the pixel upstream of the sub-scanning edge a is less than the threshold value Z1, the rear-edge designation unit C108 designates the detected sub-scanning edge a as a rear edge a1. The threshold value Z1 is set in advance so as to correspond to a pixel value in a dot area that is difficult to reproduce by the printer U. In the present exemplary embodiment, the sub-scanning direction on a raster image also corresponds to the rotation direction of the photoconductor drum Py. Thus, in a case where a portion corresponding to the rear edge a1 is recorded on a recording sheet S by the printer U, the portion is also located at the rear in the sheet transport direction on the recording sheet S.

C109: Number-of-Rear-Edge-Pixel Counter

A number-of-rear-edge-pixel counter C109 serving as an example of a sub-scanning-direction rear-edge image width counter determines the number of pixels n in an image portion downstream of a rear edge a1 in the sub-scanning direction. In FIG. 6 and FIG. 7, when a rear edge a1 is designated, the number-of-rear-edge-pixel counter C109 according to the present exemplary embodiment determines the number of consecutive pixels n downstream of the rear edge a1 whose pixel values v are greater than or equal to the threshold value Z1.

Figure 8A:
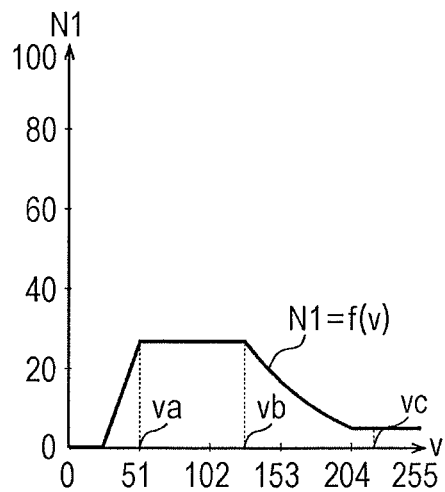
Figure 8B:
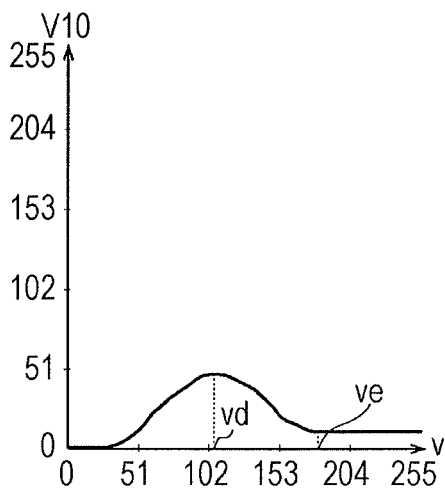
Figure 8C:
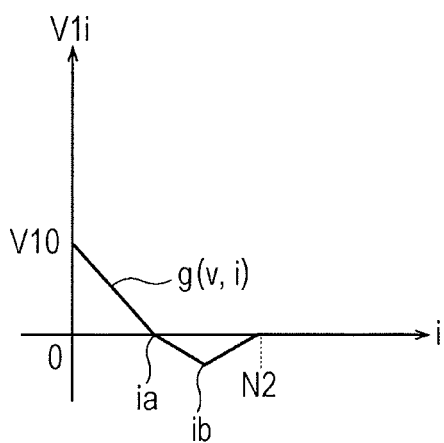

FIGS. 8A to 8C illustrate rear-edge correction setting values in the exemplary embodiment of the present invention. FIG. 8A illustrates an example of the relationship between the pixel value of the rear edge and the lower limit of the number of target pixels. FIG. 8B illustrates an example of the relationship between the pixel value of the rear edge and the correction value for the rear edge. FIG. 8C illustrates an example of the relationship between the number of pixels from the rear edge and the correction value.

C110: Rear-Edge Correction Setting Memory

A rear-edge correction setting memory C110, which is an example of a correspondence information memory and serves as an example of a sub-scanning-direction rear-edge correction setting value memory, stores correction setting values N1, N2, and V1$i$ for density correction with reference to a rear edge a1. The rear-edge correction setting memory C110 stores the number of target pixels N2 serving as an example of the number of preset pixels to be corrected which are located downstream from the rear edge a1 in the sub-scanning direction. The rear-edge correction setting memory C110 also stores correspondence information in which a positive correction value V1$i$ (>0) serving as an example of the amount of correction to increase density is associated with the upstream portion in the range of the number of target pixels N2 and in which a negative correction value V1$i$ (<0) serving as an example of the amount of correction to reduce density is associated with the downstream portion in the range of the number of target pixels N2. The rear-edge correction setting memory C110 according to the present exemplary embodiment also stores the lower limit of the number of target pixels N1 to be corrected.

The rear-edge correction setting memory C110 according to the present exemplary embodiment stores the correction setting values N1, N2, and V1$i$ by using functions f and g serving as an example of correspondence information. Referring to FIG. 8A, the rear-edge correction setting memory C110 stores a correspondence relationship between the pixel value v of the rear edge a1 and the lower limit of the number of target pixels N1 as a function f satisfying N1=f(v). In the function f in the present exemplary embodiment, when the pixel value v is small or large, the lower limit of the number of target pixels N1 is set to be low. That is, in the function f in the present exemplary embodiment illustrated in FIG. 8A for preset pixel values va, vb, and vc (0<va<vb<vc), when the pixel value v is less than the pixel value va, the lower limit value N1 increases with the pixel value v. When the pixel value v ranges from the pixel value va to the pixel value vb, the lower limit value N1 is kept constant even though the pixel value v varies. When the pixel value v ranges from the pixel value vb to the pixel value vc, the lower limit value N1 decreases as the pixel value v increases. When the pixel value v is greater than or equal to the pixel value vc, the lower limit value N1 is equal to a constant value greater than 0 even though the pixel value v varies. That is, in the present exemplary embodiment, when the density at the rear edge a1 is excessively low or high, the lower limit of the number of target pixels N1 is set lower than that when the density is medium.

In FIG. 8B and FIG. 8C, the rear-edge correction setting memory C110 stores a correspondence relationship among the correction value V1$i$, the pixel value v of the rear edge a1, and the number of pixels i by which a pixel is away from the rear edge a1 in the sub-scanning direction as a function g satisfying V1$i$=g(v, i). With regard to the function g in the present exemplary embodiment, a description will first be given of the relationship between the pixel value v and a correction value V10 of the rear edge a1 for i=0. In the function g in the present exemplary embodiment illustrated in FIG. 8B for preset pixel values vd and ve (0<vd<ve), when the pixel value v of the rear edge a1 is close to 0, the correction value V10 of the rear edge a1 is equal to 0. When the pixel value v ranges from 0 to the pixel value vd, the correction value V10 increases with the pixel value v. When the pixel value v ranges from the pixel value vd to the pixel value ve, the correction value V10 decreases as the pixel value v increases. When the pixel value v is greater than or equal to the pixel value ve, the correction value V10 is equal to a constant value greater than 0. That is, in the present exemplary embodiment, when the density at the rear edge a1 is excessively low or high, the correction value V10 of the rear edge a1 is set lower than that when the density is medium. Note that the correction value V10 of the rear edge a1 is greater than or equal to 0.

With regard to the function g, a description will now be given of the relationship between a pixel away from the rear edge a1 by a value i and the correction value V1$i$ of the pixel away from the rear edge a1 by the value i. In the function g in the present exemplary embodiment illustrated in FIG. 8C for the preset numbers of pixels ia and ib (0<ia<ib), as a pixel is away from the rear edge a1 by the value i in the sub-scanning direction, the correction value V1$i$ decreases toward 0. When the value i is equal to the value ia, the correction value V1$i$ is equal to 0. When the value i is greater than the value ia, the correction value V1$i$ is negative, and decreases until the value i is equal to the value ib. The correction value V1$i$ is a minimum when the value i is equal to the value ib, and increases when the value i is greater than the value ib. When the value i is greater than the number of target pixels N2, the correction value V1$i$ is kept constant at 0. The function g is determined and set in advance. In FIG. 8C, the value ia at which the transition between a positive correction value V1$i$ (>0) and a negative correction value V1$i$ (<0) occurs is set in advance in accordance with determined factors such as the resistance of carrier in the developer and the configuration of the printer main body U1.

C111: Rear-Edge Defect Determination Unit

A rear-edge defect determination unit C111 is an example of a determination unit that determines whether or not image quality non-uniformities caused by toner development (hereinafter referred to as "development-related defects") occur on the downstream side of the rear edge a1, and serves as an example of a sub-scanning-direction rear-edge development-related defect area determination unit. The rear-edge defect determination unit C111 determines whether or not a development-related defect occurs in a preset number of pixels downstream of the rear edge a1 in the sub-scanning direction. The rear-edge defect determination unit C111 determines whether or not the downstream side of the rear edge a1 in the sub-scanning direction is a defect area D1 serving as an example of a development-related defect area, in accordance with the number of pixels n with respect to the rear edge a1. That is, the rear-edge defect determination unit C111 determines whether or not the downstream portion of the rear edge a1 is to be corrected. The rear-edge defect determination unit C111 in the present exemplary embodiment performs processing for each rear edge a1. That is, in FIG. 7, the rear-edge defect determination unit C111 acquires the pixel value v of the rear edge a1.

Then, the rear-edge defect determination unit C111 acquires the lower limit of the number of target pixels N1 corresponding to the pixel value v of the rear edge a1 in accordance with the function f. Then, the rear-edge defect determination unit C111 determines whether or not the number of pixels n from the rear edge a1 is greater than or equal to the value N1. If the number of pixels n from the rear edge a1 is greater than or equal to the value N1, the rear-edge defect determination unit C111 determines that the downstream side of the rear edge a1 in the sub-scanning direction is a defect area. That is, the rear-edge defect determination unit C111 determines that a pixel located downstream from the rear edge a1 in the sub-scanning direction is to be corrected. In the present exemplary embodiment, accordingly, if the rear-edge defect determination unit C111 determines that the downstream side of the rear edge a1 in the sub-scanning direction is the defect area D1, a pixel located adjacent upstream of the rear edge a1 is a pixel corresponding to a non-image portion. The difference between the pixel value of a pixel located adjacent upstream of the rear edge a1 and the pixel value of a pixel in the rear edge a1 is greater than or equal to the threshold value Z0. Further, the number of pixels n with respect to the rear edge a1 is greater than or equal to the value N1.

C112: Rear-Edge Correction Value Acquisition Unit

A rear-edge correction value acquisition unit C112, which is an example of a first amount-of-correction acquisition unit and serves as an example of a sub-scanning-direction rear-edge correction value setting unit, acquires the correction value V1$i$ for a pixel in the defect area D1. In the present exemplary embodiment, the rear-edge correction value acquisition unit C112 performs processing for each rear edge a1. That is, the rear-edge correction value acquisition unit C112 acquires the correction value V1$i$ for a pixel in the defect area D1, for each rear edge a1 determined to be a defect area D1, in accordance with the pixel value v of the rear edge a1 and the number of pixels i (i=0, 1, 2, ..., N1) by which a pixel is away from the rear edge a1. That is, the correction value V1$i$ is acquired in accordance with V1$i$=g(v, i).

C113: Middle-Edge Designation Unit

A middle-edge designation unit C113 is an example of a detection unit that detects sub-scanning-direction boundary pixels located on the boundary extending in a density change direction from a high-density pixel area to a low-density pixel area, and serves as an example of a first boundary detector. The middle-edge designation unit C113 designates, based on a raster image, a boundary pixel located on the boundary extending in a density change direction from a high-density pixel area to a low-density pixel area having a density lower than the high-density pixel area in a preset sub-scanning direction. In the middle-edge designation unit C113 according to the present exemplary embodiment, an intermediate level portion whose pixel value is greater than or equal to the threshold value Z1 is set as an example of a low-density pixel area. That is, the middle-edge designation unit C113 designates, as a middle edge a2, a sub-scanning edge a at which the density decreases and changes to an intermediate level portion in the sub-scanning direction. Specifically, referring to FIG. 7, when a sub-scanning edge a is detected, the middle-edge designation unit C113 in the present exemplary embodiment determines whether or not a difference Δv obtained by subtracting the pixel value of an upstream adjacent pixel from the pixel value of the sub-scanning edge a is less than a preset threshold value Z2 (Z2<0). If the difference Δv is less than the threshold value Z2, the middle-edge designation unit C113 acquires the pixel value v of the sub-scanning edge a. Then, the middle-edge designation unit C113 determines whether or not the pixel value v of the sub-scanning edge a is greater than or equal to a preset threshold value Z1 (Z1≥0). If the pixel value v of the sub-scanning edge a is greater than or equal to the threshold value Z1, the middle-edge designation unit C113 designates the sub-scanning edge a as a middle edge a2. The threshold value Z2 is set in advance in accordance with the density difference which results in the occurrence of development-related defects.

C114: Number-of-Middle-Edge-Pixel Counter

A number-of-middle-edge-pixel counter C114 serving as an example of a sub-scanning-direction middle-edge image width counter includes a number-of-high-density-pixel counter C114A and a number-of-low-density-pixel counter C114B. The number-of-middle-edge-pixel counter C114 determines the numbers of pixels nL and nH on both sides of the middle edge a2 as a boundary in the sub-scanning direction.

C114A: Number-of-High-Density-Pixel Counter

The number-of-high-density-pixel counter C114A counts the number of pixels nH on the high-density side of the middle edge a2 as a boundary. Referring to FIG. 7, the number-of-high-density-pixel counter C114A in the present exemplary embodiment counts the number of pixels nH for each middle edge a2. That is, the counter C114A detects a sub-scanning edge a that is located upstream of the middle edge a2 in the sub-scanning direction and that is the closest to the middle edge a2. Then, the counter C114A adds 1 to the number of pixels that lie between the middle edge a2 and the sub-scanning edge a to determine the number of pixels nH.

C114B: Number-of-Low-Density-Pixel Counter

The number-of-low-density-pixel counter C114B counts the number of pixels nL on the low-density side of the middle edge a2 as a boundary. Referring to FIG. 7, the number-of-low-density-pixel counter C114B in the present exemplary embodiment counts the number of pixels nL for each middle edge a2. That is, the counter C114B detects a sub-scanning edge a that is located downstream of the middle edge a2 in the sub-scanning direction and that is the closest to the middle edge a2. Then, the counter C114B adds 1 to the number of pixels that lie between the middle edge a2 and the sub-scanning edge a to determine the number of pixels nL.

Figure 9A:
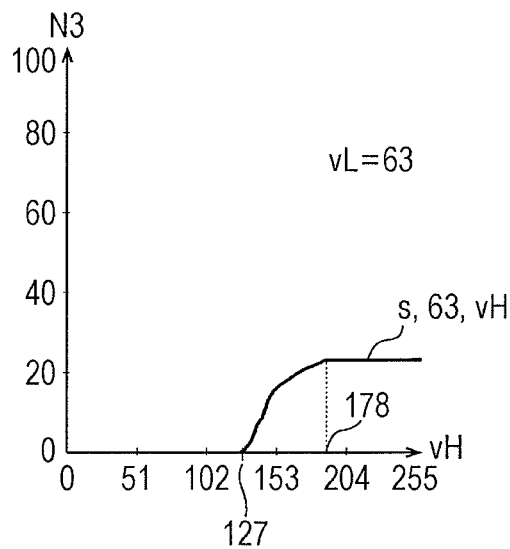
Figure 9B:
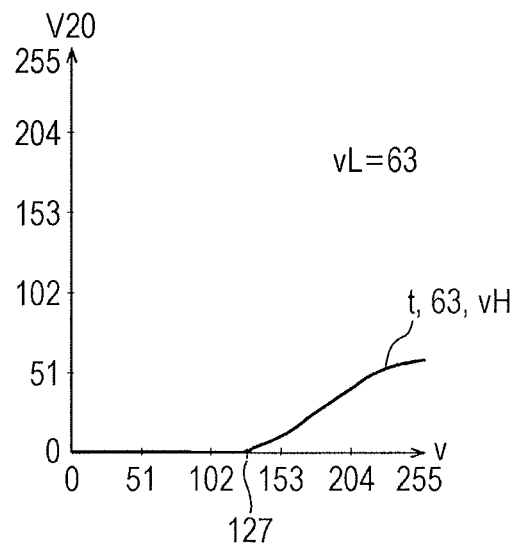
Figure 9C:
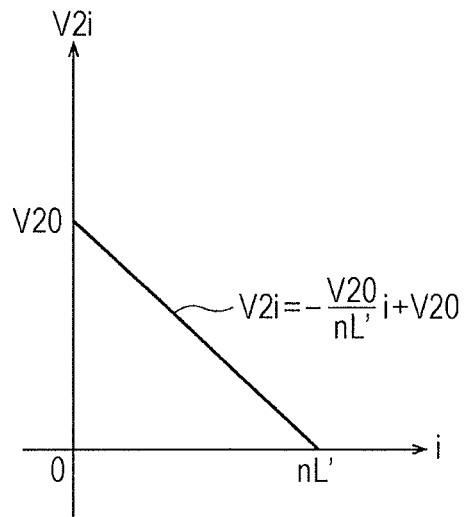

FIGS. 9A to 9C illustrate middle-edge correction setting values in the exemplary embodiment of the present invention. FIG. 9A illustrates an example of the relationship between the pixel value of the middle edge and the number of target pixels. FIG. 9B illustrates an example of the relationship between the pixel value of the middle edge and the correction value for the middle edge. FIG. 9C illustrates an example of the relationship between the number of pixels from the middle edge and the correction value.

C115: Middle-Edge Correction Setting Memory

A middle-edge correction setting memory C115, which is an example of a correspondence information memory and serves as an example of a sub-scanning-direction middle-edge correction setting value memory, stores correction setting values N3 and V2$i$ for density correction with reference to a middle edge a2. The middle-edge correction setting memory C115 stores the number of target pixels N3 serving as an example of a preset range to be corrected which is located downstream from the middle edge a2 in the sub-scanning direction. The middle-edge correction setting memory C115 also stores correspondence information on a correction value V20 serving as an example of the amount of correction for correcting pixels within the range of the number of target pixels N3.

The middle-edge correction setting memory C115 according to the present exemplary embodiment stores the correction setting values N3 and V2$i$ by using functions s and t serving as an example of correspondence information. Referring to FIG. 9A, the middle-edge correction setting memory C115 stores a correspondence relationship between each of a pixel value vL of the middle edge a2 and a pixel value vH in a high-density area and the upper limit of the number of target pixels N3 as a function s satisfying N3=s(vL, vH). In the function s in the present exemplary embodiment illustrated in FIG. 9A, for example, for vL=63 corresponding to a density of 25%, the number of pixels N3 is equal to 0 when the pixel value vH ranges from 0 to 127. When the pixel value vH ranges from 128 to 178, the number of pixels N3 increases with the pixel value v. When the pixel value vH ranges from 179 to 255, the number of pixels N3 is kept constant even when the pixel value vH varies. That is, the higher the pixel value vH on the high-density side, the larger the difference $|\Delta v|=vH-vL$. In the present exemplary embodiment, accordingly, the number of target pixels N3 is likely to be set larger when the pixel value vH is large than when the pixel value vH is small. The function s is determined and set in advance.

In FIG. 9B, the middle-edge correction setting memory C115 stores a correspondence relationship among the correction value V20 for the middle edge a2, the pixel value vL of the middle edge a2, and the pixel value vH on the high-density side as a function t satisfying V20=t(vL, vH). For example, when vL=63, in the function t in the present exemplary embodiment illustrated in FIG. 9B, the correction value V20 for the middle edge a2 is equal to 0 when the pixel value vH on the high-density side ranges from 0 to 127. When the pixel value vH ranges from 127 to 255, the correction value V20 increases with the pixel value v. That is, the higher the pixel value vH on the high-density side, the larger the difference $|\Delta v|=vH-vL$. In the present exemplary embodiment, accordingly, the correction value V20 is likely to be set larger when the pixel value vH is large than when the pixel value vH is small. The function t is determined and set in advance.

C116: Middle-Edge Defect Determination Unit

A middle-edge defect determination unit C116 is an example of a determination unit that determines whether or not development-related defects occur on the downstream side of the middle edge a2, and serves as an example of a sub-scanning-direction middle-edge development-related defect area determination unit. The middle-edge defect determination unit C116 determines whether or not a development-related defect occurs in a preset number of pixels downstream of the middle edge a2 in the sub-scanning direction. The middle-edge defect determination unit C116 determines whether or not the downstream side of the middle edge a2 in the sub-scanning direction is a defect area D2 serving as an example of a development-related defect area, in accordance with the number of pixels nH on the high-density side of the middle edge a2 which are located upstream of the middle edge a2 in the sub-scanning direction. That is, the middle-edge defect determination unit C116 determines whether or not the downstream portion of the middle edge a2 is to be corrected. The middle-edge defect determination unit C116 according to the present exemplary embodiment performs processing for each middle edge a2. That is, the middle-edge defect determination unit C116 determines whether or not the number of pixels nH on the high-density side of the middle edge a2 is greater than or equal to the preset number of pixels N4. If the number of pixels nH from the middle edge a2 is greater than or equal to the value N4, the middle-edge defect determination unit C116 determines that the downstream side of the middle edge a1 in the sub-scanning direction is a defect area. That is, the middle-edge defect determination unit C116 determines that a pixel downstream from the middle edge a1 in the sub-scanning direction is to be corrected.

In the present exemplary embodiment, accordingly, if the middle-edge defect determination unit C116 determines that the downstream side of the middle edge a1 in the sub-scanning direction is the defect area D2, a pixel downstream of the middle edge a2 is a pixel in an intermediate level portion. The middle edge a2 is a boundary pixel at which density decreases and changes to an intermediate level portion in the sub-scanning direction. Further, a pixel located adjacent upstream of the middle edge a2 has a pixel value greater than or equal to $|Z2|$, unlike the intermediate level portion. Further, the number of pixels nH on the high-density side of the middle edge a2 as a boundary is greater than or equal to the value N4.

C117: Number-of-Middle-Edge-Correction-Pixel Determination Unit

A number-of-middle-edge-correction-pixel determination unit C117 determines the number of pixels to be corrected nL' relative to pixels located downstream of the middle edge a2 in the sub-scanning direction. The determination unit C117 in the present exemplary embodiment performs processing for each middle edge a2. That is, if it is determined that the downstream side of the middle edge a2 is a defect area D2, the determination unit C117 acquires the pixel value vL of the middle edge a2 and the pixel value vH on the high-density side. Then, the determination unit C117 acquires the number of target pixels N3 corresponding to the pixel values vL and vH in accordance with the function s. Then, the determination unit C117 determines whether or not the number of pixels nL on the low-density side of the middle edge a2 is greater than or equal to N3. If the number of pixels nL from the middle edge a2 is greater than or equal to N3, the determination unit C117 sets the number of pixels to be corrected nL' to nL'=N3. If the number of pixels nL from the middle edge a2 is less than N3, the determination unit C117 sets the number of pixels to be corrected nL' to nL'=nL.

C118: Middle-Edge Correction Value Acquisition Unit

A middle-edge correction value acquisition unit C118 serving as an example of a sub-scanning-direction middle-edge correction value setting unit acquires the correction value V2$i$ for a pixel in a defect area. The middle-edge correction value acquisition unit C118 according to the present exemplary embodiment performs processing for each middle edge a2. That is, the middle-edge correction value acquisition unit C118 acquires the correction value V2i for a pixel in the defect area D2, for each middle edge a2 determined to be a defect area D2, in accordance with the pixel value vL of the middle edge a2, the pixel value vH on the high-density side, and the number of pixels i (i=0, 1, 2, ..., nL') by which a pixel is away from the middle edge a2. Specifically, in FIG. 9C, the correction value V2i is acquired in accordance with a linear expression in which the correction value V2i is equal to V20 for the middle edge a2 and is equal to 0 for a pixel away from the middle edge a2 by nL'. That is, the middle-edge correction value acquisition unit C118 according to the present exemplary embodiment acquires the correction value V2i in accordance with Expression (1) below.

$$V2i = -(V20/nL') \times i + V20 \qquad \text{Expression (1)}$$

Figure 10A:
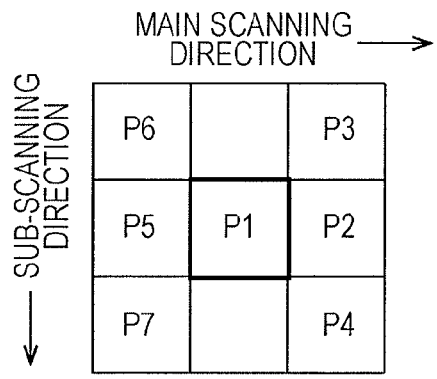
Figure 10B:
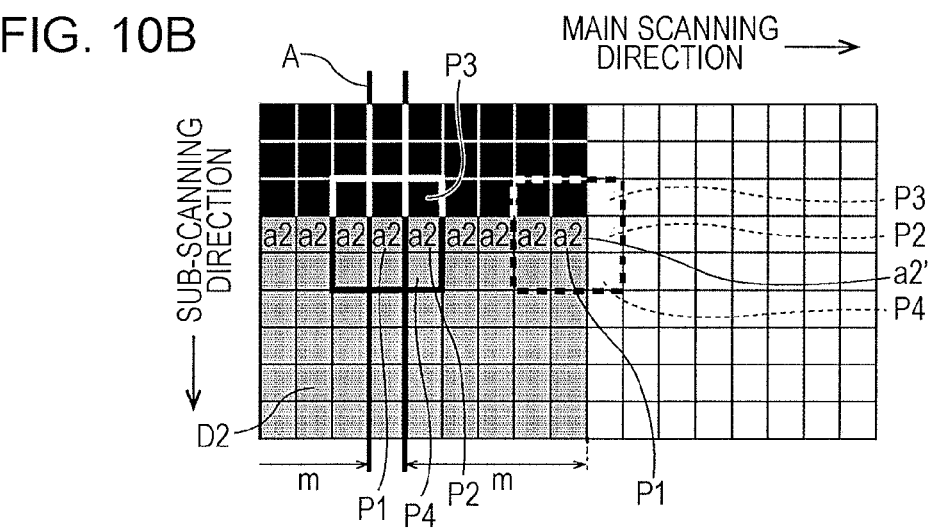
Figure 10C:
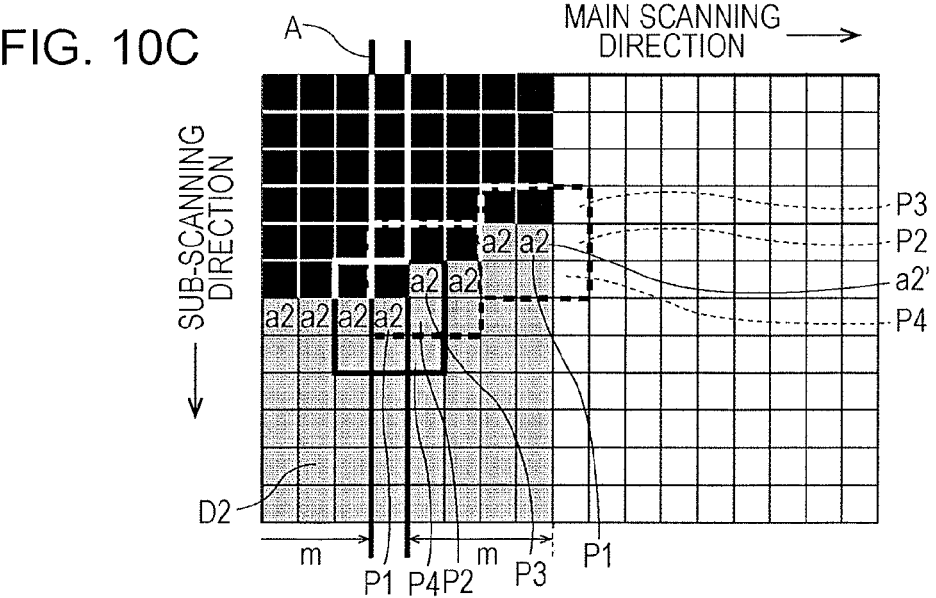

FIGS. 10A to 10C illustrate an end portion in the main scanning direction according to the exemplary embodiment of the present invention. FIG. 10A illustrates the setting of a pixel of interest and neighboring pixels. FIG. 10B illustrates an example of image information to be processed. FIG. 10C illustrates an example of image information to be processed which is different from that in FIG. 10B.

C119: End Proximity Determination Unit

An end proximity determination unit C119 serving as an example of a detection unit that detects the proximity to the end of a development-related defect area in the main scanning direction includes a main-scanning end detector C119A, a number-of-main-scanning-pixel counter C119B, and a proximity determination unit C119C. The end proximity determination unit C119 determines whether or not the middle edge a2 is in close proximity to the end of the defect area D2 in the main scanning direction.

C119A: Main-Scanning End Detector

The main-scanning end detector C119A serves as an example of a detection unit that detects an end of a development-related defect area in the main scanning direction. When middle edges a2 in which it is determined that development-related defects occur are arranged in the main scanning direction, the main-scanning end detector C119A detects an end pixel in the main scanning direction among the middle edges a2 arranged in the main scanning direction. In the present exemplary embodiment, the main-scanning end detector C119A detects an end of a defect area D2 including multiple middle edges a2 in the main scanning direction. When a middle edge a2 is used as a pixel of interest P1, the main-scanning end detector C119A according to the present exemplary embodiment determines whether or not neighboring pixels P2 to P4 and P5 to P7 preset for the pixel of interest P1 include another middle edge a2. By repeatedly performing the above-described operation, the main-scanning end detector C119A detects an end of the defect area D2 in the main scanning direction.

In FIG. 10A, in the present exemplary embodiment, the following three pixels are set as an example of pixels arranged in the main scanning direction of the pixel of interest P1 and as an example of neighboring pixels downstream of the pixel of interest P1 in the main scanning direction: (1) a pixel P2 located adjacent downstream of the pixel of interest P1 in the main scanning direction, (2) a pixel P3 located adjacent upstream of the pixel P2 in the sub-scanning direction, and (3) a pixel P4 located adjacent downstream of the pixel P2 in the sub-scanning direction. In the present exemplary embodiment, the following three pixels are further set as an example of neighboring pixels upstream of the pixel of interest P1 in the main scanning direction: (1) a pixel P5 located adjacent upstream of the pixel of interest P1, (2) a pixel P6 located adjacent upstream of the pixel P5 in the sub-scanning direction, and (3) a pixel P7 located adjacent downstream of the pixel P5 in the sub-scanning direction. Accordingly, the main-scanning end detector C119A according to the present exemplary embodiment detects an end of the defect area D2 in the main scanning direction. In the present exemplary embodiment, the term "pixels arranged in the main scanning direction" is used to also include, in addition to the pixels P2 and P5 adjacent to the pixel of interest P1 in the main scanning direction, a preset number of pixels located in the sub-scanning direction with respect to the pixels P2 and P5, which are adjacent to the pixel of interest P1 in the main scanning direction, that is, the pixels P3, P4, P6, and P7.

Specifically, in FIG. 10B and FIG. 10C, in the present exemplary embodiment, the main-scanning end detector C119A selects a middle edge a2 to be subjected to proximity determination. Then, the main-scanning end detector C119A sets the middle edge a2 to be subjected to the determination as the pixel of interest P1. Then, the main-scanning end detector C119A determines whether or not the neighboring pixel P2 of the pixel of interest P1 is a middle edge a2. If the pixel P2 is not a middle edge a2, it is determined whether or not the neighboring pixel P3 of the pixel of interest P1 is a middle edge a2. If the pixel P3 is not a middle edge a2, it is determined whether or not the neighboring pixel P4 of the pixel of interest P1 is a middle edge a2. If a middle edge a2 is detected among the neighboring pixels P2, P3, and P4, the detected middle edge a2 is set as a new pixel of interest P1. That is, the object to be examined is shifted downstream in the main scanning direction.

Then, the main-scanning end detector C119A repeatedly performs a similar determination process on the neighboring pixels P2 to P4 of the new pixel of interest P1. If no middle edge a2 is detected among the neighboring pixels P2 to P4, the main-scanning end detector C119A determines that a pixel a2' at the downstream end in the main scanning direction has been detected within a defect area including the middle edge a2 to be subjected to proximity determination. That is, the last detected pixel a2 is detected as the end pixel a2'. If it is determined that the downstream end in the main scanning direction has been detected, the main-scanning end detector C119A again sets a middle edge a2 to be subjected to proximity determination as a pixel of interest P1. Then, the main-scanning end detector C119A repeatedly processes the neighboring pixels P5 to P7 upstream of the pixel of interest P1 in a similar way to that for the downstream neighboring pixels P2 to P4. Then, a pixel a2' at the upstream end in the main scanning direction is detected.

C119B: Number-of-Main-Scanning-Pixel Counter

The number-of-main-scanning-pixel counter C119B determines the number of pixels m from the middle edge a2 to be subjected to proximity determination to the end of the defect area D2 in the main scanning direction. The number-of-main-scanning-pixel counter C119B according to the present exemplary embodiment counts the number of times it has been determined that any of the downstream neighboring pixels P2 to P4 is a middle edge a2, and determines the number of pixels m up to the downstream end. If it is determined that none of the neighboring pixels P2 to P4 is a middle edge a2, the counter C119B initializes the number of pixels m to 0. Then, the counter C119B counts the number of times it has been determined that any of the upstream neighboring pixels P5 to P7 is a middle edge a2, and determines the number of pixels m up to the upstream end.

C119C: Proximity Determination Unit

The proximity determination unit C119C serves as an example of a determination unit that determines the degree of proximity to the end of the development-related defect area in the main scanning direction. The proximity determination unit C119C determines whether or not a distance between each of the middle edges a2 arranged in the main scanning direction and the end pixel a2' in the main scanning direction is within the preset number of pixels M1 to determine whether or not the middle edge a2 is close to the end pixel a2'. In the present exemplary embodiment, the proximity determination unit C119C performs the above-described determination operation for each middle edge a2. That is, the proximity determination unit C119C determines whether or not the number of pixels m counted by the number-of-main-scanning-pixel counter C119B is less than or equal to the preset value M1. If the number of pixels m is less than or equal to the value M1, the proximity determination unit C119C determines that the middle edge a2 to be subjected to proximity determination is close to the end pixel a2' in the main scanning direction. If the number of pixels m is greater than the value M1, the proximity determination unit C119C determines that the middle edge a2 to be subjected to proximity determination is not close to, or is far away from, the end pixel a2' in the main scanning direction.

Figure 11A:
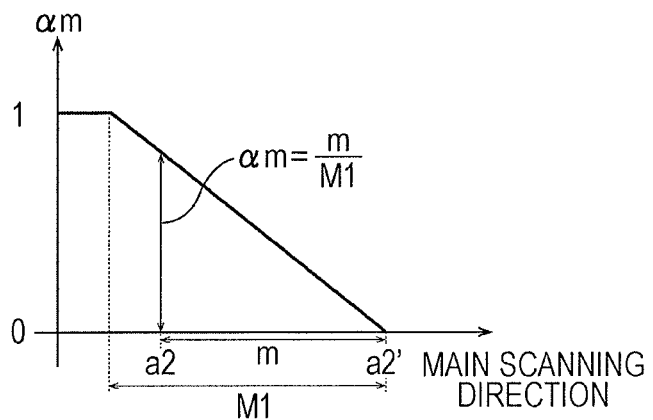
Figure 11B:
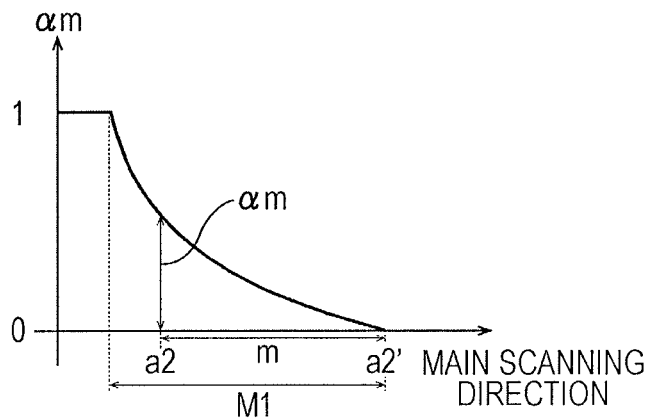
Figure 11C:
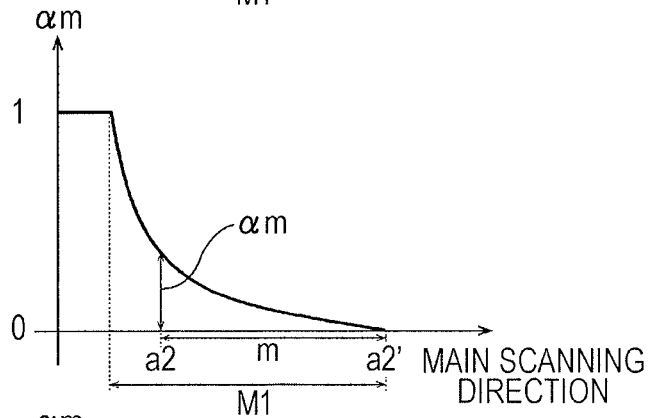
Figure 11D:
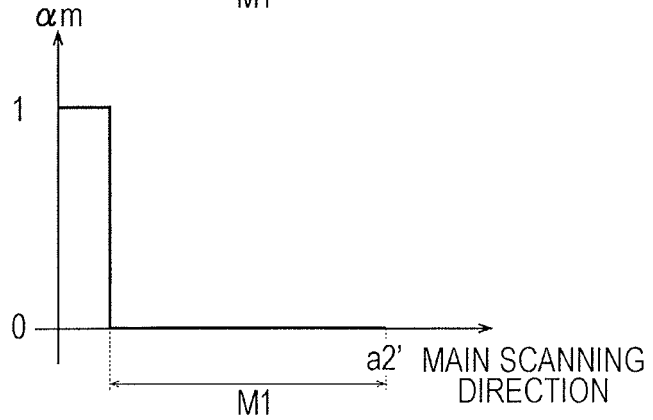

FIGS. 11A to 11D illustrate an example of correction with a changed middle-edge correction value according to the present invention. FIG. 11A illustrates the exemplary embodiment of the present invention. FIG. 11B illustrates a modification of the present exemplary embodiment. FIG. 11C illustrates another modification of the present exemplary embodiment different from that in FIG. 11B. FIG. 11D illustrates still another modification of the present exemplary embodiment different from those in FIG. 11A and FIG. 11B.

C120: Middle-Edge Correction-Value Change Setting Memory

A middle-edge correction-value change setting memory C120, which is an example of a correspondence information memory and serves as an example of a correction-value-change setting value memory, stores a setting value αm for changing the correction value V2i for a middle edge a2. When the middle edge a2 is close to the end of the defect area D2 in the main scanning direction, the middle-edge correction-value change setting memory C120 stores a coefficient αm for changing the correction value for a pixel in the defect area D2 at the middle edge a2. Referring to FIG. 11A, in the middle-edge correction-value change setting memory C120, the coefficient αm is set to 1 when the number of pixels m by which a middle edge a2 is away from the end pixel a2' satisfies m>M1. Further, when the number of pixels m satisfies m≤M1, the coefficient αm is set in accordance with a linear expression in which the coefficient αm is equal to 1 for m=M1 and is equal to 0 for m=0. That is, the middle-edge correction-value change setting memory C120 according to the present exemplary embodiment stores a coefficient αm obtained in accordance with Expression (2) below.

$$\alpha m = (m/M1) \quad \text{Expression (2)}$$

The coefficient αm is not limited to a linear coefficient. In FIG. 11A, an arbitrary coefficient αm by which the amount of correction to increase a density for the middle edge a2 determined to be close to the end pixel a2' is made smaller than the amount of correction to increase a density for the middle edge a2 determined to be far away from the end pixel a2' may be used. For example, as illustrated in FIG. 11B, a nonlinear coefficient αm, such as $\alpha m = (m/M1)^2$, may be used. Alternatively, a look-up table serving as correspondence information may be stored for each coefficient αm so that values illustrated in FIG. 11C are obtained. Additionally, when m<M1, the configuration with αm=0, that is, a configuration in which no correction is made, may be used (FIG. 11D). In the configuration with αm=0 when m<M1, the middle-edge correction-value change setting memory C120 may not necessarily be used.

C121: Middle-Edge Correction Value Change Unit

A middle-edge correction value change unit C121, which is an example of a first amount-of-correction acquisition unit and serves as an example of a sub-scanning-direction middle-edge correction value resetting unit, sets the amount of correction V2i to increase a density for the middle edge a2 determined to be close to the end pixel a2' to be smaller than the amount of correction V2i to increase a density for the middle edge a2 determined to be far away from the end pixel a2'. In the present exemplary embodiment, the correction value V2i for a pixel in the defect area D2 at the middle edge a2 is changed for each middle edge a2 determined to be close to the end pixel a2'. In the present exemplary embodiment, the middle-edge correction value change unit C121 performs processing in accordance with the information stored in the middle-edge correction-value change setting memory C120. In the present exemplary embodiment, if it is determined that a middle edge a2 is far away from the end pixel a2' in the main scanning direction, the correction value V2i for the defect area at the middle edge a2 is not changed. If it is determined that a middle edge a2 is close to a main-scanning boundary, as illustrated in FIG. 11A, the change unit C121 changes the correction value V2i for each pixel in the defect area D2 at the middle edge a2 to a new correction value V2i by multiplying the correction value V2i by (m/M1).

Figures 12A, 12B:
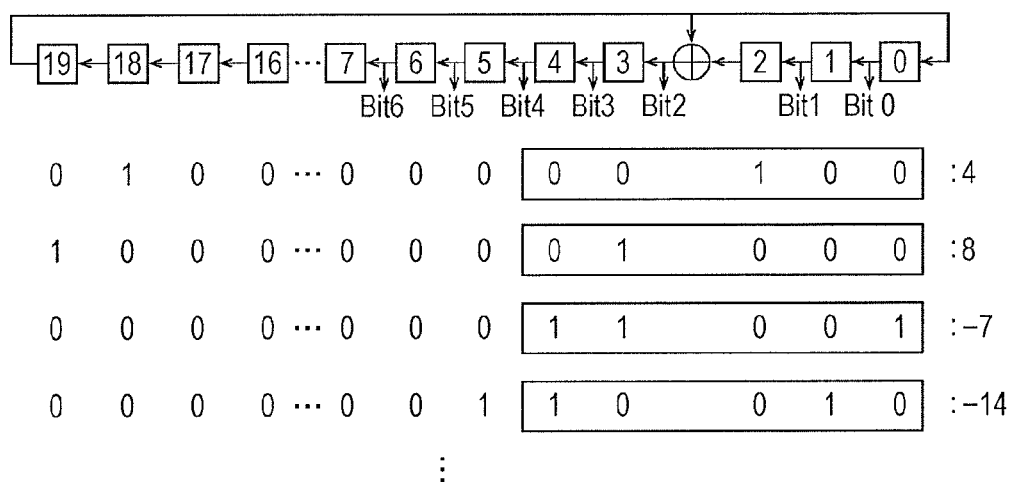

FIGS. 12A and 12B illustrate random number generation in the exemplary embodiment of the present invention. FIG. 12A illustrates random number generation. FIG. 12B illustrates random numbers and random number correction values.

C122: Random Number Generator

A random number generator C122 generates random numbers. The random number generator C122 according to the present exemplary embodiment generates random numbers in accordance with an M-sequence random number pattern that is based on a 20-bit primitive polynomial of $X^{20}+X^3+1$.

Random numbers are generated by repetition of appropriate processing based on preset initial values. Here, random numbers based on $X^{20}+X^3+1$ will be described with reference to a diagram of a generation circuit, called a linear feedback shift register (LFSR). In FIG. 12A, first, a binary initial value is set in each of bits 0 to 19. Then, when the next random numbers are generated, the value of each bit obtained before generation is shifted to the tip of the arrow. Further, an XOR operation is performed in a portion represented by a circle with a cross in it. The XOR operation is an operation whose result is "1" if either bit is "1".

Thus, given that, for example, a value with bit 2 and bit 18 being "1" and the remaining bits being "0" is set as an initial value, in FIG. 12A, when the next value is generated, all the bits other than bit 3 are the values at the root of the arrow. Further, bit 3 is the value "1" as a result of the XOR operation of bit 19, which is the value "0", and bit 2, which is the value "1". Accordingly, the next value is set so that bit 19 and bit 3 are the value "1" and the remaining bits are the value "0". Similarly, the above-described operation is repeatedly performed on the basis of each generated value, and the next values are generated. For example, on the basis of bit 4 to bit 0, the most significant bits are used for encoding, and are converted into decimal values 4, 8, −7, −14, . . . in this order, with "0" meaning positive and "1" meaning negative. Thus, irregular values are generated. Accordingly, the random number generator C122 according to the present exemplary embodiment generates random numbers. The random number generator C122 according to the present exemplary embodiment generates random numbers for each pixel to be corrected. In addition, the random number generator C122 according to the present exemplary embodiment is preset so as to generate different random numbers for each of the Y to O colors. In the present exemplary embodiment, a different initial value is set for each of the Y to O colors. The configuration for random number generation is not limited to that described above, and any existing well-known configuration may be used.

C123: Random Number Correction Value Acquisition Unit

A random number correction value acquisition unit C123, which is an example of a first amount-of-correction acquisition unit and serves as an example of an acquisition unit that acquires an amount of random number correction, acquires a random number correction value V3$i$ in accordance with generated random numbers. In the present exemplary embodiment, the random number correction value acquisition unit C123 acquires a random number correction value V3$i$ for each pixel to be corrected. In FIG. 12B, by way of example, when the pixel value v ranges from 0 to 63, the random number correction value acquisition unit C123 according to the present exemplary embodiment sets the number of superposed bits to 2, and acquires a random number correction value V3$i$ ranging from −2 to 1. When the pixel value v ranges from 64 to 127, the random number correction value acquisition unit C123 sets the number of superposed bits to 3, and acquires a random number correction value V3$i$ ranging from −4 to 3. When the pixel value v ranges from 128 to 191, the random number correction value acquisition unit C123 sets the number of superposed bits to 4, and acquires a random number correction value V3$i$ ranging from −8 to 7. When the pixel value v ranges from 192 to 255, the random number correction value acquisition unit C123 sets the number of superposed bits to 5, and acquires a random number correction value V3$i$ ranging from −16 to 15.

The random number correction values V3$i$ acquired by the random number correction value acquisition unit C123 are not limited to those described above. For example, when a random number correction value V3$i$ is to be acquired, the number of bits selected from random numbers is arbitrarily selectable. In the example described above, the number of superposed bits is changed in accordance with the pixel value v. Alternatively, the number of superposed bits may be fixed. In addition, the signs of the most significant bits may not necessarily be assigned the positive or negative sign.

C124: Corrector

A corrector C124 serving as an example of a first correction unit corrects a pixel density so as not to cause an image defect that is based on a development-related defect. The corrector C124 adds, for each pixel in which the correction values V1$i$ and V2$i$ for the defect areas D1 and D2 have been acquired, the random number correction value V3 and each of the correction values V1$i$ and V2$i$ to the pixel value vi of the pixel to update the pixel value vi to a new pixel value vi. That is, vi=vi+V1$i$+V3$i$, and vi+V2$i$+V3$i$ are calculated. Accordingly, the pixel value vi that is yet to been corrected, that is, the raster image obtained before correction, has been erased. In the following description, a notation with prime (') is used to clearly identify the corrected pixel values v and vi, as in pixel values v' and vi'.

C125: Corrected Image Information Memory

A corrected image information memory C125 serving as an example of a memory that stores image information corrected by the first correction unit stores image information subjected to defect correction, which is an example of second image information, in which the pixel values vi in the defect areas D1 and D2 have been corrected. That is, in the present exemplary embodiment, a raster image that is based on a corrected pixel value v' is stored for each of the Y, M, C, K, and O colors.

C126: Preview Determination Unit

A preview determination unit C126 serving as an example of a determination unit that determines whether to display an image before the image is recorded determines whether or not to display a preview serving as an example of an image before the image is recorded. In the present exemplary embodiment, it is determined whether or not preset input has been performed by using the input device COM2 or COM3 to provide a preview. If input to provide a preview has been performed, the preview determination unit C126 determines that a preview is provided.

C127: Print Start Determination Unit

A print start determination unit C127 serving as an example of a determination unit that determines whether to start image recording determines whether or not to perform printing in accordance with correction data. In the present exemplary embodiment, it is determined whether or not preset input has been performed by using the input device COM2 or COM3 to start printing. If preset input has been performed to start printing, it is determined that printing is started.

C128: Gradation Corrector

A gradation corrector C128 performs an image gradation correction process in accordance with corrected image information. The gradation corrector C128 according to the present exemplary embodiment performs gradation correction, such as density adjustment performed by a user who serves as an example of an operator, brightness adjustment, and calibration for changes over time.

C129: Transmitting Unit

A transmitting unit C129 transmits, as an example of second image information, image information subjected to gradation correction from the print image server COM to the printer U. That is, the transmitting unit C129 transmits image information that is based on image information acquired from the corrected image information memory C125.

C130: Preview Processing Unit

A preview processing unit C130 serving as an example of a processing unit that processes the display of an image before the image is recorded includes an image information acquisition unit C130A, a reverse correction value acquisition unit C130B, a reverse corrector C130C, and a preview display C130D. The preview processing unit C130 displays a preview on the display COM4 to allow the user to check an image before the image is printed.

C130A: Image Information Acquisition Unit

The image information acquisition unit C130A acquires image data stored in the corrected image information memory C125. That is, the image information acquisition unit C130A acquires pixel values v' that have been corrected by the addition of the correction values V1$i$, V2$i$, and V3$i$.

C130B: Reverse Correction Value Acquisition Unit

The reverse correction value acquisition unit C130B acquires the correction values V1$i$ and V2$i$ and the random number correction value V3$i$ by making the units and devices C107 to C123 process the corrected image data acquired by the image information acquisition unit C130A. That is, in the present exemplary embodiment, the edge detector C107 is caused to also function as a second boundary detector in addition to a first boundary detector. In the present exemplary embodiment, furthermore, the rear-edge correction value acquisition unit C112, the middle-edge correction value acquisition unit C118, the middle-edge correction value change unit C121, and the random number correction value acquisition unit C123 are caused to also function as a second amount-of-correction acquisition unit in addition to a first amount-of-correction acquisition unit. In the following description, a notation with prime (') is used to clearly identify the correction values V1$i$, V2$i$, and V3$i$ acquired by the reverse correction value acquisition unit C130B, as in correction values V1$i$', V2$i$', and V3$i$'.

C130C: Reverse Corrector

The reverse corrector C130C, which serves as an example of a second correction unit, performs reverse correction to cancel the correction performed by the first correction unit in accordance with the pixel densities in the second image information. The reverse corrector C130C according to the present exemplary embodiment performs reverse correction by, for example, subtracting, for each pixel in which the correction values V1$i$' and V2$i$' for reverse correction are acquired, the random number correction value V3$i$' and each of the correction values V1$i$' and V2$i$' from the pixel value vi' to produce a new pixel value vi. That is, vi=vi−V1$i$'−V3$i$', and vi−V2$i$'−V3$i$' are calculated. In the following description, a notation with double prime (") is used to clearly identify the pixel values v and vi acquired by the reverse correction value acquisition unit C130B, as in v" and vi".

C130D: Preview Display

The preview display C130D is an example of a third image information display, and serves as an example of a display that displays an image before the image is recorded. The preview display C130D displays a preview on the display COM4 in accordance with the pixel value vi" obtained by the reverse corrector C130C through reverse correction, which serves as an example of third image information. Note that in the display operation of the preview display C130D, image information obtained before correction is performed by the corrector C124 has been erased when the corrector C124 performs correction.

Explanation of Flow Diagram of Present Exemplary Embodiment

Next, the process flow of the printer U according to the present exemplary embodiment will be described with reference to a flow diagram, or a flowchart.

Explanation of Flowchart of Main Process

FIG. 13 is a flowchart of a main process according to the present exemplary embodiment.

In the flowchart illustrated in FIG. 13, the processing of each step (ST) is performed in accordance with a program stored in a hard disk or the like of the main body COM1 of the print image server COM. In addition, the process is executed in parallel with various other processes of the printer U.

The flowchart illustrated in FIG. 13 is started when the power of the print image server COM is turned on.

In ST1 in FIG. 13, it is determined whether or not PDL data has been received from the personal computer PC. If YES is obtained, the process proceeds to ST2. If NO is obtained, the processing of ST1 is repeatedly performed.

In ST2, the PDL data is interpreted. Then, the process proceeds to ST3.

In ST3, a raster image is created in accordance with the interpreted data. Then, the process proceeds to ST4.

In ST4, color conversion is performed to produce respective raster images for the Y to O colors. Then, the process proceeds to ST5.

In ST5, a pixel value for each color is converted so that the total amount of toner is limited. Then, the process proceeds to ST6.

In ST6, the pixel values of the pixels of the raster images are adjusted by, for example, sharpness correction. Then, the process proceeds to ST7.

In ST7, a defect correction process is executed. Then, the process proceeds to ST8.

In ST8, density adjustment is performed. Then, the process proceeds to ST9.

In ST9, data is transmitted to the printer U. Then, the process returns to ST1.

Explanation of Flowchart of Defect Correction Process

Figure 14:
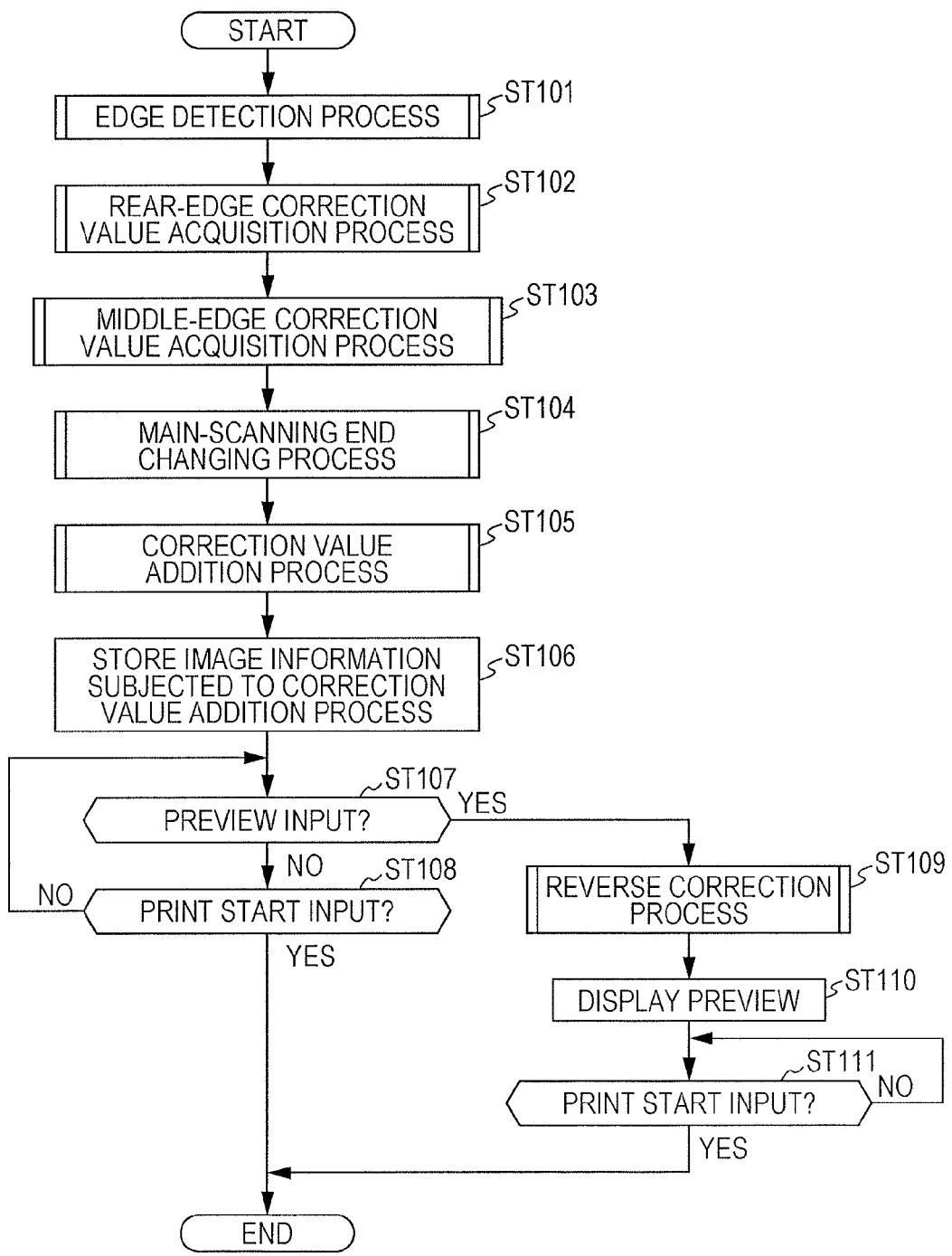
FIG. 14 is a flowchart of a defect correction process in the present exemplary embodiment, and illustrates the sub-routine of ST7 in FIG. 13.

FIG. 14 is a flowchart of a defect correction process in the present exemplary embodiment, and illustrates the sub-routine of ST7 in FIG. 13.

In ST101 in FIG. 14, an edge detection process is executed. Then, the process proceeds to ST102.

In ST102, a rear-edge correction value acquisition process is executed. Then, the process proceeds to ST103.

In ST103, a middle-edge correction value acquisition process is executed. Then, the process proceeds to ST104.

In ST104, a main-scanning end changing process is executed. Then, the process proceeds to ST105.

In ST105, a correction value addition process is executed. Then, the process proceeds to ST106.

In ST106, image information subjected to the correction value addition process is stored. Then, the process proceeds to ST107.

In ST107, it is determined whether or not there is any input to provide a preview. If YES is obtained, the process proceeds to ST109. If NO is obtained, the process proceeds to ST108.

In ST108, it is determined whether or not there is any input to start printing. If YES is obtained, the defect correction process ends, and the process returns to the main process illustrated in FIG. 13. If NO is obtained, the process returns to ST107.

In ST109, a reverse correction process is executed. Then, the process proceeds to ST110.

In ST110, a preview is displayed in accordance with the image information subjected to the reverse correction process. Then, the process proceeds to ST111.

In ST111, it is determined whether or not there is any input to start printing. If YES is obtained, the defect correction process ends, and the process returns to the main process illustrated in FIG. 13. If NO is obtained, the processing of ST111 is repeatedly performed.

Explanation of Flowchart of Edge Detection Process

Figure 15:
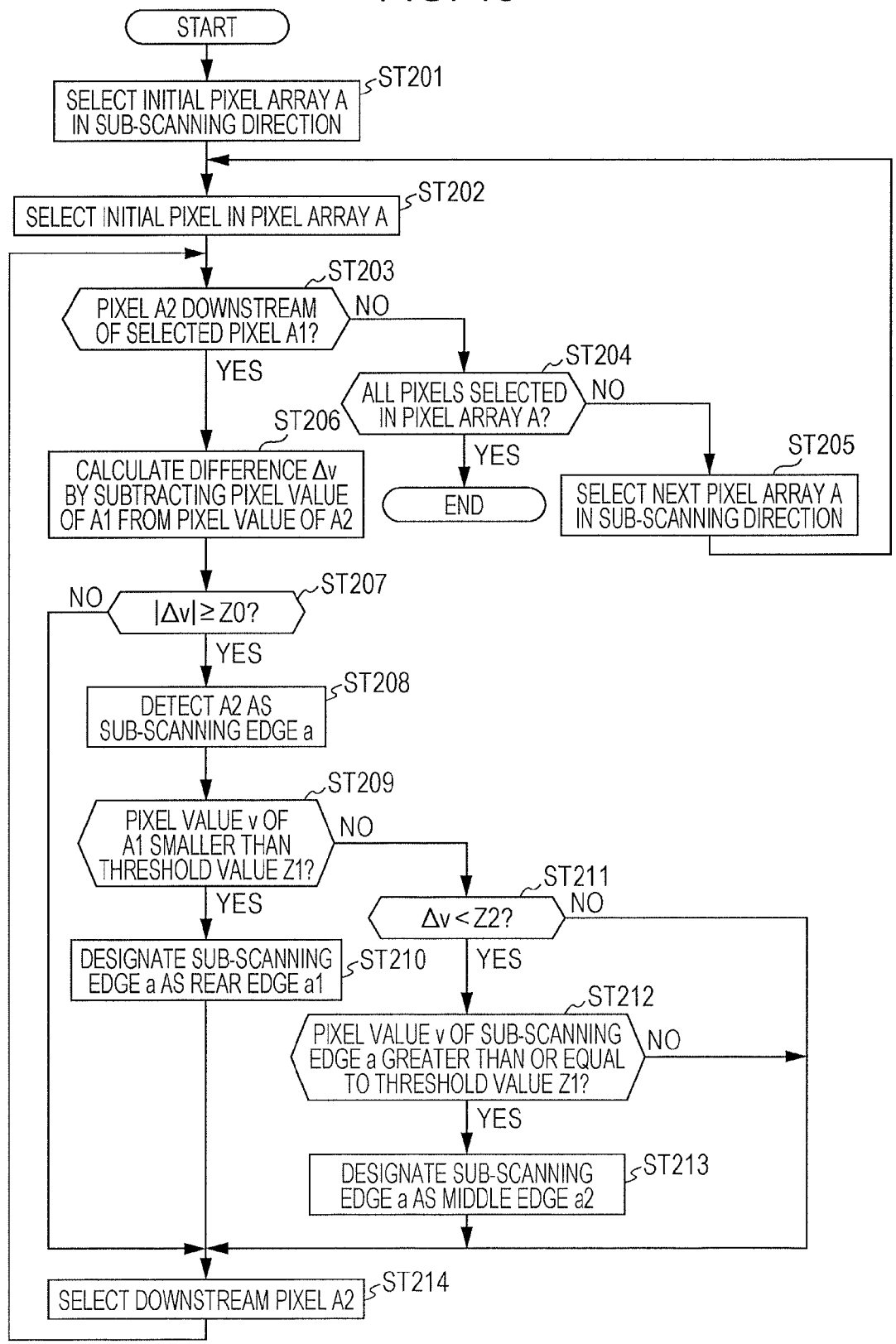
FIG. 15 is a flowchart of an edge detection process in the present exemplary embodiment, and illustrates the sub-routine of ST101 in FIG. 14 or ST702 in FIG. 21.

FIG. 15 is a flowchart of an edge detection process in the present exemplary embodiment, and illustrates the sub-routine of ST101 in FIG. 14 or ST702 in FIG. 21 (described below).

In ST201 in FIG. 15, an initial pixel array A extending in the sub-scanning direction is selected. Then, the process proceeds to ST202.

In ST202, an initial pixel in the pixel array A is selected. Then, the process proceeds to ST203.

In ST203, it is determined whether or not there is a pixel A2 downstream of the selected pixel A1 in the sub-scanning direction. That is, it is determined whether or not the selected pixel A1 is a non-last pixel in the pixel array A. If YES is obtained, the process proceeds to ST206. If NO is obtained, the process proceeds to ST204.

In ST204, it is determined whether or not all the pixel arrays A extending in the sub-scanning direction have been selected. If YES is obtained, the edge detection process ends, and the subroutine returns to the calling program. If NO is obtained, the process proceeds to ST205.

In ST205, the next pixel array A extending in the sub-scanning direction is selected. Then, the process returns to ST202.

In ST206, the pixel value of the selected pixel A1 is subtracted from the pixel value of the downstream pixel A2 to calculate a difference Δv. Then, the process proceeds to ST207.

In ST207, it is determined whether or not the magnitude of the difference |Δv| is greater than or equal to the threshold value Z0. If YES is obtained, the process proceeds to ST208. If NO is obtained, the process proceeds to ST214.

In ST208, the downstream pixel A2 is detected as a sub-scanning edge a. Then, the process proceeds to ST209.

In ST209, it is determined whether or not the pixel value v of the selected pixel A1 is smaller than the threshold value Z1. That is, it is determined whether or not the selected pixel A1 is included in a non-image portion. If YES is obtained, the process proceeds to ST210. If NO is obtained, the process proceeds to ST211.

In ST210, the sub-scanning edge a is designated as a rear edge a1. Then, the process proceeds to ST214.

In ST211, it is determined whether or not the difference Δv is smaller than the threshold value Z2, where Z2<0. If YES is obtained, the process proceeds to ST212. If NO is obtained, the process proceeds to ST214.

In ST212, it is determined whether or not the pixel value of the downstream pixel A2, that is, the pixel value of the sub-scanning edge a, is greater than or equal to the threshold value Z1. If YES is obtained, the process proceeds to ST213. If NO is obtained, the process proceeds to ST214.

In ST213, the downstream pixel A2, that is, the sub-scanning edge a, is designated as a middle edge a2. Then, the process proceeds to ST214.

In ST214, the downstream pixel A2 is selected. Then, the process returns to ST203.

Explanation of Flowchart of Rear-Edge Correction Process

Figure 16:
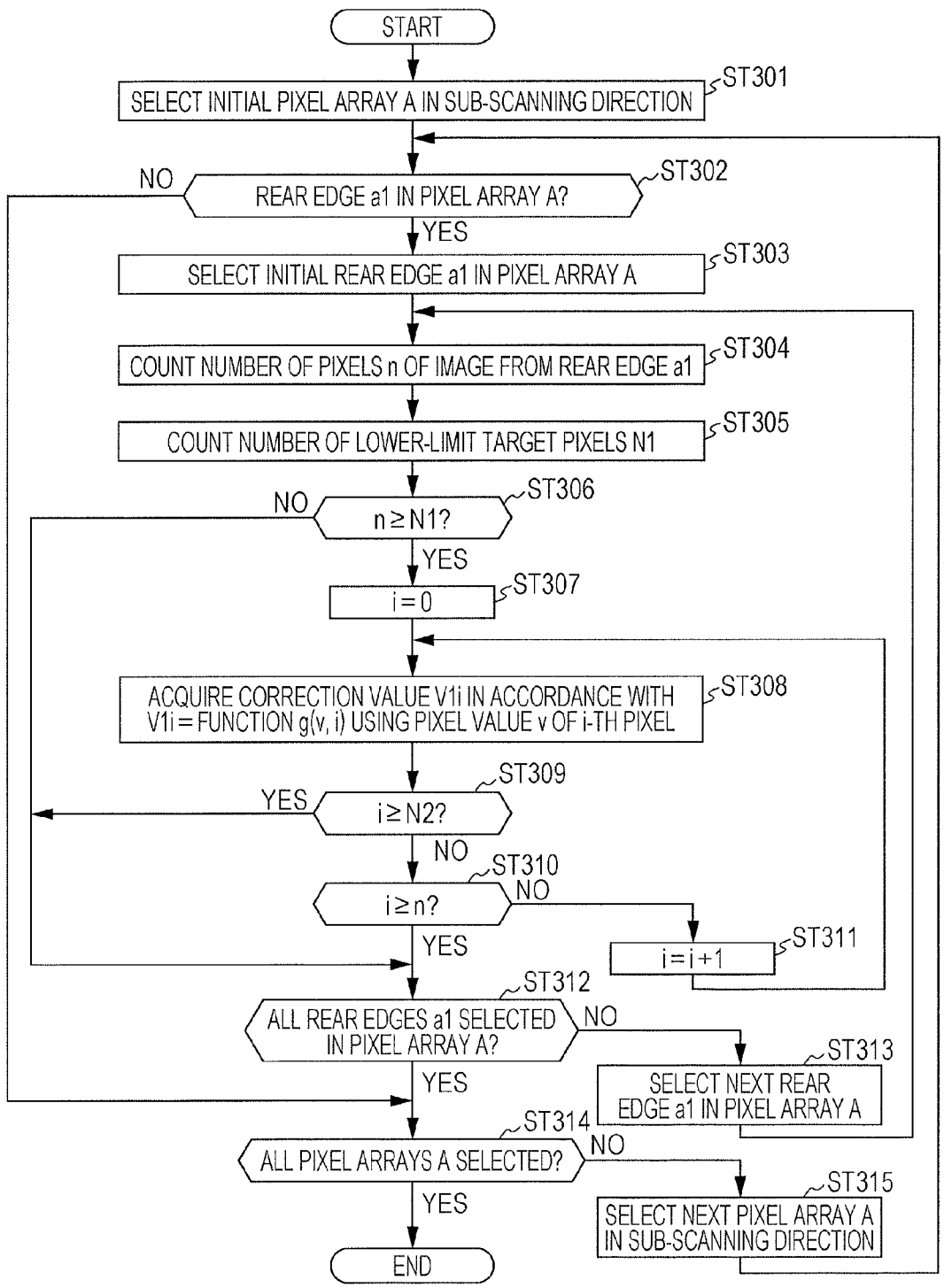
FIG. 16 is a flowchart of a rear-edge correction value acquisition process in the present exemplary embodiment, and illustrates the sub-routine of ST102 in FIG. 14 or ST703 in FIG. 21.

FIG. 16 is a flowchart of a rear-edge correction value acquisition process in the present exemplary embodiment, and illustrates the sub-routine of ST102 in FIG. 14 or ST703 in FIG. 21 (described below).

In ST301 in FIG. 16, an initial pixel array A extending in the sub-scanning direction is selected. Then, the process proceeds to ST302.

In ST302, it is determined whether or not the pixel array A includes a rear edge a1. If YES is obtained, the process proceeds to ST303. If NO is obtained, the process proceeds to ST314.

In ST303, an initial rear edge a1 in the pixel array A is selected. Then, the process proceeds to ST304.

In ST304, the number of consecutive pixels n having a pixel value greater than or equal to the threshold value Z1 in the sub-scanning direction from the rear edge a1 is counted. Then, the process proceeds to ST305.

In ST305, the lower limit of the number of target pixels N1 is acquired in accordance with the pixel value v of the rear edge a1 and the function f. Then, the process proceeds to ST306.

In ST306, it is determined whether or not the number of pixels n is greater than or equal to the lower limit of the number of target pixels N1 (n≥N1). That is, it is determined whether or not an image area located from the rear edge a1 in the sub-scanning direction is a defect area. If YES is obtained, the process proceeds to ST307. If NO is obtained, the process proceeds to ST312.

In ST307, the variable i is set equal to i=0. That is, the variable i is initialized. Then, the process proceeds to ST308.

In ST308, the correction value V1i for the i-th pixel from the rear edge a1 is acquired in accordance with the function g(v, i). Then, the process proceeds to ST309.

In ST309, it is determined whether or not the variable i is greater than or equal to the number of target pixels N2. If YES is obtained, the process proceeds to ST312. If NO is obtained, the process proceeds to ST310.

In ST310, it is determined whether or not the variable i is greater than or equal to the number of pixels n (i n). That is, it is determined whether or not the i-th pixel has reached the downstream end of the image portion. If YES is obtained, the process proceeds to ST312. If NO is obtained, the process proceeds to ST311.

In ST311, the variable i is set to i=i+1. That is, 1 is added to the variable i. Then, the process returns to ST308.

In ST312, it is determined whether or not all the rear edges a1 in the pixel array A have been selected. If YES is obtained, the process proceeds to ST314. If NO is obtained, the process proceeds to ST313.

In ST313, the next rear edge a1 in the pixel array A is selected. Then, the process returns to ST304.

In ST314, it is determined whether or not all the pixel arrays A extending in the sub-scanning direction have been selected. If YES is obtained, the rear-edge correction value acquisition process ends, and the subroutine returns to the calling program. If NO is obtained, the process proceeds to ST315.

In ST315, the next pixel array A extending in the sub-scanning direction is selected. Then, the process returns to ST302.

Explanation of Flowchart of Middle-Edge Correction Value Acquisition Process

Figure 17:
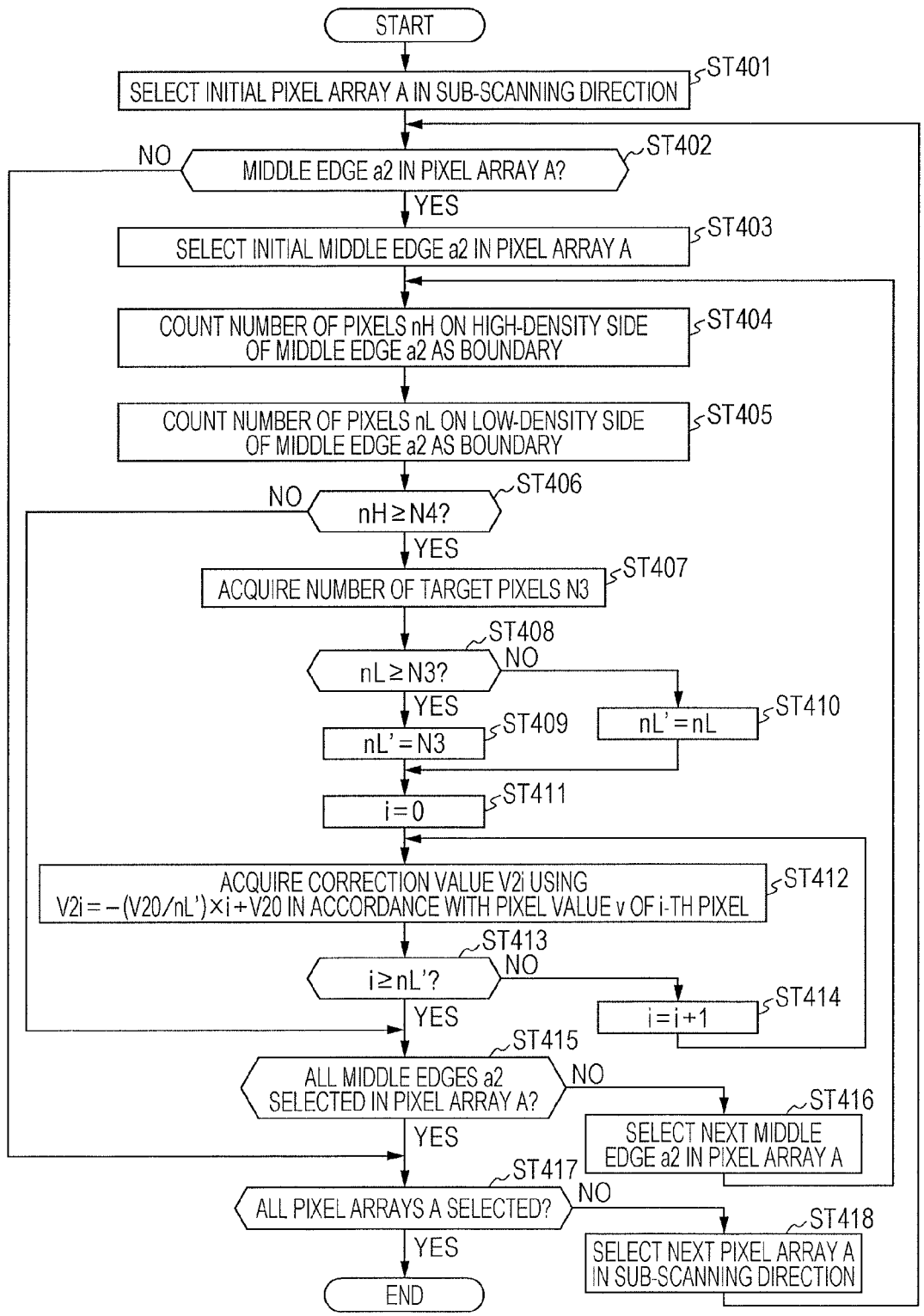
FIG. 17 is a flowchart of a middle-edge correction value acquisition process in the present exemplary embodiment, and illustrates the sub-routine of ST103 in FIG. 14 or ST704 in FIG. 21.

FIG. 17 is a flowchart of a middle-edge correction value acquisition process in the present exemplary embodiment, and illustrates the sub-routine of ST103 in FIG. 14 or ST704 in FIG. 21 (described below).

In ST401 in FIG. 17, an initial pixel array A extending in the sub-scanning direction is selected. Then, the process proceeds to ST402.

In ST402, it is determined whether or not the pixel array A includes a middle edge a2. If YES is obtained, the process proceeds to ST403. If NO is obtained, the process proceeds to ST417.

In ST403, an initial middle edge a2 in the pixel array A is selected. Then, the process proceeds to ST404.

In ST404, the number of pixels nH on the high-density side of the middle edge a2 as the boundary in the sub-scanning direction is counted. Then, the process proceeds to ST405.

In ST405, the number of pixels nL on the low-density side of the middle edge a2 as the boundary in the sub-scanning direction is counted. Then, the process proceeds to ST406.

In ST406, it is determined whether or not the number of pixels nH on the high-density side is greater than or equal to the number of pixels N4. If YES is obtained, the process proceeds to ST407. If NO is obtained, the process proceeds to ST415.

In ST407, the number of target pixels N3 is acquired in accordance with the pixel value v of the middle edge a2 and the function s. Then, the process proceeds to ST408.

In ST408, it is determined whether or not the number of pixels nL on the low-density side is greater than or equal to the number of target pixels N3 (nL≥N3). That is, it is determined whether or not the number of pixels in an image area located from the middle edge a2 in the sub-scanning direction exceeds the target range. If YES is obtained, the process proceeds to ST409. If NO is obtained, the process proceeds to ST410.

In ST409, the value nL' is set to nL'=N3. Then, the process proceeds to ST411.

In ST410, the value nL' is set to nL'=nL. Then, the process proceeds to ST411.

In ST411, the variable i is set to i=0. That is, the variable i is initialized. Then, the process proceeds to ST412.

In ST412, the correction value V2i for the i-th pixel from the middle edge a2 is acquired using V2i=−(V20/nL')×i+V20 in accordance with V20=t(nL, nH) and nL'. Then, the process proceeds to ST413.

In ST413, it is determined whether or not the variable i is greater than or equal to the value nL' (i≥nL'). That is, it is determined whether or not the pixel values of all the pixels to be corrected have been acquired. If YES is obtained, the process proceeds to ST415. If NO is obtained, the process proceeds to ST414.

In ST414, the variable i is set to i=i+1. That is, 1 is added to the variable i. Then, the process returns to ST412.

In ST415, it is determined whether or not all the middle edges a2 in the pixel array A have been selected. If YES is obtained, the process proceeds to ST417. If NO is obtained, the process proceeds to ST416.

In ST416, the next middle edge a2 in the pixel array A is selected. Then, the process returns to ST404.

In ST417, it is determined whether or not all the pixel arrays A extending in the sub-scanning direction have been selected. If YES is obtained, the middle-edge correction value acquisition process ends, and the subroutine returns to the calling program. If NO is obtained, the process proceeds to ST418.

In ST418, the next pixel array A extending in the sub-scanning direction is selected. Then, the process returns to ST402.

Explanation of Flowchart of Main-Scanning End Changing Process

Figure 18:
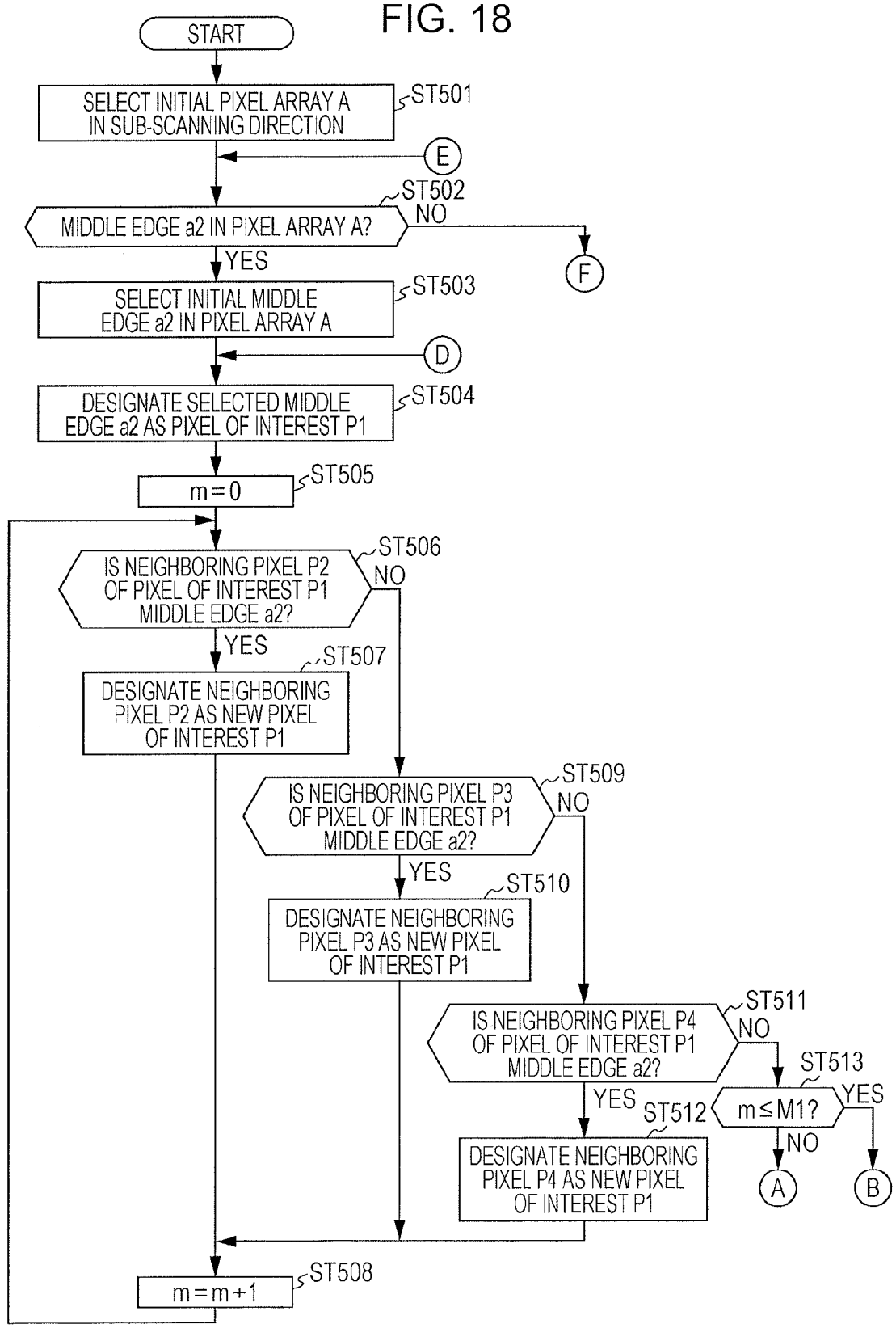
FIG. 18 is a flowchart of a main-scanning end changing process in the present exemplary embodiment, and illustrates the sub-routine of ST104 in FIG. 14 or ST705 in FIG. 21.

FIG. 18 is a flowchart of a main-scanning end changing process in the present exemplary embodiment, and illustrates the sub-routine of ST104 in FIG. 14 or ST705 in FIG. 21 (described below).

Figure 19:
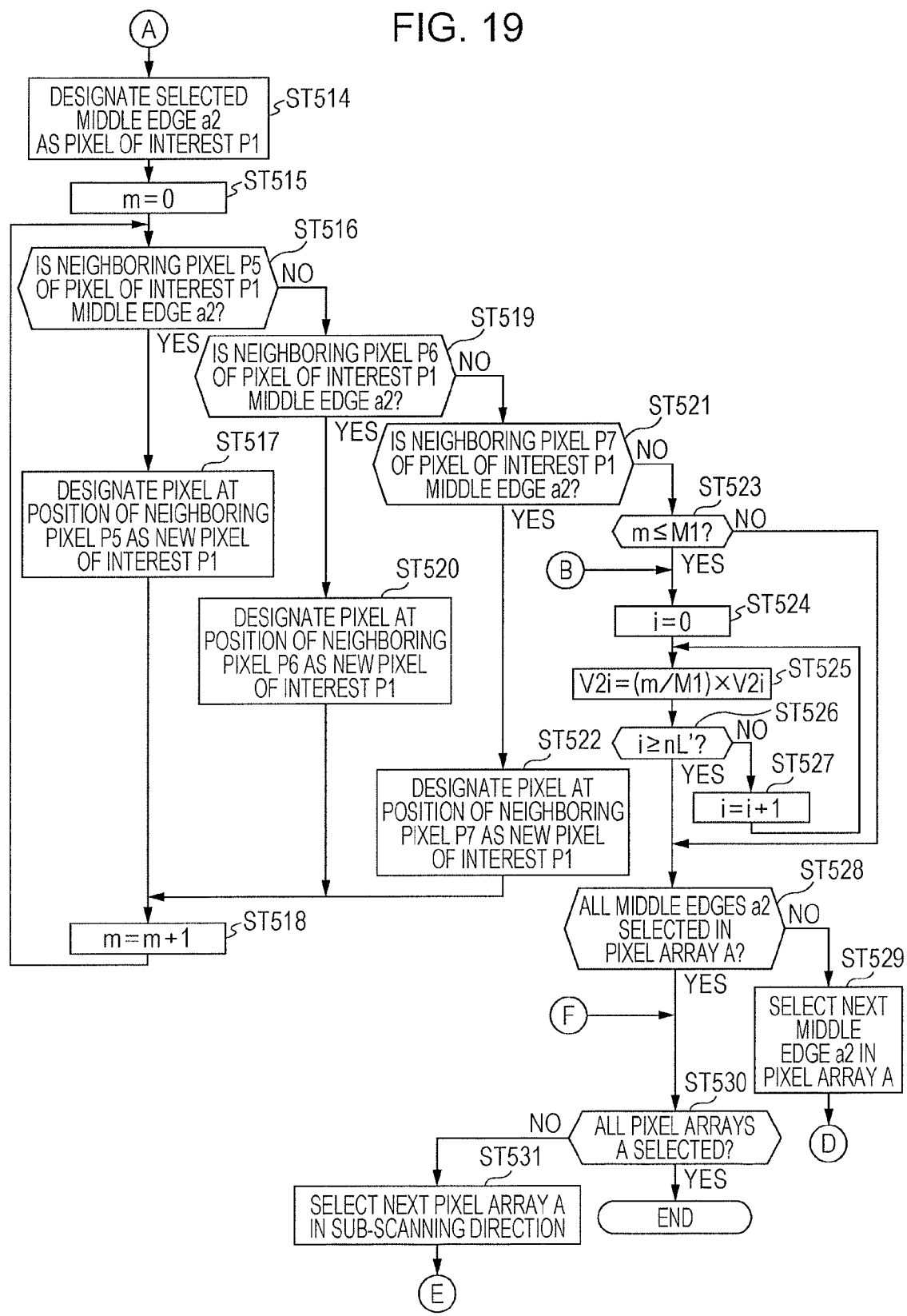
FIG. 19 is a flowchart of the main-scanning end changing process in the present exemplary embodiment, and is a continued view in FIG. 18.

FIG. 19 is a flowchart of the main-scanning end changing process in the present exemplary embodiment, and is a continued view in FIG. 18.

In ST501 in FIG. 18, an initial pixel array A extending in the sub-scanning direction is selected. Then, the process proceeds to ST502.

In ST502, it is determined whether or not the pixel array A includes a middle edge a2. If YES is obtained, the process proceeds to ST503. If NO is obtained, the process proceeds to ST530 illustrated in FIG. 19.

In ST503, an initial middle edge a2 in the pixel array A is selected. Then, the process proceeds to ST504.

In ST504, the selected middle edge a2 is designated as an initial pixel of interest P1 which is a pixel to be subjected to determination. Then, the process proceeds to ST505.

In ST505, the number of times m a movement in the main scanning direction occurs is set to m=0. That is, the number of times m is initialized. Then, the process proceeds to ST506.

In ST506, it is determined whether or not a neighboring pixel P2 of the pixel of interest P1 is a middle edge a2. If YES is obtained, the process proceeds to ST507. If NO is obtained, the process proceeds to ST509.

In ST507, the neighboring pixel P2 is designated as a new pixel of interest P1. Then, the process proceeds to ST508.

In ST508, the number of times m is set to m=m+1. That is, the number of times a movement in the main scanning direction occurs is increased by 1. Then, the process returns to ST506.

In ST509, it is determined whether or not a neighboring pixel P3 of the pixel of interest P1 is a middle edge a2. If YES is obtained, the process proceeds to ST510. If NO is obtained, the process proceeds to ST511.

In ST510, the neighboring pixel P3 is designated as a new pixel of interest P1. Then, the process returns to ST508.

In ST511, it is determined whether or not a neighboring pixel P4 of the pixel of interest P1 is a middle edge a2. If YES is obtained, the process proceeds to ST512. If NO is obtained, the process proceeds to ST513.

In ST512, the neighboring pixel P4 is designated as a new pixel of interest P1. Then, the process returns to ST508.

In ST513, it is determined whether or not the number of times m is less than or equal to the value M1 (m≤M1). That is, it is determined whether or not the middle edge a2 to be subjected to determination is close to the downstream end in the main scanning direction. If YES is obtained, the process proceeds to ST524 illustrated in FIG. 19. If NO is obtained, the process proceeds to ST514 illustrated in FIG. 19.

In ST514 illustrated in FIG. 19, the initially selected middle edge a2 is designated again as the initial pixel of interest P1 which is a pixel to be subjected to determination. Then, the process proceeds to ST515.

In ST515, the number of times m is set to m=0. That is, the number of times m a movement in the main scanning direction occurs is initialized. Then, the process proceeds to ST516.

In ST516, it is determined whether or not a neighboring pixel P5 of the pixel of interest P1 is a middle edge a2. If YES is obtained, the process proceeds to ST517. If NO is obtained, the process proceeds to ST519.

In ST517, the neighboring pixel P5 is designated as a new pixel of interest P1. Then, the process proceeds to ST518.

In ST518, the number of times m is set to m=m+1. That is, the number of times a movement to the upstream side in the main scanning direction occurs is increased by 1. Then, the process returns to ST516.

In ST519, it is determined whether or not a neighboring pixel P6 of the pixel of interest P1 is a middle edge a2. If YES is obtained, the process proceeds to ST520. If NO is obtained, the process proceeds to ST521.

In ST520, the neighboring pixel P6 is designated as a new pixel of interest P1. Then, the process returns to ST518.

In ST521, it is determined whether or not a neighboring pixel P7 of the pixel of interest P1 is a middle edge a2. If YES is obtained, the process proceeds to ST522. If NO is obtained, the process proceeds to ST523.

In ST522, the neighboring pixel P7 is designated as a new pixel of interest P1. Then, the process returns to ST518.

In ST523, it is determined whether or not the number of times m is less than or equal to the value M1 (m≤M1). That is, it is determined whether or not the middle edge a2 to be subjected to determination is close to the upstream end in the main scanning direction. If YES is obtained, the process proceeds to ST524. If NO is obtained, the process proceeds to ST528.

In ST524, the variable i is set to i=0. That is, the variable i is initialized. Then, the process proceeds to ST525.

In ST525, the correction value V2i from the middle edge a is multiplied by m/M1 to change the correction value V2i. Then, the process proceeds to ST526.

In ST526, it is determined whether or not the variable i is greater than or equal to the value nL' (i≥nL'). That is, it is determined whether or not the pixel values of all the pixels to be corrected have been acquired. If YES is obtained, the process proceeds to ST528. If NO is obtained, the process proceeds to ST527.

In ST527, the variable i is set to i=i+1. That is, 1 is added to the variable i. Then, the process returns to ST525.

In ST528, it is determined whether or not all the middle edges a2 in the pixel array A have been selected. If YES is obtained, the process proceeds to ST530. If NO is obtained, the process proceeds to ST529.

In ST529, the next middle edge a2 in the pixel array A is selected. Then, the process returns to ST504 illustrated in FIG. 18.

In ST530, it is determined whether or not all the pixel arrays A extending in the sub-scanning direction have been selected. If YES is obtained, the main-scanning end changing process ends, and the subroutine returns to the calling program. If NO is obtained, the process proceeds to ST531.

In ST531, the next pixel array A extending in the sub-scanning direction is selected. Then, the process returns to ST502 illustrated in FIG. 18.

Explanation of Flowchart of Correction Value Addition Process

Figure 20:
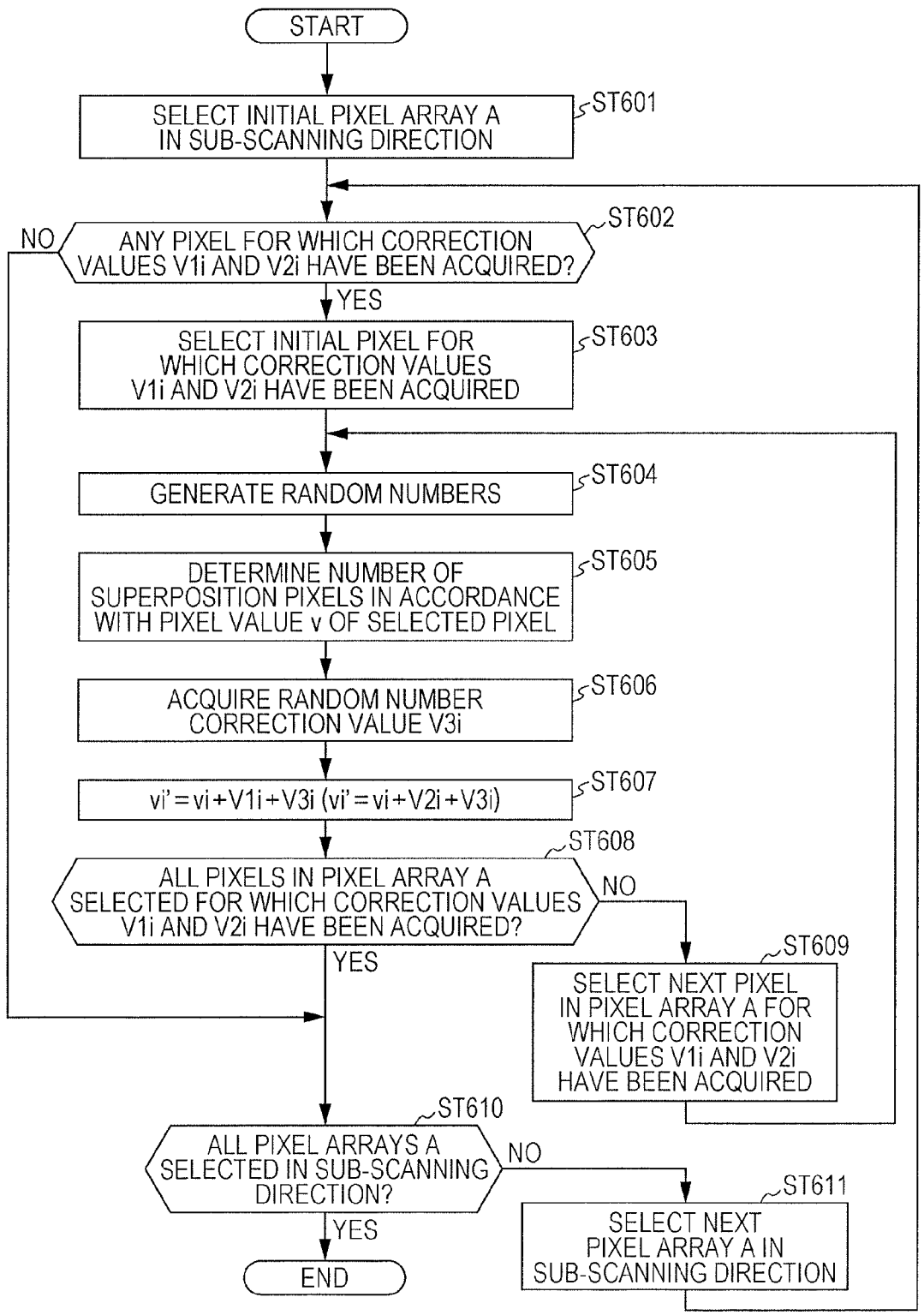
FIG. 20 is a flowchart of a correction value addition process in the present exemplary embodiment, and illustrates the sub-routine of ST105 in FIG. 14.

FIG. 20 is a flowchart of a correction value addition process in the present exemplary embodiment, and illustrates the sub-routine of ST105 in FIG. 14.

In ST601 in FIG. 20, an initial pixel array A extending in the sub-scanning direction is selected. Then, the process proceeds to ST602.

In ST602, it is determined whether or not there is any pixel for which the correction values V1$i$ and V2$i$ have been acquired. That is, it is determined whether or not there is a defect area. If YES is obtained, the process proceeds to ST603. If NO is obtained, the process proceeds to ST610.

In ST603, an initial pixel for which the correction values V1$i$ and V2$i$ have been acquired is selected. Then, the process proceeds to ST604.

In ST604, random numbers are generated. Then, the process proceeds to ST605.

In ST605, the number of superposed bits is determined in accordance with the pixel value v of the selected pixel. Then, the process proceeds to ST606.

In ST606, a random number correction value V3$i$ is acquired in accordance with the generated random numbers and the determined number of superposed bits. Then, the process proceeds to ST607.

In ST607, the pixel value vi is corrected. That is, the pixel value vi' is obtained in accordance with vi'=vi+V1$i$+V3$i$ (vi'=vi+V2$i$+V3$i$). Then, the process proceeds to ST608.

In ST608, it is determined whether or not all the pixels in the pixel array A for which the correction values V1$i$ and V2$i$ have been acquired have been selected. If YES is obtained, the process proceeds to ST610. If NO is obtained, the process proceeds to ST609.

In ST609, the next pixel in the pixel array A for which the correction values V1$i$ and V2$i$ have been acquired and for which the correction values V1$i$ and V2$i$ are yet to be addition is selected. Then, the process returns to ST604.

In ST610, it is determined whether or not all the pixel arrays A extending in the sub-scanning direction have been selected. If YES is obtained, the correction value addition process ends, and the subroutine returns to the calling program. If NO is obtained, the process proceeds to ST611.

In ST611, the next pixel array A extending in the sub-scanning direction is selected. Then, the process returns to ST602.

Explanation of Flowchart of Reverse Correction Process

Figure 21:
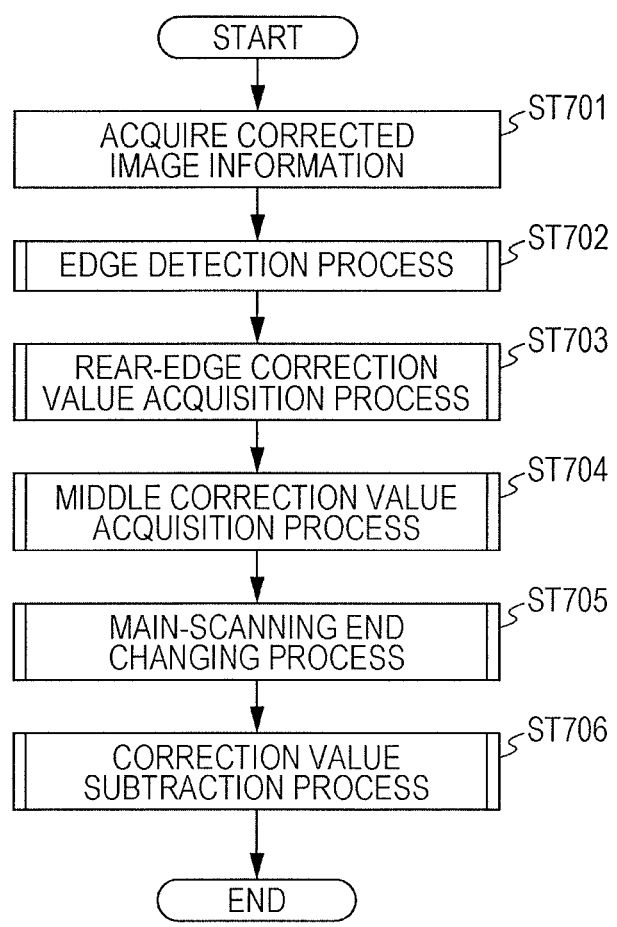
FIG. 21 is a flowchart of a reverse correction process in the present exemplary embodiment, and illustrates the sub-routine of ST109 in FIG. 14.

FIG. 21 is a flowchart of a reverse correction process in the present exemplary embodiment, and illustrates the sub-routine of ST109 in FIG. 14.

In ST701 in FIG. 21, corrected image information is acquired. Then, the process proceeds to ST702.

In ST702 to ST705, processing similar to that of ST101 to ST104 in FIG. 14 is executed. That is, the reverse correction process illustrated in FIG. 21 is different from the correction process illustrated in FIG. 14 in merely that the reverse correction process is performed on stored image information that has been corrected. Thus, the processing of ST702 to ST705 is not described here.

In ST706, a correction value subtraction process is executed. Then, the reverse correction process ends, and the subroutine returns to the calling program.

Explanation of Flowchart of Correction Value Subtraction Process

FIG. 22 is a flowchart of a correction value subtraction process in the present exemplary embodiment, and illustrates the sub-routine of ST706 in FIG. 21.

In the correction value subtraction process illustrated in FIG. 22, the same processing as that of the correction value addition process illustrated in FIG. 20 is executed, except that the processing of ST607' is executed in place of the processing of ST607 in FIG. 20. Thus, a description will be given of only the processing of ST607' in FIG. 22, and the remaining steps are not described here.

In ST607', the pixel value vi' is subjected to reverse correction. That is, the pixel value vi" is obtained in accordance with vi"=vi'−V1$i$'−V3$i$' (vi"=vi'−V2$i$'−V3$i$').

Operation of System According to Present Exemplary Embodiment

In an image forming system COM+U having the configuration described above according to the present exemplary embodiment, when the print image server COM, which serves as an example of an image processing apparatus, receives PDL data, a raster image is created in accordance with the PDL data, and a color correction process including color conversion and limiting the total amount of toner is performed. In addition, the raster image that has been subjected to the color correction process undergoes a raster image adjustment process including sharpness correction. In the print image server COM according to the present exemplary embodiment, a defect correction process is executed on the raster image that has undergone the adjustment process.

Figure 23A:
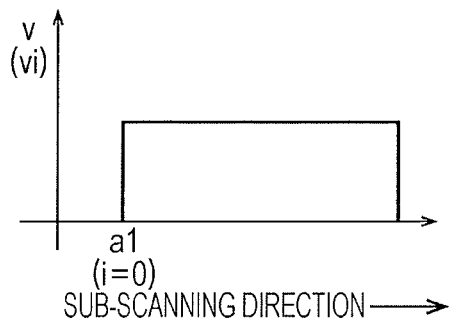
Figure 23E:
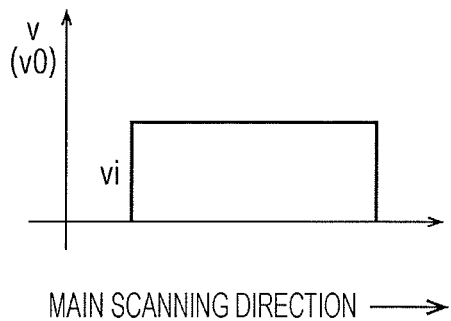
Figure 23B:
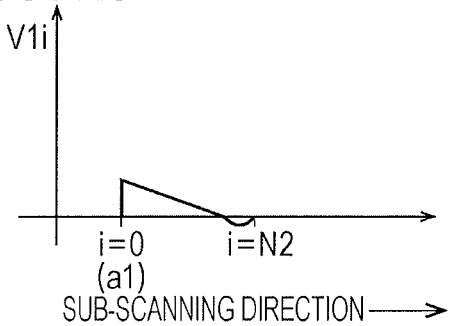
Figure 23F:
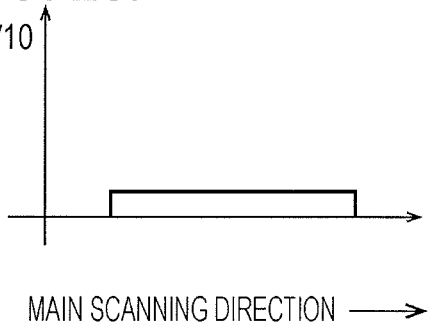
Figure 23C:
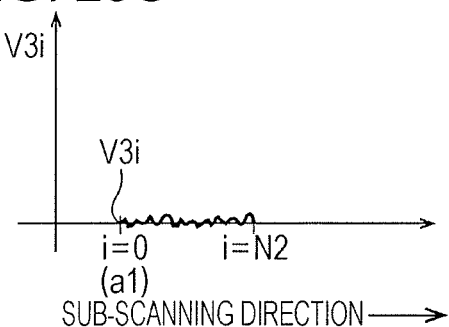
Figure 23G:
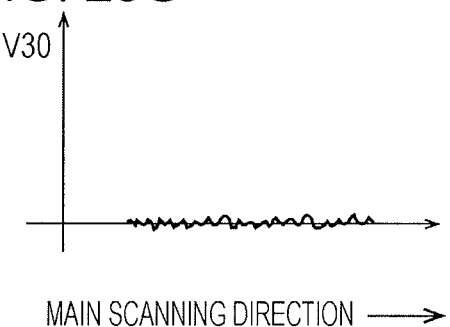
Figure 23D:
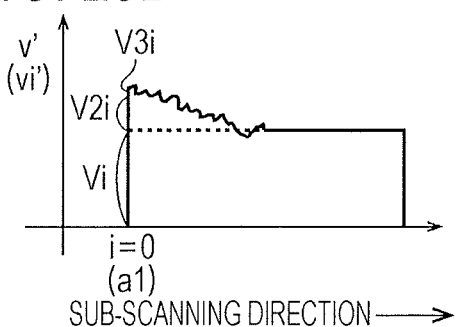
Figure 23H:
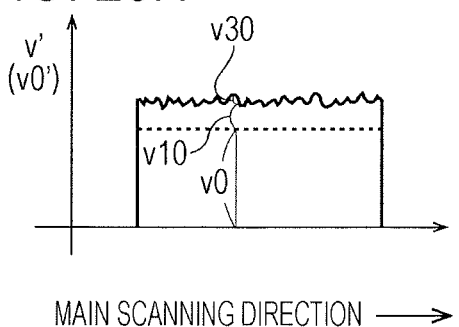

FIGS. 23A to 23H illustrate the operation in the exemplary embodiment of the present invention. FIG. 23A illustrates an example of a pixel value of a rear edge before correction in the sub-scanning direction. FIG. 23B illustrates an example of a correction value of a rear edge in the sub-scanning direction. FIG. 23C illustrates an example of a random number correction value of a rear edge in the sub-scanning direction. FIG. 23D illustrates an example of a corrected pixel value of a rear edge in the sub-scanning direction. FIG. 23E illustrates an example of a pixel value of a rear edge before correction in the main scanning direction. FIG. 23F illustrates an example of a correction value of a rear edge in the main scanning direction. FIG. 23G illustrates an example of a random number correction value of a rear edge in the main scanning direction. FIG. 23H illustrates an example of a corrected pixel value of a rear edge in the main scanning direction.

In FIGS. 23A to 23H, in the print image server COM according to the present exemplary embodiment, the correction values V1$i$ and V3$i$ are added when it is determined that the downstream side of the rear edge a1 in the sub-scanning direction is a defect area D1. As illustrated in FIG. 23B, the correction value V1$i$ is added such that a positive correction value for a portion close to the rear edge a1 is added and a negative correction value for a portion that is far away from the rear edge a1 by a preset distance. Thus, the pixel value v obtained after correction changes so that the density of the portion close to the rear edge a1 increases and the density of the portion far away from the rear edge a1 decreases. Additionally, a different random number correction value V3$i$ is added in accordance with the pixel value v of the pixel to be corrected. Accordingly, the pixel value v is corrected in the manner illustrated in FIG. 23D and FIG. 23H.

Figure 24A:
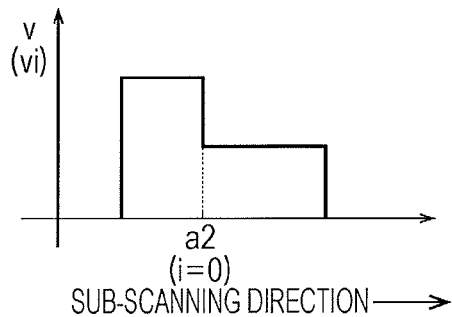
Figure 24E:
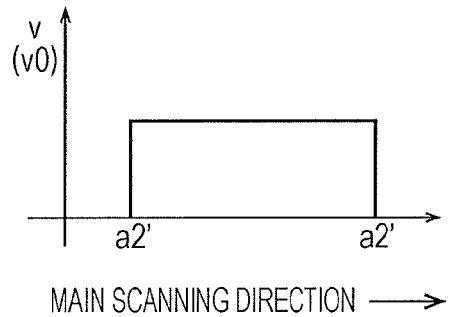
Figure 24B:
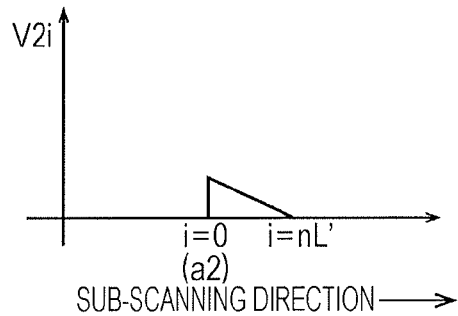
Figure 24F:
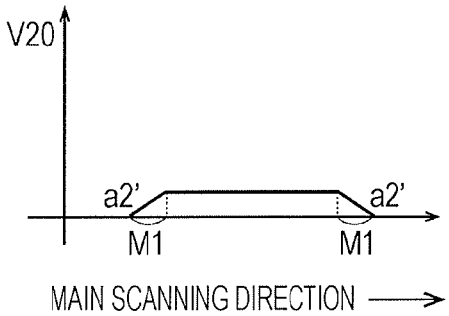
Figure 24C:
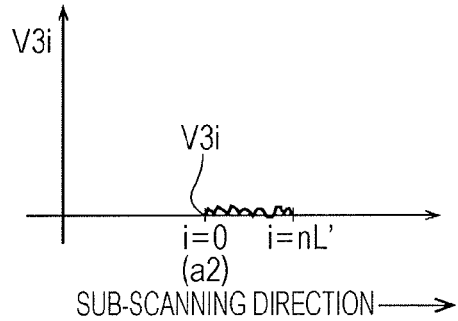
Figure 24G:
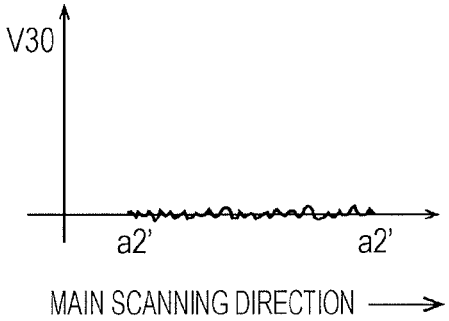
Figure 24D:
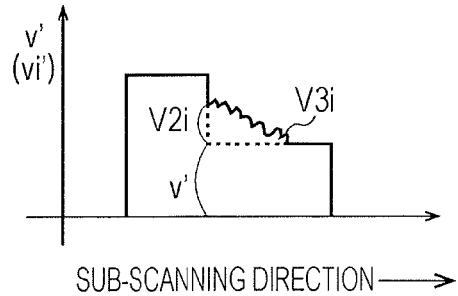
Figure 24H:
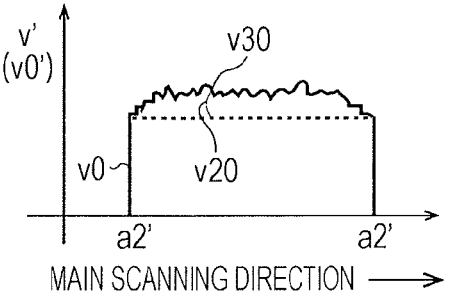

FIGS. 24A to 24H illustrate the operation in the exemplary embodiment of the present invention. FIG. 24A illustrates an example of a pixel value of a middle edge before correction in the sub-scanning direction. FIG. 24B illustrates an example of a correction value of a middle edge in the sub-scanning direction. FIG. 24C illustrates an example of a random number correction value of a middle edge in the sub-scanning direction. FIG. 24D illustrates an example of a corrected pixel value of a middle edge in the sub-scanning direction. FIG. 24E illustrates an example of a pixel value of a middle edge before correction in the main scanning direction. FIG. 24F illustrates an example of correction value of a middle edge in the main scanning direction. FIG. 24G illustrates an example of a random number correction value of a middle edge in the main scanning direction. FIG. 24H illustrates an example of a corrected pixel value of a middle edge in the main scanning direction.

In FIGS. 24A to 24H, in the print image server COM according to the present exemplary embodiment, the correction values V2$i$ and V3$i$ are added when it is determined that the downstream side of the middle edge a2 in the sub-scanning direction is a defect area D2. As illustrated in FIG. 24B, the correction value V2$i$ that is larger for a pixel closer to the middle edge a2 and that is smaller for a pixel farther from the middle edge a2 is added. In this case, if the position of the middle edge a2 is close to the end of the defect area D2 in the main scanning direction, a smaller correction value than that if the position of the middle edge a2 is far away from the end of the defect area D2 in the main scanning direction is used. That is, as illustrated in FIG. 24F, when m≤M1, where m denotes the number of pixels away from the end, the correction value V2$i$ is changed to the value obtained by V2$i$×(m/M1). Additionally, a different random number correction value V3 is added in accordance with the pixel value v of the pixel to be corrected. Accordingly, the pixel value v is corrected in the manner illustrated in FIG. 24D and FIG. 24H.

When the addition process of the correction values V1$i$, V2$i$, and V3$i$ is completed, image information subjected to defect correction, that is, image data that is based on pixel values corrected with the correction values V1$i$ to V3$i$, is stored. In response to input to start printing through the input member COM2 or COM3, the corrected image data is read and subjected to density adjustment. The image data subjected to density adjustment is transmitted to the printer U in the system COM+U. In the printer U, screen information serving as an example of image information used for printing is generated in accordance with the corrected image data. Then, a visible image is formed by the marking unit U1$a$ in accordance with the screen information, and is printed on a recording sheet S. In a case where calibration is performed or a user adjusted curve is changed, density adjustment is performed in accordance with the stored corrected image data. That is, the present exemplary embodiment involves no repetition of the raster image adjustment process, the defect correction process, and the like when density adjustment is modified.

Figure 25A:
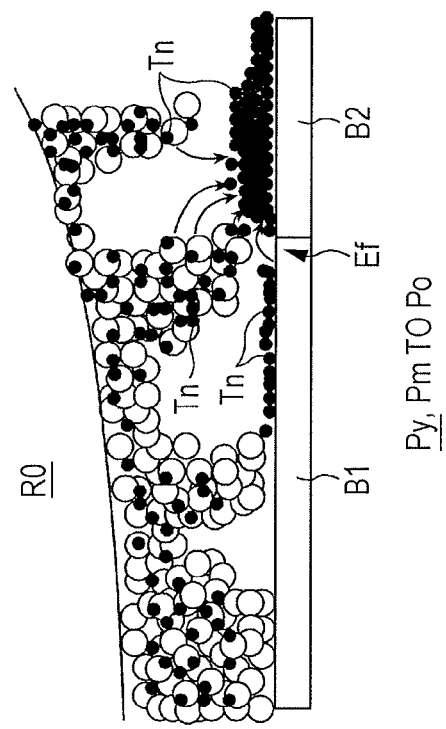
Figure 25B:
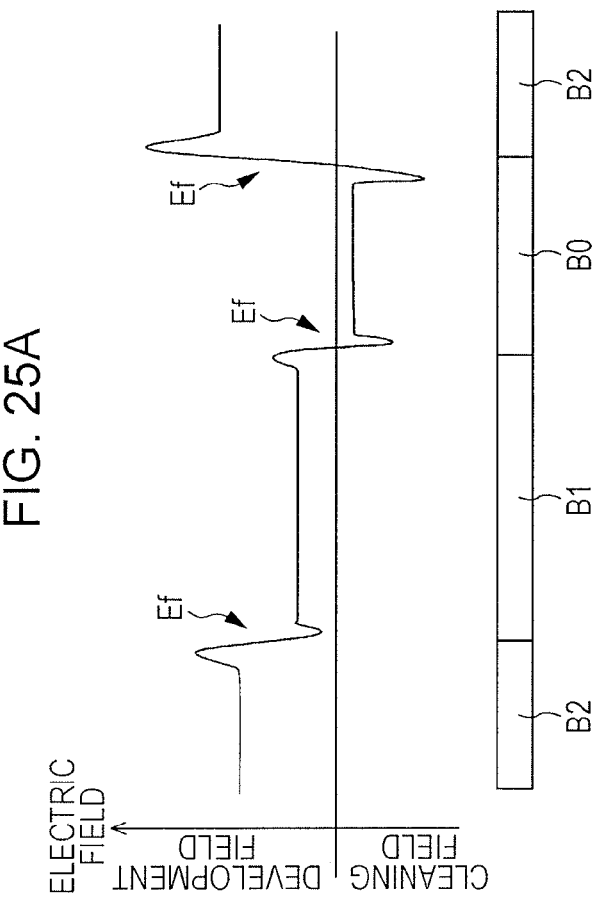

FIGS. 25A and 25B illustrate an example of development-related defects at boundaries. FIG. 25A illustrates a fringing field, and FIG. 25B illustrates toner movement.

In FIGS. 25A and 25B, when an image having areas of different densities is to be formed, a surface potential is formed on each of the photoconductor drums Py to Po in accordance with the density of the area in the image, such as a non-image portion B0, an intermediate level portion B1, or a high-density portion B2. In this case, as known in the art, a fringing field Ef occurs on the boundary where regions at different potentials meet, and electric fields are generated on both sides of the boundary so as to emphasize the difference between the potentials. That is, as illustrated in FIG. 25B, within an area on the photoconductor drums Py to Po where the fringing field has occurred, the potential of a high-potential portion increases, whereas the potential of a low-potential portion decreases. Accordingly, movement of toner particles Tn in accordance with the fringing field Ef results in high-density areas being more likely to be higher in density and low-density areas being more likely to be lower in density.

FIGS. 26A to 26C illustrate an example of a development-related defect at a boundary. FIG. 26A illustrates a developing region in a case where a rear edge is formed. FIG. 26B illustrates a state where a developing roller and a photoconductor drum rotate from the state illustrated in FIG. 26A. FIG. 26C illustrates a state where the developing roller and the photoconductor drum rotate from the state illustrated in FIG. 26B.

When surface potentials corresponding to image portions B1 and B2 are formed on each of the photoconductor drums Py to Po in the developing region Q illustrated in FIG. 26A, an electric field E1 is applied to toner in the developing region Q to attract the toner from the developing roller R0 to the corresponding one of the photoconductor drums Py to Po. When a surface potential on each of the photoconductor drums Py to Po corresponds to the non-image portion B0, an electric field E2 having a polarity opposite to that of the electric field E1 is applied to the toner in the developing region Q. For example, it is assumed here that the surface speed uR of the developing roller R0 is higher than the surface speed uP of the photoconductor drums Py to Po. In this case, when the developer held on the developing roller R0 travels through the non-image portion B0 on the photoconductor drums Py to Po, as illustrated in FIG. 26B, polarization occurs on a portion of the developer on the developing roller R0 which is near the photoconductor drums Py to Po in accordance with the electric field E2 having the opposite polarity, causing the polarity of the portion of the developer to be likely to be opposite to that of the toner particles Tn. Accordingly, when the developer on the developing roller R0 travels through the non-image portion B0 on the photoconductor drums Py to Po and enters the image portions B1 and B2 on the photoconductor drums Py to Po, the polarized developer might attract and remove toner particles from the developed image portions B1 and B2 on the photoconductor drums Py to Po.

Figure 27A:
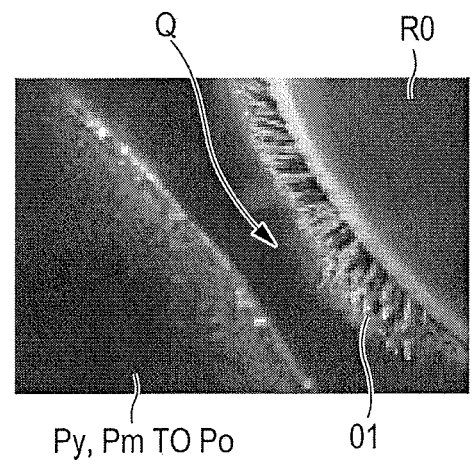
Figure 27B:
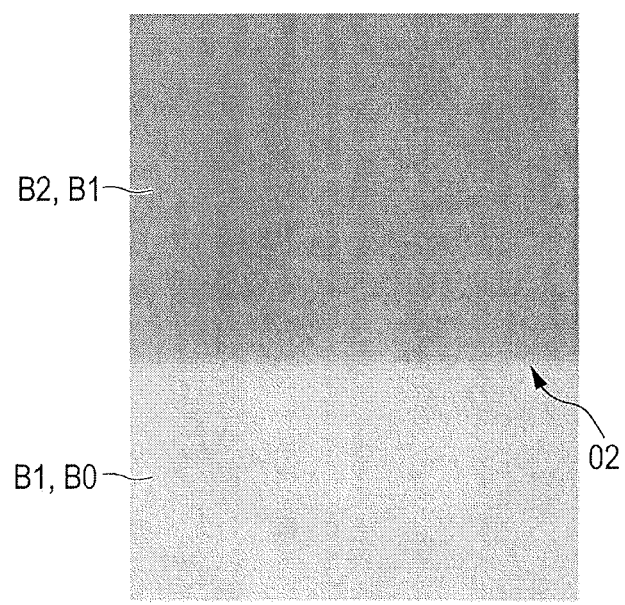

FIGS. 27A and 27B illustrate an example of a development-related defect at a boundary. FIG. 27A is a view from a cross section of a developing region, and FIG. 27B illustrates a rear edge in the image portion.

In FIG. 27A, when developer is held on the developing roller R0, the developer is brushed on and maintained in the developing region Q, resulting in a magnetic brush 01 being formed. Thus, when the developer on the developing roller R0 travels through the developing region Q, the magnetic brush 01 may come into contact with the photoconductor drums Py to Po, sweeping and scattering the toner particles on the photoconductor drums Py to Po. This may cause a surface roughness 02 in the trailing ends of the image portions B1 and B2, that is, in the downstream side of the rear edge a1 in the sub-scanning direction, in accordance with the shape of the magnetic brush 01, resulting in a low-density area being formed.

In the developing region Q, accordingly, as illustrated in FIGS. 26A to 26C and FIGS. 27A and 27B, a phenomenon in which low density is obtained in the vicinity of the rear edge a1 in the image portions B1 and B2, called tail-edge deletion (TED), may occur.

FIGS. 28A to 28C illustrate an example of a development-related defect at a boundary. FIG. 28A illustrates a developing region in a case where a rear edge is formed. FIG. 28B illustrates a state where a developing roller and a photoconductor drum rotate from the state illustrated in FIG. 28A. FIG. 28C illustrates a state where the developing roller and the photoconductor drum rotate from the state illustrated in FIG. 28B.

In addition, the development-related defects illustrated in FIGS. 25A to 27B may also occur in combination. For example, in FIG. 28A, a fringing field Ef is applied on the boundaries between the non-image portion B0 and the image portions B1 and B2, and the density difference is likely to be emphasized. Accordingly, the image density is likely to be high on boundaries near the image portions B1 and B2. In this case, when the developer on the developing roller R0 enters from the non-image portion B0 to the image portions B1 and B2 on the photoconductor drums Py to Po, the developer is polarized when traveling through the non-image portion B0. When the developer that is polarized enters the image portions B1 and B2, the developer may attract and remove toner particles from the rear edge a1 side of the image portions B1 and B2 that are developed. Accordingly, the density may be reduced on portions of the image portions B1 and B2 where the density has been increased by the fringing field Ef, which are near the rear edge a1, whereas the density may be still high on portions which are away from the rear edge a1 because toner particles are not removed.

Figure 29A:
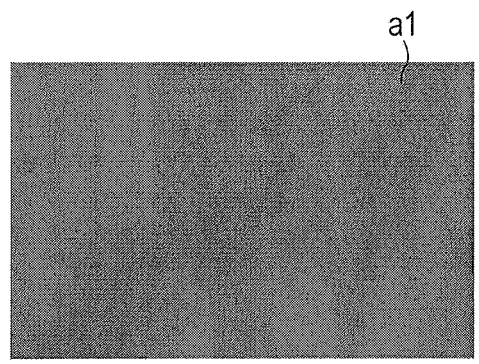
Figure 29B:
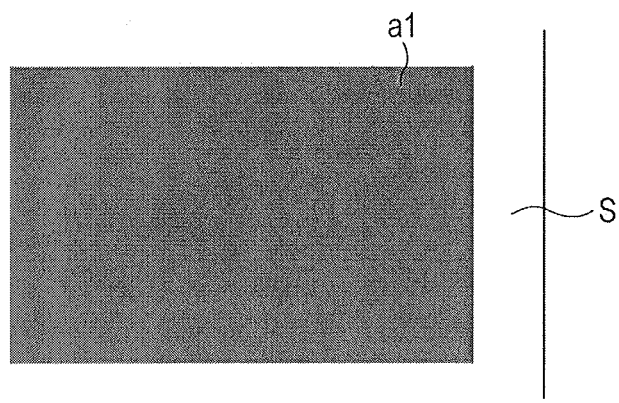
Figure 29C:
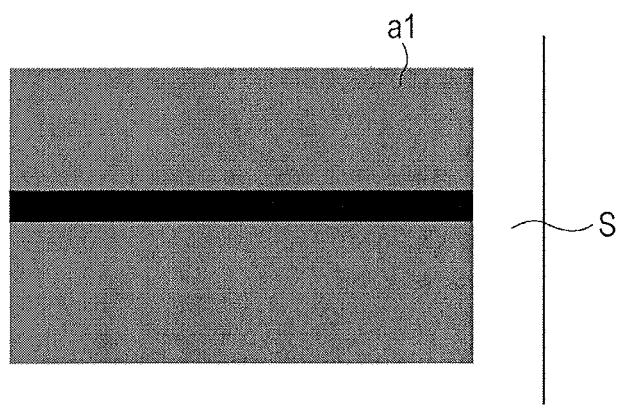
Figure 29D:
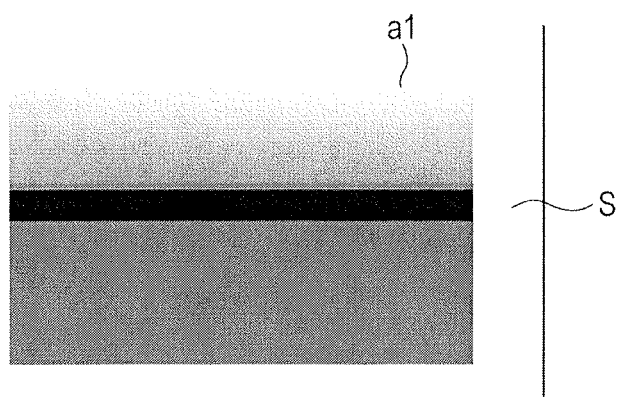

FIGS. 29A to 29D illustrate the comparison between the operation in the exemplary embodiment of the present invention and the operation in the related art. FIG. 29A is a view of image data obtained before defect correction. FIG. 29B is a view obtained when rear-edge correction according to the present exemplary embodiment is performed on the image data illustrated in FIG. 29A and an image is recorded. FIG. 29C is a view obtained when correction of the related art is performed on the image data illustrated in FIG. 29A and an image is recorded. FIG. 29D is a view obtained when an image is recorded without correction on the image data illustrated in FIG. 29A.

If an image is recorded on a recording sheet S without defect correction on the image data obtained before correction illustrated in FIG. 29A, as illustrated in FIG. 29D, a portion near the rear edge a1 has a low density on the recording sheet S, whereas a portion downstream in the sheet transport direction has a high density. Thus, the density is likely to be different from that intended in the image data obtained before correction. In the configuration of the related art, an amount of correction to increase the density in the sub-scanning direction with respect to the rear edge a1 is added. This allows a reduction in image defects in a low-density portion of the rear edge a1. However, it is difficult to correct the image defects in a high-density portion.

Figure 30A:
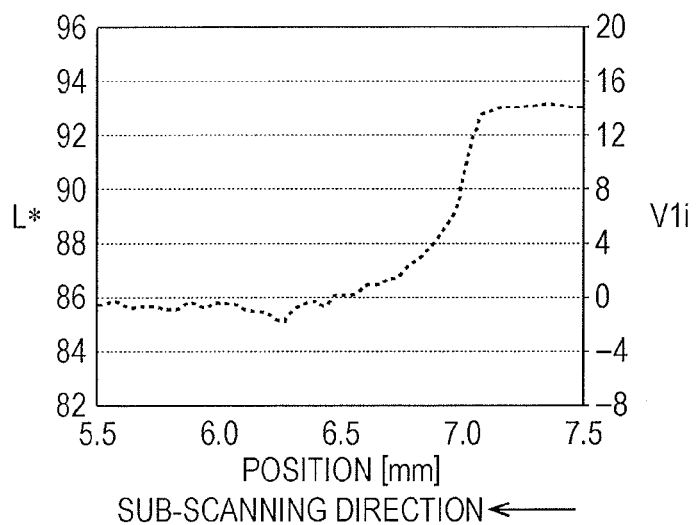
Figure 30B:
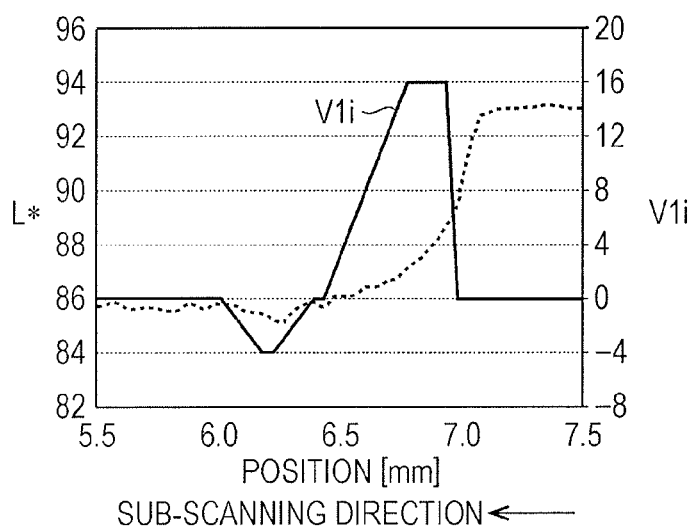
Figure 30C:
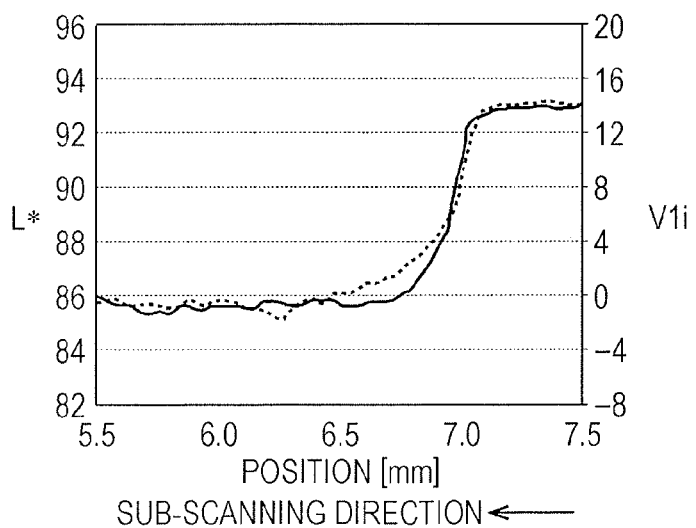

FIGS. 30A to 30C illustrate the operation in the exemplary embodiment of the present invention. FIG. 30A illustrates a result of measurement of the lightness of an image on a medium when the image is recorded without correction. FIG. 30B illustrates correction values for the image illustrated in FIG. 30A. FIG. 30C illustrates measured lightness values of an image on a medium when the image is recorded with correction.

In contrast to correction of the related art, in the present exemplary embodiment, as illustrated in FIGS. 23A to 23H, correction is performed by the addition of a correction value to increase density and a correction value to reduce density. Thus, the pixel values v illustrated in FIG. 23D and FIG. 23H are obtained in corrected image data. That is, in the present exemplary embodiment, the marking unit U1a of the printer U predicts the potential occurrence of development-related defects, and corrects image data. Thus, as illustrated in FIG. 29B, when an image is printed based on the corrected image data, an image recognizable from image data obtained before defect correction is easily obtained on a recording sheet S. That is, a printed image similar to original image information transmitted by a user using a PC may be easily obtained. As a result of measurement of an image printed on a sheet S without correction, the lightness indicated by the broken line in FIG. 30A is obtained. In contrast, when an image is printed with correction according to the present exemplary embodiment, as illustrated in FIG. 30C, the lightness indicated by the solid line, in which both the high-density portion and the low-density portion have been corrected, is obtained. In FIGS. 30A to 30C, the left axis represents L star which specifies the lightness, and the right axis represents the correction value. Further, the horizontal axis represents the position in the sub-scanning direction.

FIGS. 31A to 31D illustrate an example of a development-related defect at a boundary. FIG. 31A illustrates a developing region in a case where a middle edge is formed. FIG. 31B illustrates a state where a developing roller and a photoconductor drum rotate from the state illustrated in FIG. 31A. FIG. 31C illustrates a state where the developing roller and the photoconductor drum rotate from the state illustrated in FIG. 31B. FIG. 31D is a perspective view of the developing region as viewed from upstream in the sub-scanning direction.

In FIG. 31A, when surface potentials corresponding to the intermediate level portion B1 and the high-density portion B2, which has a higher density than the intermediate level portion B1, are formed on each of the photoconductor drums Py to Po, the electric field E1 is applied to toner in the developing region Q to attract the toner from the developing roller R0 to the corresponding one of the photoconductor drums Py to Po. As illustrated in FIG. 31B, when the toner in the developing region Q develops the electrostatic latent images on the photoconductor drums Py to Po, carrier in the developer has a charge having a polarity opposite to that of toner, called a counter charge. Thus, in FIG. 31C, when the developer that has developed the high-density portion B2 enters the intermediate level portion B1, the portion of the developer in which the counter charge has occurred may attract and remove toner particles from the intermediate level portion B1 that has been developed.

Accordingly, as illustrated in FIG. 31C, a phenomenon in which the density of the intermediate level portion B1 is low in the vicinity of the boundary between the high-density portion B2 and the intermediate level portion B1, called starvation (STV), may occur in the developing region Q.

The counter charge is likely to occur in accordance with the amount of developer that has developed a latent image on a photoconductor drum. Thus, in FIG. 31D, when the high-density portion B2 on each of the photoconductor drums Py to Po is developed, the amount of development is likely to be smaller in the end of the high-density portion B2 than in the center of the high-density portion B2 in the main scanning direction of the developing roller R0. Thus, the counter charge is less likely to occur in the end of the high-density portion B2. That is, the counter charge increases in the center of the high-density portion B2 in the main scanning direction, causing STV to be likely to occur. In contrast, STV is less likely to occur in a portion near the end of the high-density portion B2 in the main scanning direction, and image defects are less likely to occur.

Figure 32A:
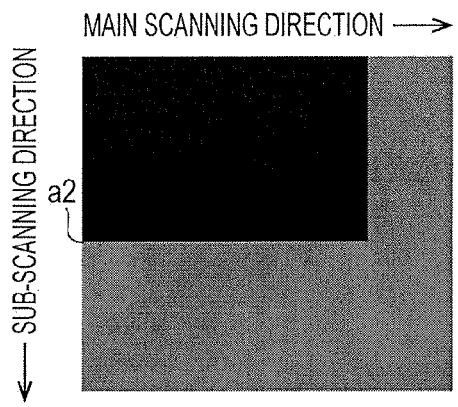
Figure 32D:
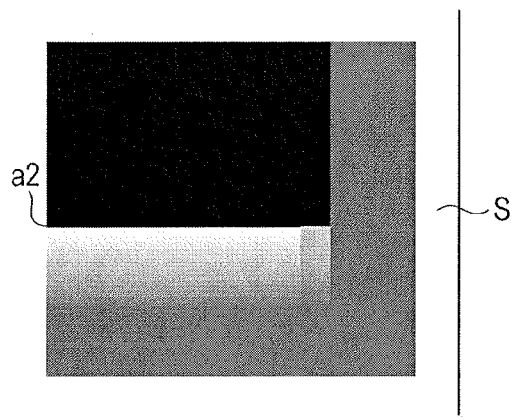
Figure 32B:
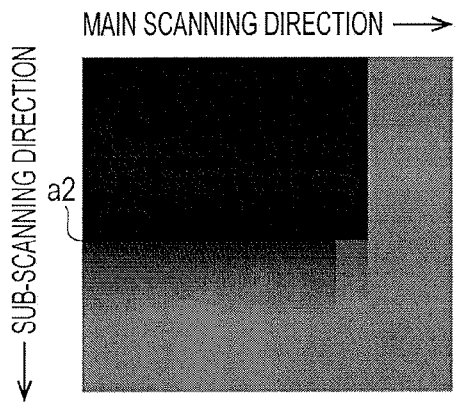
Figure 32E:
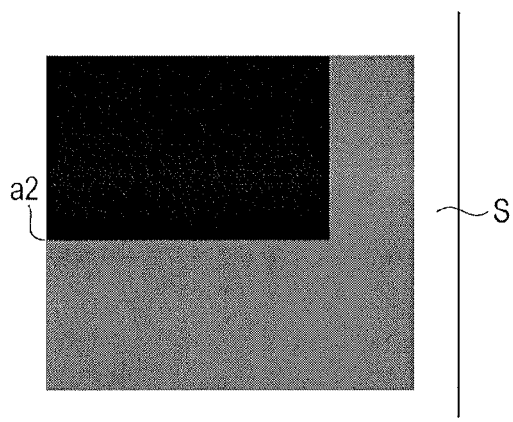
Figure 32C:
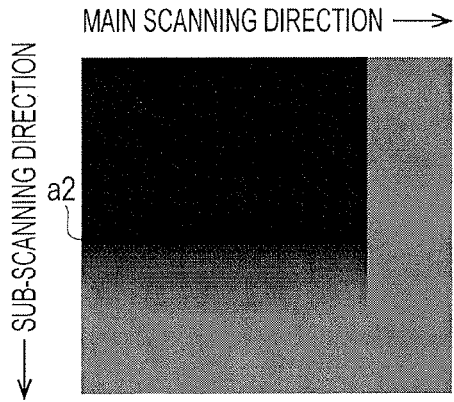
Figure 32F:
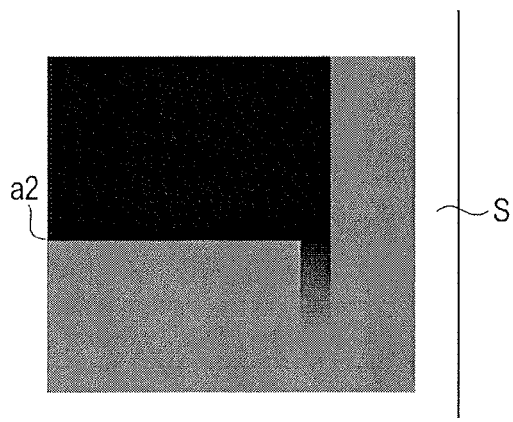

FIGS. 32A to 32F illustrate the comparison between the operation in the exemplary embodiment of the present invention and the operation in the related art. FIG. 32A is a view of image data obtained before defect correction. FIG. 32B illustrates image data obtained when middle-edge correction according to the present exemplary embodiment is performed on the image data obtained before correction. FIG. 32C illustrates image data obtained when correction of the related art is performed on the image data obtained before correction. FIG. 32D is a view obtained when an image is recorded based on the image data illustrated in FIG. 32A. FIG. 32E is a view obtained when an image is recorded based on the image data illustrated in FIG. 32B. FIG. 32F is a view obtained when the image data illustrated in FIG. 32C is recorded.

If an image is printed on a recording sheet S without defect correction in accordance with the original image data illustrated in FIG. 32A, as illustrated in FIG. 32D, a portion downstream of the middle edge a2 in the sheet transport direction on the recording sheet S is likely to have low density. In the configuration of the related art, an amount of correction to increase the density in the sub-scanning direction with respect to the middle edge a2 is added. This allows a reduction in image defects in a low-density portion. In the configuration of the related art, however, the correction value in the main scanning direction is not caused to change unless the pixel value v changes. Thus, as long as the pixel value v does not change even if a position is changed in the main scanning direction, the correction process in the sub-scanning direction is performed uniformly. This causes an end portion in the main scanning direction, where STV is less likely to occur, to be corrected with the same amount of correction as that for a portion away from the end, resulting in overcorrection being likely to occur. That is, in the configuration of the related art, as illustrated in FIG. 32F, an end portion in the main scanning direction has high density.

In the present exemplary embodiment, in contrast, as illustrated in FIGS. 24A to 24H, a portion to be corrected in the defect area D2 is corrected with a correction value that is smaller when the portion is close to the end in the main scanning direction than when the portion is far away from the end. That is, the pixel values v illustrated in FIG. 24D and FIG. 24H are obtained for corrected image data. Thus, the marking unit U1a of the printer U predicts the potential occurrence of development-related defects also in the defect area D2 at the middle edge a2, and corrects image data. Thus, as illustrated in FIG. 32F, a recorded image corresponding to the original image information intended by the user may be easily obtained.

In the defect correction process according to the present exemplary embodiment, in particular, the random number correction value V3$i$ is added when the correction values V1$i$ and V2$i$ are added. The developing devices Gy to Go may have different amounts of developer and densities in the axial direction depending on variations in the amount of consumption of developer, variations in the time of developer replenishment, the degree to which developer is stirred, and so forth. Thus, even when an image is recorded on a recording sheet S in accordance with the same pixel value v, the developer may have density non-uniformities in the axial direction, and the image on the recording sheet S may experience density non-uniformities in the main scanning direction. If a defect correction process is performed while density non-uniformities occur in the main scanning direction, a pixel value may be corrected so that the density non-uniformities will be emphasized. This may increase the risk of making the correction markedly noticeable on the recording sheet S. In the present exemplary embodiment, in contrast, the random number correction value V3$i$ is added. Thus, uniform correction is less likely to occur in the main scanning direction. Accordingly, density non-uniformities in the main scanning direction will be less noticeable. In particular, in the present exemplary embodiment, a different random number correction value V3$i$ is added for each of the Y to O colors. Thus, correction with the same random number correction value for the pixels at corresponding positions in the respective pieces of image data for all the Y to O colors does not occur. Thus, the risk that correction in the defect areas D1 and D2 will be emphasized due to the accumulation of the same random number correction value for the Y to O colors may be reduced.

In the present exemplary embodiment, furthermore, upon input to provide a preview, a reverse correction process is performed in accordance with image data subjected to defect correction. That is, edges a1 and a2, a correction value V1$i$' for rearward processing, a correction value V2$i$' for halftone processing, a random number correction value V3$i$', and so forth are acquired using a process similar to that for forward correction in accordance with the pixel value v' with defects corrected, that is, in accordance with the pixel value v' obtained after forward correction, which has been corrected by the corrector C124. The acquired correction values V1$i$', V2$i$', and V3$i$' are subtracted from the pixel value v' obtained after forward correction. Thus, the correction values V1$i$', V2$i$', and V3$i$' reduces the influence of the correction values V1$i$, V2$i$, and V3$i$ added during forward correction. Accordingly, a preview is displayed in accordance with the image data of the pixel value v'' in which the influence of the correction values V1$i$, V2$i$, and V3$i$ during forward correction has been reduced.

In the configuration in which a preview is displayed based on corrected image data without reverse correction, an image that is based on corrected image data is displayed on the display COM4. For example, when the user wishes to record the image data illustrated in FIG. 32A, the image data illustrated in FIG. 32B is obtained as a result of a defect correction process. Accordingly, an image corresponding to the image data illustrated in FIG. 32B, rather than that in FIG. 32A, is displayed as a preview on the display COM4. The defect correction process is a process depending on the configuration of the printer U and the like, and does not involve correction into an image intended in advance by the user. Thus, if an image subjected to defect correction is displayed as a preview, the user may mistakenly think that image defects have occurred. This may lead to unnecessary user effort to remove the image defects, such as re-modifying the image information saved in the PC and, in addition, re-transmitting the re-modified image information to the print image server COM. Thus, user operability may be deteriorated.

Furthermore, preview display may be based on image data obtained before defect correction, that is, image data obtained after the completion of adjustment of a raster image. In general, a raster image used by the print image server COM for a correction process has a large number of pixels. Thus, the amount of image data is likely to be large, which is likely to require a large number of memories for processing. Thus, in order to hold image data obtained after completion of adjustment, a memory for holding the image data is also necessary in addition to a memory for defect correction processing, resulting in the complexity, size, and cost of the apparatus being likely to increase. In the present exemplary embodiment, in contrast, corrected image data is subjected to a reverse correction process, and a preview is displayed. Thus, a preview is displayed in accordance with image data in which the influence of the correction values $V1i$, $V2i$, and $V3i$ has been reduced. This makes it difficult to display the content of correction, which depends on the configuration of the printer U and the like, in preview mode, resulting in an image intended in advance by the user being likely to be obtained. In the present exemplary embodiment, therefore, preview display that prevents deterioration in user operability may be achieved without an increase in the complexity and size of the apparatus.

The pixel value v' subjected to forward correction is different from the pixel value v obtained before defect correction. Thus, the positions of the edges a1 and a2, the pixel value v', and the correction values $V1i'$, $V2i'$, and $V3i'$, which are acquired in a reverse correction process, do not necessarily match the positions of the edges a1 and a2, the pixel value v, and the correction values $V1i$, $V2i$, and $V3i$ which are acquired during forward correction. In general, the correction values $V1i$, $V2i$, and $V3i$ acquired from the correspondence relationship used for defect correction are small. This makes it difficult to reverse the pixel value after forward correction, in magnitude, on image boundaries. Thus, the edges a1 and a2 may be easily detected at pixels in corresponding positions in both image data obtained before defect correction and image data subjected to forward correction. In addition, the correction values $V1i'$ and $V2i'$ acquired from the pixel value v' obtained after forward correction may also be easily set to be equal to a value that is 90% to 110% of the correction values V1 and V2 for forward correction. Accordingly, even with a configuration for subtraction from the pixel value v' obtained after forward correction on the basis of the correction values $V1i'$ and $V2i'$ for reverse correction, the pixel value v" that is close to the pixel value v obtained before defect correction is likely to be obtained.

For example, it is assumed that the function g is preset in the forward correction of a certain rear edge a1 so that the correction value is 10 when the pixel value is 30 and the correction value is 11 when the pixel value is 40. In this case, if the pixel value v of the rear edge a1 before defect correction is 30, the correction value for forward correction, which is acquired by the rear-edge correction value acquisition unit C112, is 10. Thus, the pixel value v' obtained after defect correction is 40 when the random number correction value is ignored. In this case, in reverse correction for the rear edge a1 at the same position, a correction value is acquired for the corrected pixel value of 40. Accordingly, the correction value of 11 is acquired in accordance with the function g. In the reverse correction process, the correction value of 11 is subtracted from the pixel value of 40 to obtain the pixel value of 29 after reverse correction. Thus, the pixel value of 29 after reverse correction is closer to the pixel value of 30 before forward correction than the corrected pixel value of 40 is.

In the present exemplary embodiment, accordingly, an image obtained before defect correction may be displayed as a preview with a simpler configuration than when image data subjected to the defect correction process is displayed as a preview. The difference between the pixel values v and v" is regarded as being due to fluctuations of an image in preview display, and is permissible.

Sensory Evaluation of Development-Related Defects

Sensory evaluation is performed to determine whether or not image defects in the defect areas D1 and D2 are noticeable. In an experiment for the evaluation, a potential Vh of a non-image portion on a photoconductor drum is set to −800 V, a potential Vb on a developing sleeve is set to −650 V, and a potential V1 of an image portion on the photoconductor drum is set to −400 V. In addition, the amount of charge on toner particles is set to 40 µc/g. The proportion of toner particles in the developer is set to 9.0%. In addition, carrier particles have a diameter of 35 µm and a specific gravity of 4.8. In addition, the carrier particles have a magnetization of 58 emu/g. In addition, the toner particles have a diameter of 5.8 µm and a specific gravity of 1.1. The photoconductor drum has a surface speed of 350 mm/sec. The ratio of the peripheral speed of the developing sleeve to the peripheral speed of the photoconductor drum is set to 1.75, and the developing sleeve is rotated in a direction opposite to that of the photoconductor drum. Furthermore, in the developing region Q, the angle at which the developing magnetic pole of a magnet roller is inclined upstream from the nearest point of the surface of the photoconductor drum and the surface of the developing sleeve in the rotation direction of the developing sleeve, called a minimum separable angle (MSA), is set to +5°. In addition, the magnet roller has a diameter of 20 mm. In addition, the surface of the developing sleeve has grooves formed therein extending in the axial direction at intervals of 400 µm in the circumferential direction with a depth of 100 µm. An image is recorded on a recording sheet S in accordance with image data generated with the edges a1 and a2, and the image on the recording sheet S is evaluated.

Figure 33A:
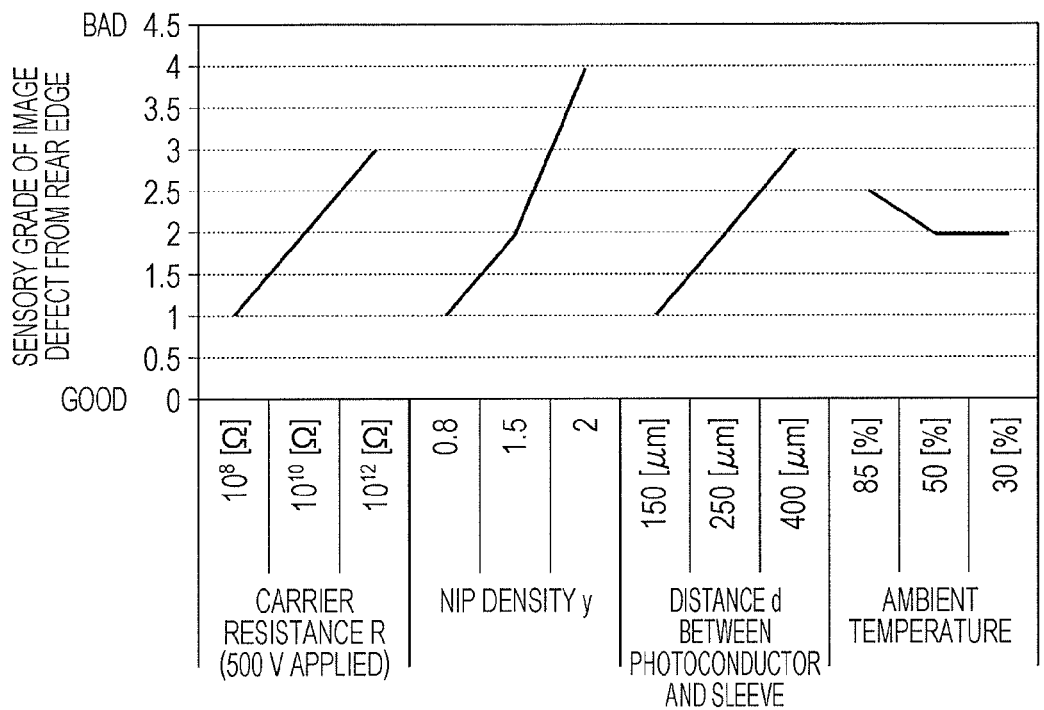
Figure 33B:
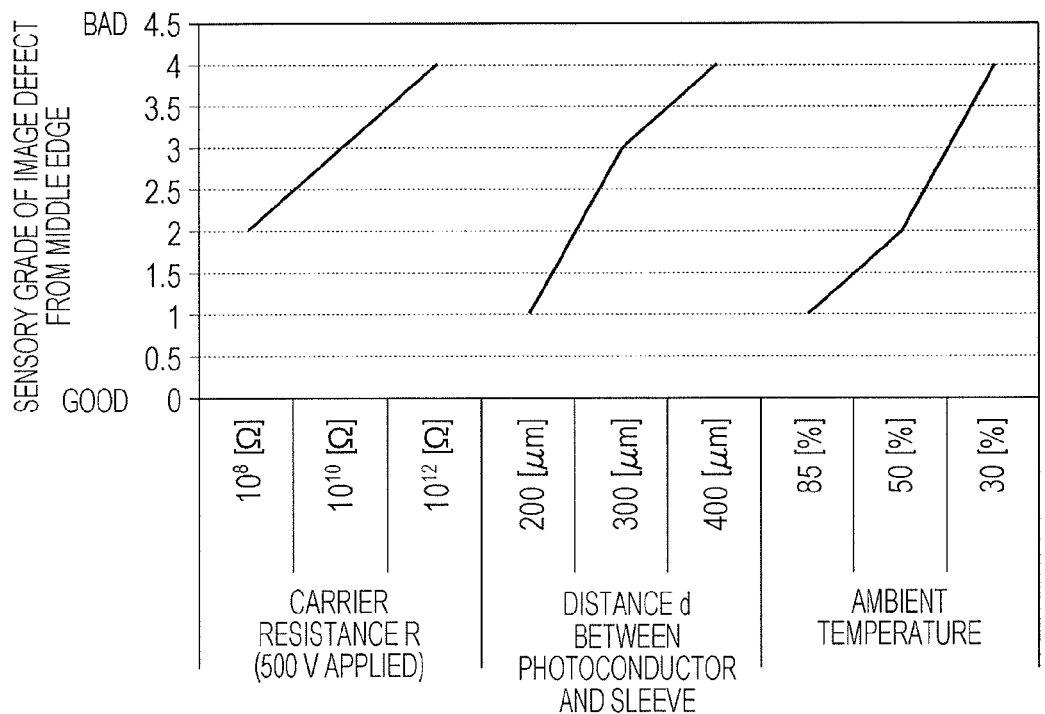

FIGS. 33A and 33B illustrate sensory evaluation of image defects that are based on development-related defects caused on boundaries. FIG. 33A illustrates sensory evaluation of a defect area at a rear edge, and FIG. 33B illustrates sensory evaluation of a defect area at a middle edge.

FIG. 33A depicts results of sensory evaluation of the defect area D1 at the rear edge a1. In FIG. 33A, as a carrier resistance R increases, defect noticeability increases, resulting in degradation in image quality. In addition, as the distance (or interval) d between the surface of the developing sleeve and the surface of the photoconductor drum increases, defect noticeability increases, resulting in degradation in image quality. In addition, as a nip density y increases, defect noticeability increases, resulting in degradation in image quality. The nip density y is a value obtained by y=x/d, where x (in grams per square meter (g/m$^2$)) represents the amount of developer transported per unit area of the surface of the developing sleeve. In addition, the ambient relative humidity has less influence than the carrier resistance R, the nip density y, and the distance d.

Thus, a high carrier resistance R makes it difficult to eliminate polarization of developer, causing a reduction in density at the end of an image. Thus, it is determined that so-called "white-spot defects" are likely to occur. In addition, a high nip density induces an increase in the attractive force of the magnetic brush, and it is determined that white-spot defects are likely to occur. Furthermore, a high carrier resistance R or a large distance d induces an increase in the fringing field, and it is determined that both white-spot defects and emphasis are likely to occur.

Accordingly, it is conceivable to reduce the carrier resistance R, the distance d, or the nip density y in order to reduce image defects caused by development-related defects without using a rear-edge correction process. However, a carrier resistance less than $10^5 \Omega$ would cause charge injection into carrier to be likely to occur during development. Thus, carrier is likely to move to the photoconductor drum during development, causing the occurrence of other image defects. In addition, a distance d of 150 µm or less would facilitate clogging of the space between the photoconductor drum and the developing sleeve with developer. In addition, a nip density of 0.8 or less would cause a reduction in the amount of toner to be supplied to the photoconductor drums Py to Po, which could result in a reduction in density or unstable densities.

Accordingly, the rear-edge correction process according to the present exemplary embodiment may be particularly suitable for use with a carrier resistance R of $10^6 \Omega$ or more. Further, the rear-edge correction process according to the present exemplary embodiment may be particularly suitable for use with a nip density y of 0.8 or more. Further, the rear-edge correction process according to the present exemplary embodiment may be particularly suitable for use with a distance d of 150 μm or more.

In FIG. 33B, the results of sensory evaluation of the middle edge a2 indicate that as the carrier resistance R increases, STV becomes more likely to occur, resulting in degradation in image quality. The results also indicate that as the distance d increases, STV becomes more likely to occur, resulting in degradation in image quality. The results further indicate that as the ambient relative humidity decreases, STV becomes more likely to occur, resulting in degradation in image quality.

Accordingly, a high carrier resistance R or high ambient humidity makes it difficult to eliminate the remaining counter charge, and it is determined that STV is likely to occur. Further, a large distance d between the photoconductor drum and the developing sleeve increases the strength of the fringing field, and it is determined that the edge density is likely to be emphasized.

Accordingly, it is conceivable to reduce the carrier resistance R, the distance d, or the nip density y in order to reduce image defects caused by development-related defects without using a middle-edge correction process. However, as described above, a carrier resistance less than $10^5 \Omega$ would cause the occurrence of other image defects. In addition, a distance d of 150 μm or less would facilitate clogging of the space with developer.

Therefore, the middle-edge correction process according to the present exemplary embodiment may be particularly suitable for use with a carrier resistance R of $10^6 \Omega$ or more. Further, the middle-edge correction process according to the present exemplary embodiment may be particularly suitable for use with a distance d of 150 μm or more.

Modifications

While an exemplary embodiment of the present invention has been described in detail, the present invention is not limited to the exemplary embodiment described above, and a variety of modifications may be made without departing from the scope of the present invention as defined in the appended claims. Some modifications of the present invention will be discussed hereinafter.

First Modification

In the exemplary embodiment described above, the printer U has been discussed as an example of an image forming apparatus, but this is not intended to be limiting. An image forming apparatus may be implemented as a copying machine, a facsimile machine, a multifunction device having the multiple functions of a copying machine and a facsimile machine, or the like. In addition, an image forming apparatus is not limited to a multi-color development image forming apparatus, and may be a single-color, or monochrome, image forming apparatus.

Second Modification

In the exemplary embodiment described above, a defect correction process is performed by the print image server COM, but this is not intended to be limiting. A defect correction process may be performed by the printer U.

Third Modification

In the exemplary embodiment described above, image information is transmitted from the personal computer PC, but this is not intended to be limiting. The configuration disclosed herein may be applied to image information having multiple pixels, which is read by an image reading unit, or a scanner.

Fourth Modification

In the exemplary embodiment described above, the random number correction values V3$i$ and V3$i'$ are generated for each pixel to be corrected, but this is not intended to be limiting. For example, random numbers may be changed for each pixel in the main scanning direction, and random number correction values may be generated.

Fifth Modification

In the exemplary embodiment described above, it is desirable that the random number correction values V3$i$ and V3$i'$ be added and subtracted. Instead, the random number correction value V3$i$, V3$i'$ may not necessarily be added and subtracted. That is, a configuration relating to random numbers may be omitted.

Sixth Modification

In the exemplary embodiment described above, by way of example, the correction value V2$i$ for the middle edge a2 is acquired in accordance with the pixel values vL and vH or the like, but this is not intended to be limiting. For example, the following configuration may be used: A correspondence relationship between the pixel value v and exposure energy, a correspondence relationship between the difference in exposure energy and the number of target pixels, and a correspondence relationship between the difference in exposure energy and the correction value are measured and stored in advance. Then, as disclosed in Japanese Patent No. 3832521, exposure energy is determined from each of the pixel value vL in a low-density area and the pixel value vH in a high-density area, and the number of target pixels and the correction value are acquired in accordance with the correspondence relationship that is based on the difference in exposure energy between them.

Seventh Modification

In the exemplary embodiment described above, by way of example, a sub-scanning-direction boundary is detected and a pixel density is corrected. For example, the following configuration may be used: As disclosed in Japanese Patent No. 3832521, when a main-scanning-direction boundary is detected and a density is corrected, reverse correction is performed and a preview is displayed.

Eighth Modification

In the exemplary embodiment described above, by way of example, pixels arranged in the main scanning direction of the pixel of interest P1 include a pixel shifted in the sub-scanning direction with respect to a pixel adjacent in the main scanning direction, and include, in the sub-scanning direction, three pixels, but this is not intended to be limiting. Even when a pixel shifted by one, two, or more than three pixels in the sub-scanning direction is a middle edge a2 depending on the occurrence of development-related defects, the pixel may be detectable as a pixel adjacent to the pixel of interest P1 in the main scanning direction.

Ninth Modification

In the exemplary embodiment described above, it is desirable that the reverse correction process share correspondence information with the initial correction, that is, forward correction, but this is not intended to be limiting. For example, the following configuration may be used: Correspondence information dedicated to reverse correction is prepared in advance, and, during reverse correction, the correction values V1$i'$ and V2$i'$ are determined in accordance with the correspondence information dedicated to reverse correction by using the pixel value v' obtained after forward correction.

Tenth Modification

In the exemplary embodiment described above, the threshold values Z0 to Z2, the numbers of pixels N1 to N3 and M1, and so forth may be each set to an arbitrary value so that areas D1 and D2 are detectable in accordance with areas D1 and D2 in which development-related defects occur depending on the printer U.

Eleventh Modification

In the exemplary embodiment described above, by way of example, the function g exhibits positive and negative different values on both sides of the value ia, but this is not intended to be limiting. For example, the following configuration may be used: A correction value of 0 is used for a preset number of pixels from the value ia, and a negative correction value is used for a larger number of pixels. Also, by way of example, a correction value undergoes a transition from decrease to increase on both sides of the value ib, but this is not intended to be limiting. The following configuration may be used: A constant correction value, which is equal to the value ib, is used for a preset number of pixels from the value ib, and the correction value increases for a larger number of pixels.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an acquisition unit that acquires image information having a plurality of pixels, each pixel having density information;
    a first detection unit that detects sub-scanning-direction boundary pixels in accordance with the image information, the sub-scanning-direction boundary pixels being located on a boundary extending in a density change direction from a high-density pixel area to a low-density pixel area having a density lower than the high-density pixel area in a preset sub-scanning direction;
    a first determination unit that determines whether or not a development-related defect occurs in a preset number of pixels downstream of the sub-scanning-direction boundary pixels in the sub-scanning direction, in accordance with the number of pixels in a high-density area located upstream of the sub-scanning-direction boundary pixels in the sub-scanning direction;
    a second detection unit that detects, in a case where a set of sub-scanning-direction boundary pixels among the sub-scanning-direction boundary pixels in which it is determined that a development-related defect occurs is arranged in a main scanning direction, an end pixel in the main scanning direction among the set of sub-scanning-direction boundary pixels;
    a second determination unit that determines whether or not each of the set of sub-scanning-direction boundary pixels arranged in the main scanning direction is close to the end pixel in the main scanning direction, by determining whether or not a distance between each of the set of sub-scanning-direction boundary pixels and the end pixel in the main scanning direction is within a preset value;
    a correction unit that corrects a density for the preset number of pixels downstream of the sub-scanning-direction boundary pixels in the sub-scanning direction,
        the correction unit correcting the image information so that an amount of correction to increase a density for a sub-scanning-direction boundary pixel determined to be close to the end pixel in the main scanning direction among the sub-scanning-direction boundary pixels is smaller than an amount of correction to increase a density for a sub-scanning-direction boundary pixel determined not to be close to the end pixel in the main scanning direction among the sub-scanning-direction boundary pixels; and
    a transmitting unit that transmits the image information corrected by the correction unit to an image forming apparatus.

2. The image processing apparatus according to claim 1, wherein
    the correction unit corrects the image information so that an amount of correction to increase a density for a sub-scanning-direction boundary pixel determined to be closer to the end pixel in the main scanning direction among the sub-scanning-direction boundary pixels is smaller.

3. The image processing apparatus according to claim 1, wherein
    the correction unit corrects the image information so that an amount of correction to increase a density for a sub-scanning-direction boundary pixel determined to be close to the end pixel in the main scanning direction among the sub-scanning-direction boundary pixels is zero.

4. An image forming system comprising:
    the image processing apparatus according to claim 1; and
    an image forming apparatus that forms an image in accordance with image information transmitted from the image processing apparatus,
    the image forming apparatus including
        an image bearing member,
        a charging member that charges a surface of the image bearing member,
        a latent image forming device that forms a latent image on the charged surface of the image bearing member,
        a developing device that develops the latent image on the surface of the image bearing member with developer to produce a visible image,
        a transfer device that transfers the visible image on the surface of the image bearing member onto a medium, and
        a fixing device that fixes, on the medium, the visible image transferred onto the medium.

5. An image forming apparatus comprising:
    an image bearing member;
    a charging member that charges a surface of the image bearing member;
    a latent image forming device that forms a latent image on the charged surface of the image bearing member;
    a developing device that develops the latent image on the surface of the image bearing member with developer to produce a visible image;

a transfer device that transfers the visible image on the surface of the image bearing member onto a medium;

a fixing device that fixes, on the medium, the visible image transferred onto the medium;

an acquisition unit that acquires image information having a plurality of pixels, each pixel having density information;

a first detection unit that detects sub-scanning-direction boundary pixels in accordance with the image information, the sub-scanning-direction boundary pixels being located on a boundary extending in a density change direction from a high-density pixel area to a low-density pixel area having a density lower than the high-density pixel area in a preset sub-scanning direction;

a first determination unit that determines whether or not a development-related defect occurs in a preset number of pixels downstream of the sub-scanning-direction boundary pixels in the sub-scanning direction, in accordance with the number of pixels in a high-density area located upstream of the sub-scanning-direction boundary pixels in the sub-scanning direction;

a second detection unit that detects, in a case where a set of sub-scanning-direction boundary pixels among the sub-scanning-direction boundary pixels in which it is determined that a development-related defect occurs is arranged in a main scanning direction, an end pixel in the main scanning direction among the set of sub-scanning-direction boundary pixels;

a second determination unit that determines whether or not each of the set of sub-scanning-direction boundary pixels arranged in the main scanning direction is close to the end pixel in the main scanning direction, by determining whether or not a distance between each of the set of sub-scanning-direction boundary pixels and the end pixel in the main scanning direction is within a preset value;

a correction unit that corrects a density for the preset number of pixels downstream of the sub-scanning-direction boundary pixels in the sub-scanning direction, the correction unit correcting the image information so that an amount of correction to increase a density for a sub-scanning-direction boundary pixel determined to be close to the end pixel in the main scanning direction among the sub-scanning-direction boundary pixels is smaller than an amount of correction to increase a density for a sub-scanning-direction boundary pixel determined not to be close to the end pixel in the main scanning direction among the sub-scanning-direction boundary pixels;

a creation unit that creates print information in accordance with the image information corrected by the correction unit; and a controller that controls the latent image forming device in accordance with the print information.

6. An image processing method comprising:

acquiring image information having a plurality of pixels, each pixel having density information;

detecting sub-scanning-direction boundary pixels in accordance with the image information, the sub-scanning-direction boundary pixels being located on a boundary extending in a density change direction from a high-density pixel area to a low-density pixel area having a density lower than the high-density pixel area in a preset sub-scanning direction;

determining whether or not a development-related defect occurs in a preset number of pixels downstream of the sub-scanning-direction boundary pixels in the sub-scanning direction, in accordance with the number of pixels in a high-density area located upstream of the sub-scanning-direction boundary pixels in the sub-scanning direction;

detecting, in a case where a set of sub-scanning-direction boundary pixels among the sub-scanning-direction boundary pixels in which it is determined that a development-related defect occurs is arranged in a main scanning direction, an end pixel in the main scanning direction among the set of sub-scanning-direction boundary pixels;

determining whether or not each of the set of sub-scanning-direction boundary pixels arranged in the main scanning direction is close to the end pixel in the main scanning direction, by determining whether or not a distance between each of the set of sub-scanning-direction boundary pixels and the end pixel in the main scanning direction is within a preset value;

correcting a density for the preset number of pixels downstream of the sub-scanning-direction boundary pixels in the sub-scanning direction, the image information being corrected so that an amount of correction to increase a density for a sub-scanning-direction boundary pixel determined to be close to the end pixel in the main scanning direction among the sub-scanning-direction boundary pixels is smaller than an amount of correction to increase a density for a sub-scanning-direction boundary pixel determined not to be close to the end pixel in the main scanning direction among the sub-scanning-direction boundary pixels; and transmitting the corrected image information to an image forming apparatus.

* * * * *